(12) United States Patent
Goto

(10) Patent No.: US 7,379,247 B2
(45) Date of Patent: May 27, 2008

(54) IMAGE PICKUP APPARATUS

(75) Inventor: Hisashi Goto, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/435,685

(22) Filed: May 18, 2006

(65) Prior Publication Data

US 2006/0262414 A1   Nov. 23, 2006

(30) Foreign Application Priority Data

May 23, 2005   (JP) ............... 2005-149254

(51) Int. Cl.
*G02B 27/14* (2006.01)
*G02B 27/10* (2006.01)

(52) U.S. Cl. ..................... 359/629; 359/627

(58) Field of Classification Search ............... 359/629
See application file for complete search history.

(56) References Cited

U.S. PATENT DOCUMENTS

| | | | |
|---|---|---|---|
| 3,677,621 A * | 7/1972 | Smith .................. 359/487 |
| 5,526,184 A * | 6/1996 | Tokuhashi et al. .......... 359/630 |
| 5,793,473 A * | 8/1998 | Koyama et al. .............. 355/55 |
| 6,166,784 A | 12/2000 | Murata et al. |
| 6,522,473 B2 | 2/2003 | Takeyama |
| 6,995,897 B2 * | 2/2006 | Mushika et al. ............. 359/300 |
| 2001/0003488 A1 * | 6/2001 | Yoshida ...................... 359/381 |
| 2001/0022691 A1 * | 9/2001 | Furter et al. ................ 359/629 |
| 2002/0033903 A1 * | 3/2002 | Sato ........................... 348/756 |
| 2004/0240078 A1 | 12/2004 | Sekiyama |
| 2005/0088759 A1 * | 4/2005 | Nishioka et al. ............ 359/726 |
| 2005/0276297 A1 * | 12/2005 | Nishi et al. .............. 372/43.01 |
| 2006/0072094 A1 * | 4/2006 | Honda .......................... 355/67 |
| 2006/0109558 A1 * | 5/2006 | Nishioka ..................... 359/642 |

FOREIGN PATENT DOCUMENTS

| | | |
|---|---|---|
| JP | 2001-249348 | 9/2001 |
| JP | 2001-272646 | 10/2001 |
| JP | 2003-287612 | 10/2003 |

* cited by examiner

*Primary Examiner*—Jordan Schwartz
*Assistant Examiner*—James C Jones
(74) *Attorney, Agent, or Firm*—Kenyon & Kenyon LLP

(57) ABSTRACT

An image pickup apparatus that comprises: an optical path splitting element; an optical system including a variable-optical-power element which is substantially immobile in an optical axis direction and a reflective surface; and an image pickup surface, the variable-optical-power element, the optical system, and the image pickup surface being arranged so that a ray from an object side is divided into two rays by the optical path splitting element, at least one of the rays enters the optical system, and is reflected by the reflective surface to return to the optical path splitting element, and the ray strikes on the image pickup surface via the optical path splitting element.

12 Claims, 34 Drawing Sheets

IMAGE PICKUP APPARATUS

CROSS REFERENCE TO RELATED APPLICATIONS

This application claims benefit under 35 U.S.C. § 119 of Japanese Patent Application No. 2005-149,254, filed in Japan on May 23, 2005, the contents of which are incorporated herein by reference.

BACKGROUND OF THE INVENTION

1. Field of the Invention

The present invention relates to an image pickup apparatus.

2. Description of the Related Art

Heretofore, it has been proposed that a variable-optical-power element be disposed in an image pickup optical system and a focal length or a focal position be changed by a function of the variable-optical-power element. This proposed method has an advantage that it is possible to omit a space or a mechanically movable component for moving a lens in an optical axis direction.

Specifically, there are proposed a liquid crystal lens system and a deformable mirror system.

As documents on a method of manufacturing a liquid crystal lens, there are Japanese Patent Application Laid-Open Nos. 2001-272646 and 2001-249348. It is described in Japanese Patent Application Laid-Open No. 10-73758 that the method can be applied to an image pickup lens regardless of a polarization direction of a light flux from an object.

Moreover, an example in which a deformable mirror is applied to the image pickup lens is described in Japanese Patent Application Laid-Open No. 2004-309684 and the like. In this proposal, the deformable mirror is provided with a function of bending the light flux in order to dispose the deformable mirror in the image pickup lens. Therefore, a mirror surface is an aspherical surface which is a so-called free-formed surface, and has a shape which is not rotationally-symmetrical about an optical axis.

BRIEF SUMMARY OF THE INVENTION

In a first type of the present invention, an image pickup apparatus comprises: an optical path splitting element; an optical system including a variable-optical-power element and a reflective surface which are substantially immobile in an optical axis direction; and an image pickup surface, the optical path splitting element, the optical system, and the image pickup surface being arranged so that a light flux incoming from a object side passes through the optical path splitting element, enters the optical system, is reflected by the reflective surface, is emitted from the optical system toward the optical path splitting element, is reflected by the optical path splitting element, and then strikes on the image pickup surface.

Moreover, in a second type of the present invention, an image pickup apparatus comprises: an optical path splitting element; an optical system including a variable-optical-power element and a reflective surface which are substantially immobile in an optical axis direction; and an image pickup surface, the optical path splitting element, the optical system, and the image pickup surface being arranged so that a light flux incoming from an object side is reflected by the optical path splitting element, enters the optical system, is reflected by the reflective surface, is emitted from the optical system toward the optical path splitting element, passes through the optical path splitting element, and then strikes on the image pickup surface.

Furthermore, in a third type of the present invention, an image pickup apparatus comprises:

an optical path splitting element;

a first optical system which includes a first variable-optical-power element and a first reflective surface being substantially immobile in a first optical axis direction and which a light flux transmitted through the optical path splitting element enters;

a second optical system which includes a second variable-optical-power element and a second reflective surface being substantially immobile in a second optical axis direction and which the light flux reflected by the optical path splitting element enters; and an image pickup surface, the optical path splitting element, the first optical system, the second optical system, and the image pickup surface being arranged so that a part of a light flux incoming from an object side passes through the optical path splitting element, enters the first optical system, is reflected by the first reflective surface, is emitted from the first optical system toward the optical path splitting element, is reflected by the optical path splitting element, and then strikes on the image pickup surface, and another part of the light flux incoming from the object side is reflected by the optical path splitting element, enters the second optical system, is reflected by the second reflective surface, is emitted from the second optical system toward the optical path splitting element, passes through the optical path splitting element, and then strikes on the image pickup surface.

Here, in the present invention, the variable-optical-power element and the reflective surface may be disposed separately, or one optical element may have both functions.

Other features and advantages of the present invention will be set forth in the description which follows, and in part will be obvious from the description. Advantages of the invention may be realized and obtained by means of the instrumentalities and combinations particularly pointed out hereinafter.

DETAILED DESCRIPTION OF THE EMBODIMENTS

Figure 1:
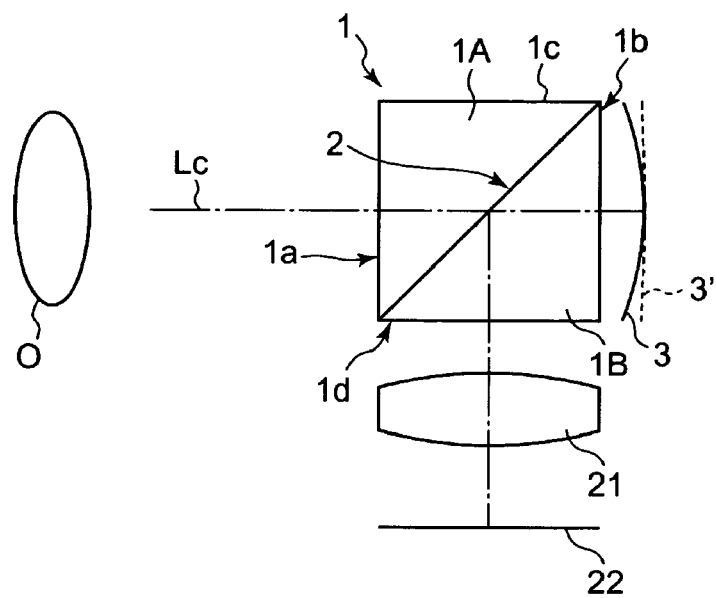
FIG. 1 is a diagram showing an image pickup apparatus in a first embodiment of the present invention.

As described above, in the first type of the present invention, an image pickup apparatus comprises: an optical path splitting element; an optical system including a variable-optical-power element and a reflective surface which are substantially immobile in an optical axis direction; and an image pickup surface. The optical path splitting element, the optical system, and the image pickup surface are arranged so that a light flux incoming from an object side passes through the optical path splitting element, enters the optical system, is reflected by the reflective surface, is emitted from the optical system toward the optical path splitting element, is reflected by the optical path splitting element, and then strikes on the image pickup surface.

In this image pickup apparatus, the optical system including the variable-optical-power element and the reflective surface can be constituted as a coaxial system. When the variable-optical-power element and the reflective surface are used in combination, the refractive power can be largely changed with a small physical or chemical change. Accordingly, the space for moving the optical element is reduced while the optical performance is maintained. Alternatively, the focal length or the focal position can be changed while eliminating the space for the movement.

Here, "substantially immobile in the optical axis direction" refers to a state in which the whole means having the corresponding function does not move along the optical axis in performing the refractive power change, the focal length change, the focal position change, focusing, zooming or the like.

As described later, a deformable mirror, a liquid crystal lens or the like is usable as the variable-optical-power element. At least a part of the reflective surface of the deformable mirror is supported by a support member, and another position on the reflective surface is slightly displaced with respect to the supported portion of the reflective surface. Accordingly, the shape of the reflective surface changes. The substantially immobile state specifically indicates that the position of the reflective surface is deformed to thereby slightly move, but the member supporting the reflective surface does not move in the optical axis direction. This also applies to the liquid crystal lens. Liquid crystals are held in a cell, and the cell does not move in the optical axis direction. It is to be noted that the member which does not move indicates that the member does not move for the purpose of performing a function of the element itself, such as the changing of the refractive power. For another purpose (e.g., to accommodate the image pickup apparatus in the body of an apparatus in which the image pickup apparatus is to be used), the whole member might move.

As the optical path splitting element, a polarized half mirror may be used. A quarter wave plate ($\lambda/4$ plate) may be disposed between the optical path splitting element and the reflective surface.

In such constitution, in a case where, for example, the polarized half mirror is used which mainly transmits P-polarized light and which reflects S-polarized light, the light flux transmitted through the polarized half mirror constitutes the P-polarized light. When the light flux passes through the $\lambda/4$ plate twice, the light flux turns to the S-polarized light, and is reflected by the polarized half mirror. As a result, the light flux incoming from the object side and passing through the polarized half mirror travels toward the image pickup surface side with a small loss in a quantity of light.

Moreover, one deformable mirror may have both of functions of the variable-optical-power element and the reflective surface. According to such constitution, the light may enter the deformable mirror while setting its optical axis to be perpendicular the deformable mirror. Therefore, there is little image deterioration that is attributable to use of the so-called eccentric optical system, and a high optical performance is easily obtained. It is also possible to utilize mirror characteristics that: any chromatic aberration is not generated; the optical power is strong as compared with the lens surface having the same shape; and any ghost is not generated in the reflective surface.

Moreover, the variable-optical-power element may be constituted of a liquid crystal lens.

According to such constitution, since the optical axis passes through the same liquid crystal lens twice, an effect of varying a refractive power is easily obtained. The refractive power changes owing to a change of the refractive index, and this is advantageous in correction of the aberration.

It is to be noted that reflecting means may be a flat mirror or a curved mirror having an optical power. The curved mirror preferably has a surface which is rotationally-symmetrical with respect to the optical axis.

Moreover, as described above, the second type of image pickup apparatus comprises: an optical path splitting element; an optical system including a variable-optical-power element and a reflective surface which are substantially immobile in an optical axis direction; and an image pickup surface.

The optical path splitting element, the optical system, and the image pickup surface are arranged so that a light flux incoming from a object side is reflected by the optical path splitting element, enters the optical system, is reflected by the reflective surface, is emitted from the optical system toward the optical path splitting element, passes through the optical path splitting element, and then strikes on the image pickup surface.

In this image pickup apparatus, as the optical path splitting element, a polarized half mirror may be used. A $\lambda/4$ plate may be disposed between the optical path splitting element and the reflective surface.

In such constitution, in a case where, for example, the polarized half mirror is used which mainly transmits P-polarized light and which reflects S-polarized light, the light flux reflected by the polarized half mirror constitutes the S-polarized light. When the light flux passes through the $\lambda/4$ plate twice, the light flux turns to the P-polarized light, and passes through the polarized half mirror. As a result, the light flux incoming from the object side and passing through the polarized half mirror travels toward the image pickup surface side with a small loss in the quantity of light.

Moreover, one deformable mirror may have both of functions of the variable-optical-power element and the reflective surface.

According to such constitution, the light may enter the deformable mirror while setting its optical axis to be perpendicular the deformable mirror. Therefore, there is little image deterioration that is attributable to use of so-called eccentric optical system, and a high optical performance is easily obtained. It is also possible to utilize mirror characteristics that: any chromatic aberration is not generated; the optical power is strong as compared with the lens surface having the same shape; and any ghost is not generated in the reflective surface.

Moreover, the variable-optical-power element may be constituted of a liquid crystal lens.

According to such constitution, the structure of the liquid crystal lens can be simplified in consideration of P-polarized or S-polarized light only. The $\lambda/4$ plate is preferably disposed between the liquid crystal lens and the reflective surface. Accordingly, the light flux can enter the liquid crystal lens in a linearly polarized state.

It is to be noted that the reflective surface may be a flat mirror or a curved mirror having an optical power. The curved mirror preferably has a surface which is rotationally-symmetrical with respect to the optical axis.

As described above, the third type of image pickup apparatus comprises:

an optical path splitting element;

a first optical system which includes a first variable-optical-power element and a first reflective surface being substantially immobile in a first optical axis direction and which a light flux transmitted through the optical path splitting element enters;

a second optical system which includes a second variable-optical-power element and a second reflective surface being substantially immobile in a second optical axis direction and which the light flux reflected by the optical path splitting element enters; and an image pickup surface.

The optical path splitting element, the first optical system, the second optical system, and the image pickup surface are arranged so that a part of a light flux incoming from an object side passes through the optical path splitting element, enters the first optical system, is reflected by the first reflective surface, is emitted from the first optical system toward the optical path splitting element, is reflected by the optical path splitting element, and then strikes on the image pickup surface, and another part of the light flux incoming from the object side is reflected by the optical path splitting element, enters the second optical system, is reflected by the second reflective surface, is emitted from the second optical system toward the optical path splitting element, passes through the optical path splitting element, and then strikes on the image pickup surface.

In this image pickup apparatus, it is possible to utilize both the light flux incoming from the object side and reflected by the optical path splitting element and the light flux incoming from the object side and transmitted through the optical path splitting element. Therefore, a loss in quantity of light can be reduced.

It is to be noted that in the first and second optical systems, the elements having lens function including the variable-optical-power elements, may have the same or different lens functions that are exerted on the light fluxes.

In this image pickup apparatus, as the optical path splitting element, a polarized half mirror may be used. A first $\lambda/4$ plate may be disposed between the optical path splitting element and the first reflective surface, and a second $\lambda/4$ plate may be disposed between the optical path splitting element and the second reflective surface.

In such constitution, in a case where, for example, the polarized half mirror is used which mainly transmits P-polarized light and which reflects S-polarized light, the light flux incoming from the object side and transmitted through the polarized half mirror constitutes the P-polarized light. When the light flux passes through the $\lambda/4$ plate twice, the light flux turns to the S-polarized light, and is reflected by the polarized half mirror. The light flux incoming from the object side and reflected by the polarized half mirror constitutes the S-polarized light. When the light passes through the $\lambda/4$ plate twice, the light turns to the P-polarized light, and passes through the polarized half mirror. Accordingly, the light flux incoming from the object side travels toward the image pickup surface side with a small loss in quantity of light.

Moreover, at least one of the first variable-optical-power element and the second variable-optical-power element may be constituted of a deformable mirror. Moreover, the deformable mirror may have both of functions of the optical path splitting element and the reflective surface.

According to such constitution, the light flux may enter the deformable mirror while setting its optical axis to be perpendicular the deformable mirror. Therefore, there is little image deterioration that is attributable to use of so-called eccentric optical system, and a high optical performance is easily obtained. It is also possible to utilize mirror characteristics that: any chromatic aberration is not generated; an optical power is strong as compared with a lens surface having the same shape; and any ghost is not generated in the reflective surface.

Moreover, at least one of the first variable-optical-power element and the second variable-optical-power element may be constituted of a liquid crystal lens.

According to such constitution, since the optical axis passes through the same liquid crystal lens twice, an effect of varying a refractive power is easily obtained. The refractive power changes owing to the change of the refractive index, and this is advantageous in correction of the aberration.

Furthermore, in a case where the refractive index is changed by controlling the voltage, it is comparatively easy to match characteristics of the change of the lens function of the first optical system with those of the second optical system.

It is to be noted that reflecting means may be a flat mirror or a curved mirror having an optical power. The curved mirror preferably has a surface which is rotationally-symmetrical with respect to the optical axis.

Moreover, the variable-optical-power element may be constituted of a liquid crystal lens, and disposed between the optical path splitting element and the $\lambda/4$ plate.

Accordingly, the light quantity loss can be reduced.

Furthermore, the variable-optical-power element may be constituted of a liquid crystal lens, and disposed between the $\lambda/4$ plate and the reflective surface. A polarization plate may be disposed between the $\lambda/4$ plate and the liquid crystal lens, and the polarization plate may be disposed so as to maximize the quantity of the light flux emitted from the $\lambda/4$ plate and transmitted through the polarization plate.

In consequence, the light quantity loss can be comparatively reduced. The polarization direction of the light flux transmitted forward through the liquid crystal lens is the same as the polarization direction of the light flux transmitted backward through the liquid crystal lens, and an effect produced by the change of the refractive power with respect to the light flux is stabilized. It is to be noted that the variable-optical-power element is preferably disposed so that the polarization direction in which the refractive power of the liquid crystal lens changes agrees with that of the light flux transmitted through the liquid crystal lens.

Furthermore, the variable-optical-power element may change the refractive power to adjust a focal position.

In consequence, it is possible to save the space required for focusing along an optical axis, and a lens holding structure can be simplified.

In addition, the variable-optical-power element may change the refractive power to thereby change the angle of field.

According to such constitution, the space required for zooming along the optical axis can be saved. A constitution is possible in which less lens units move along the optical axis, and the lens holding structure can be simplified.

Moreover, the rear focal position of the first optical system may be the same as that of the second optical system.

Accordingly, since the lens function of the first optical system is the same as that of the second optical system, the performance can be less deteriorated.

Furthermore, the rear focal position of the first optical system may be different from that of the second optical system.

According to such constitution, it is possible to obtain an effect which cannot be produced in an optical system having a single optical axis. For example, a low pass filter effect is obtained without separately disposing any low pass filter, and an effect of saving the space can be obtained. When the depth of field is increased, burdens on auto-focusing can be reduced.

It is to be noted that the low pass filter effect required for an electronic image pickup apparatus differs with the pixel size of the electronic image sensor. In a case where the image sensor having a different pixel size is incorporated, the rear focal positions of the first and second optical systems can be adjusted to obtain the necessary low pass filter effect.

Furthermore, the rear focal position of the first optical system may be different from that of the second optical system in the optical axis direction.

According to such constitution, blur (circle of confusion) can be formed into a circular shape or an approximately circular shape, and a high-quality low pass filter effect can be obtained.

In addition, the first and second optical systems have an aperture diaphragm having a variable aperture. In this case, the refractive power of at least one of the first and second variable-optical-power elements may be changed so that the distance between the rear focal point of the first optical system and that of the second optical system changes in response to the change of the numerical aperture determined by the aperture diaphragm.

According to such constitution, the low pass filter effect can be changed in accordance with the change of the numerical aperture of the optical system. Even when the aperture size of the aperture diaphragm is changed to change the numerical aperture, the distance between the rear focal position of the first optical system and that of the second optical system can be changed to maintain the required low pass filter effect.

It is to be noted that in a case where the low pass filter effect is not required, the refractive power of the variable-optical-power element can be changed so that the rear focal position of the first optical system agrees with that of the second optical system. Accordingly, resolution can be improved. Even in a case other than the case where the change of the numerical aperture is followed in this manner, the low pass filter effect can be changed.

Moreover, the optical path splitting element may be formed on a cementing surface of a beam splitter.

According to such constitution, flare or the like generated from the optical path splitting element is effectively reduced, and dirt is effectively prevented. There is another effect of protecting a reflective film.

Furthermore, the incidence surface of the light flux from the object onto the beam splitter may be a lens surface. The surface of the beam splitter from which the light exits toward the image pickup surface may be a lens surface. The surface of the beam splitter from which the light exits toward the reflective surface may be a lens surface.

In consequence, the performance of the whole optical system can be improved.

Moreover, a lens unit may be disposed on the object side of the optical path splitting element.

Accordingly, it is possible to increase a variety of specifications which can be achieved by the whole optical system.

In this case, the lens unit may have a negative power. Accordingly, especially in the wide angle lens, it is possible to miniaturize a unit including the optical path splitting element, the variable-optical-power element, and the reflective surface.

Furthermore, the lens unit may have a positive power. Accordingly, it is possible to reduce the load of the optical power with respect to the unit including the optical path splitting element, the variable-optical-power element, and the reflective surface. Especially in the telephoto lens, it is possible to miniaturize the unit including the optical path splitting element, the variable-optical-power element, and the reflective surface.

In addition, the lens unit may have a sub-unit which is movable along at least one optical axis. In this case, when the lens unit is provided with a part of a focusing function, and the lens unit is used to perform focusing and zooming, with the optical path splitting element, the variable-optical-power element, and the reflective surface, a wide variety of optical specifications can be achieved. Alternatively, the lens unit may be entirely loaded with the focusing function, and the optical path splitting element, the variable-optical-power element, and the reflective surface may perform the zooming.

Moreover, the lens unit may be a variable-focal-length optical system.

Accordingly, the unit including the optical path splitting element, the variable-optical-power element, and the reflective surface is usable as means for adjusting an exit pupil. The lens unit and the unit including the optical path splitting element, the variable-optical-power element, and the reflective surface can achieve a wide variety of optical specifications to perform the zooming and the focusing.

Furthermore, the lens unit may be disposed on the image pickup surface side of the optical path splitting element.

Accordingly, a variety of specifications achievable by the whole optical system can be broadened.

In addition, the lens unit may have a positive power.

Accordingly, it is possible to reduce a burden of power on the unit including the optical path splitting element, the variable-optical-power element, and the reflective surface.

Moreover, the lens unit may have a sub-unit which is movable along at least one optical axis.

Accordingly, when this lens unit performs the focusing, and optical path splitting element, variable-optical-power element, and reflective surface are combined to perform the zooming, a wide variety of optical specifications can be achieved. Alternatively, the lens unit may be loaded with the whole focusing function, and the optical path splitting elements, the variable-optical-power element, and the reflective surface may perform the zooming.

Furthermore, the lens unit may be a variable-focal-length optical system. In this case, the lens unit may be loaded with a part of the focusing function, and the optical path splitting element, the variable-optical-power element, and the reflective surface are combined to perform the focusing and the zooming, so that a wide variety of optical specifications can be achieved. Alternatively, the lens unit may be loaded with the whole focusing function, and the optical path splitting element, the variable-optical-power element, and the reflective surface may perform the zooming.

In addition, the polarization plate may be disposed between the optical path splitting element and the reflective surface, and the polarization plate may be rotatable around each optical axis.

According to such constitution, the polarization plate can be rotated to adjust the quantity of light.

Moreover, the polarization plate may be rotated to adjust exposure.

In a case where the diameter of the aperture of the aperture diaphragm or the like is changed to change the numerical aperture and adjust the quantity of light, when the numerical aperture is reduced, image quality deteriorates due to diffraction. However, when the polarization plate is used, such disadvantage is not recognized. In a case where an ND filter (Neutral Density filter) is inserted and retreated, there is a restriction on a quantity of light, which is to be substantially changed. Moreover, the space for retreating the ND filter is required. However, when the polarization plate is used, such disadvantage is not recognized.

It is to be noted that the aperture diaphragm may be combined with the polarization plate for use.

Embodiments of the present invention will be described hereinafter with reference to the drawings. In the drawing of each embodiment, an element shown as a single positive or negative lens can be replaced with a lens system including a combination of positive and/or negative lenses if necessary. This also applies to a case where the shown single lens element moves along an optical axis.

First Embodiment

FIG. 1 shows the first embodiment of the present invention. As shown in FIG. 1, this image pickup apparatus includes: a prism element 1 constituted of two prisms 1A, 1B cemented onto each other with a half mirror 2 sandwiched therebetween; a deformable mirror 3; a lens system 21; and an image sensor. In FIG. 1, as to the image sensor, an image pickup surface 22 only is shown. In addition, although not shown, an aperture diaphragm, an optical low pass filter and the like may be included. In FIG. 1, reference numeral 3' shows the state before the shape of the deformable mirror 3 is changed.

The half mirror 2 functions as the optical path splitting element. The deformable mirror 3 functions as the variable-optical-power element, and also functions as the reflective surface. That is, changing of a refractive power and reflecting of light are achieved by the deformable mirror which is a single optical element.

Each of two prisms 1A, 1B constituting the prism element 1 is a rectangular prism made of a triangle pole having a substantially right-angled isosceles triangle section. The prism element 1 preferably has a structure in which the half mirror 2 is formed on an oblique surface (surface that does not form the dihedral angle of 90 degrees) of one of the prisms 1A, 1B, and these prisms 1A, 1B are closely attached to each other. Here, the substantially right-angled isosceles triangle section means that a shape partially changed from right-angled isosceles triangle for the purpose of facilitating the attaching of the prisms 1A, 1B to a holding frame is also included.

A light flux emitted from the object O strikes on the surface 1a of the prism element 1. The surface 1a is one of surfaces that form the dihedral angle, that is, the inner angle of the substantially right-angled isosceles triangle section. The light flux which has struck on the surface 1a passes through the half mirror 2, and exits from the surface 1b. The surface 1a is preferably parallel to the surface 1b. The light flux emitted from the surface 1b is represented by the deformable mirror 3, and again strikes on the surface 1b.

The light flux which has struck on the surface 1b is reflected by the half mirror 2, and exits from a surface 1d. The deformable mirror 3 is a mirror whose reflective surface can be deformed, and an optical power of the reflective surface is changed by the deformation. The light flux emitted from the surface 1d is further refracted by the lens system 21, and reaches the image pickup surface 22. An image of the object is formed on the image pickup surface 22. A structure of the deformable mirror 3 will be described later.

It is to be noted that in a case where the only optical power of the deformable mirror 3 is sufficient for forming the image, the lens system 21 may be omitted.

The deformable mirror 3 is substantially immobile in an optical axis direction.

Here, the "substantially immobile state in the optical axis direction" refers to a state in which the whole means having the corresponding function does not move along an optical axis in performing a refractive power change, a focal length change, a focal position change, focusing, zooming or the like.

The shape of the reflective surface of the deformable mirror 3 is rotationally-symmetrical about a reference axis (optical axis Lc). Therefore, since any aberration asymmetrical with respect to the optical axis is not generated, it becomes easy to form a surface, measure the surface, or complement the aberrations of the deformable mirror with the aberration of another lens such as the lens system 21. Since any chromatic aberration is not generated, the constitution of the lens system 21 or the like can be simplified. The optical system including the prism element 1, the deformable mirror 3, and the lens system 21 is a so-called coaxial optical system.

It is to be noted that transmittance of the half mirror 2 is approximately of the same degree as reflectance. In this case, the quantity of light which is to exit from the surface 1d is about 25% of that of light which is to strike on the surface 1a. About 50% of the light exits from the surface 1c on an opposite side of the surface 1d, and about 25% of the light exits from the surface 1a.

Photo sensing may be performed for automatic exposure control (AE), automatic focus adjustment (AF) or the like by use of the light flux exiting from the surface 1c. A sectional shape of the prism 1A including the surface 1a does not have to be a right-angled isosceles triangular shape as long as the surface 1a forms an angle of about 45° with respect to the surface of the half mirror 2. Therefore, the shape of the prism 1A can be changed or the surface of the prism may be treated in order to prevent the whole optical system from being adversely affected by the light flux emitted from the surface 1a and reflected by the half mirror 2, or advantageously perform photo sensing or the like. Examples of such treatment as to prevent the whole optical system from being adversely affected include: inner surface reflection preventing means or the like for preventing the light flux incoming from the surface 1a and reflected by the half mirror 2 from being reflected by an inner surface of the prism; and means for reducing the quantity of light emitted from the surface 1d to reach the lens system 21 or the image pickup surface 22 among the light flux reflected by the inner surface.

The deformable mirror 3 is deformed by a function of electricity, magnetism or the like, and the lens function of the surface 1b with respect to the light flux is changed. That is, it is possible to change a relation between incident light upon the deformable mirror 3 and light reflected from the deformable mirror 3. The changed shape of the mirror may continuously be retained in an arbitrary position in the range of deformation, or the shape that can be retained may be non-continuous. The focus adjustment or the like is preferably performed by changing the lens function. As described later, zooming may be performed together with moving of another lens system.

Second Embodiment

Figure 2:
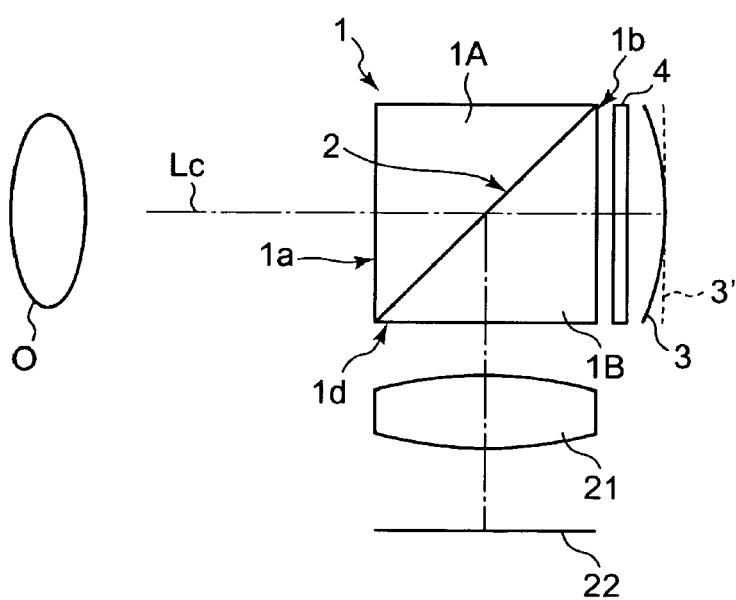
FIG. 2 is a diagram showing a second embodiment.

FIG. 2 is a diagram showing the second embodiment of the present invention. As shown in FIG. 2, this image pickup apparatus includes: a prism element 1 constituted of two prisms 1A, 1B cemented onto each other with a half mirror 2 sandwiched therebetween in the same manner as in FIG. 1; a deformable mirror 3; a lens system 21; and an image sensor. A layout of these components is similar to that of the components of FIG. 1. It is to be noted that as to the image sensor, in FIG. 2, an image pickup surface 22 only is shown. The half mirror 2 functions as an optical path splitting element. The deformable mirror 3 functions as a variable-optical-power element, and also functions as a reflective surface.

In the present embodiment, the half mirror 2 is a polarized half mirror (hereinafter referred to also as the polarized half mirror 2), and a quarter wave plate (λ/4 plate) 4 is disposed between the surface 1b and the deformable mirror 3. In addition, an aperture diaphragm, a low pass filter and the like may be included in the same manner as in FIG. 1, although not shown.

An example of the polarized half mirror 2 is described in Japanese Patent Application Laid-Open No. 6-337306.

Figure 3:
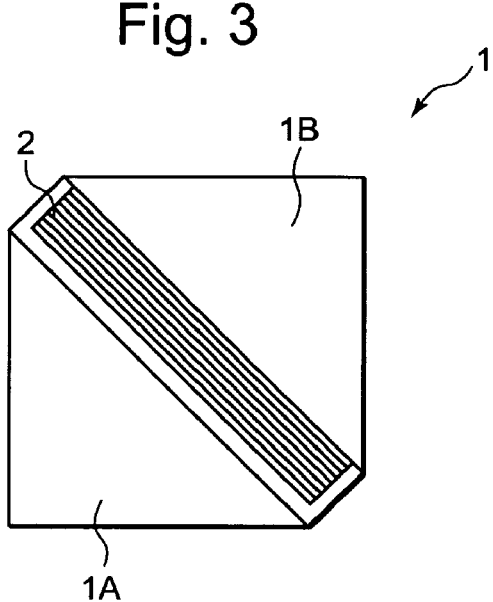
FIG. 3 is a sectional view schematically showing a constitution of a polarized beam splitter.

For example, as shown in FIG. 3, the polarized half mirror 2 for use in the present embodiment has a structure in which the half mirror 2 is formed on an oblique surface of the prism 1A made of S-BSL7 (a glass material described in the optical glass catalog of OHARA INC.), and the prism 1B having the same shape is cemented by an adhesive. The half mirror 2 is a multi-layer thin film that is formed of ZT 1 (a material obtained by mixing ZrO2 and TaO5 at a weight ratio of 9:1, and having a refractive index of 2.05) used in the odd-numbered layers and SiO2 used in the even-numbered layers. The thicknesses of the layers for four examples are given in Table 1.

TABLE 1

| | Film pressure | | | |
|---|---|---|---|---|
| | Example 1 | Example 2 | Example 3 | Example 4 |
| First layer | 0.75λ | 0.72λ | 1.10λ | 0.96λ |
| Second layer | 0.87λ | 0.84λ | 1.10λ | 1.00λ |
| Third layer | 0.87λ | 0.84λ | 0.90λ | 0.87λ |
| Fourth layer | 1.33λ | 1.30λ | 1.36λ | 1.35λ |
| Fifth layer | 1.06λ | 1.03λ | 1.09λ | 1.05λ |
| Sixth layer | 1.37λ | 1.34λ | 1.40λ | 1.39λ |
| Seventh layer | 1.13λ | 1.10λ | 1.16λ | 1.15λ |
| Eighth layer | 1.67λ | 1.64λ | 1.70λ | 1.68λ |
| Ninth layer | 1.65λ | 1.62λ | 1.68λ | 1.66λ |
| Tenth layer | 1.43λ | 1.40λ | 1.46λ | 1.42λ |
| Eleventh layer | 1.90λ | 1.87λ | 1.93λ | 1.89λ |
| Twelfth layer | 2.02λ | 1.99λ | 2.05λ | 2.01λ |

λ= 550.4 nm

Next, there will be described a procedure for manufacturing the polarized half mirror 2. First, the prism substrate 1A made of S-BSL7 glass is set in a vacuum evaporation device, the substrate temperature is set at 300° C., and the device is evacuated until the vacuum degree reaches $1 \times 10^{-5}$ Torr. To form the first layer, an O2 gas is introduced until the vacuum degree reaches $1 \times 10^{-4}$ Torr in the vacuum deposition device, and ZT1 is deposited using an electron gun so that the film thickness of ZT1 indicates the value of Table 1. To form the second layer, the introduction of the O2 gas is stopped, and SiO2 is deposited in usual vacuum deposition so that the film thickness indicates the value of Table 1. A similar process is thereafter repeated to vacuum-deposit 12 layers in total. After completing all the vacuum deposition, the layers are sufficiently cooled, and the prism 1A is taken out and cemented to the glass prism 1B made of S-BSL7 having the same shape, which is not subjected to the vacuum deposition.

Figure 4:
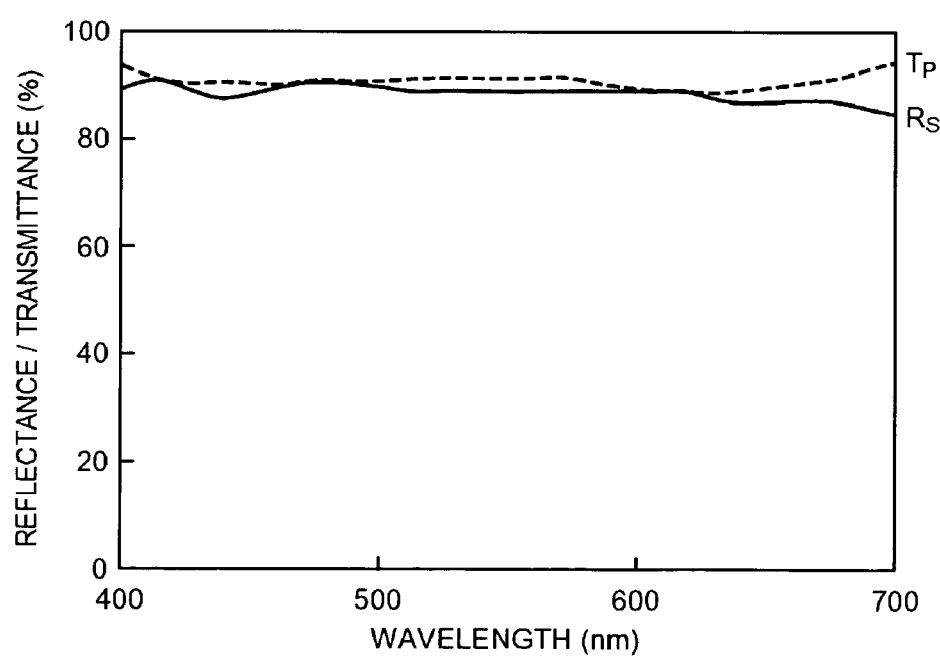
FIG. 4 is a diagram showing optical characteristics of the polarized beam splitter of FIG. 3.

FIG. 4 shows optical characteristics of the polarized half mirror 2 obtained in this manner. In FIG. 4, Tp denotes a transmittance of the polarized half mirror 2 with respect to the P-polarized component, and Rs denotes a reflectance with respect to the S-polarized component. It is to be noted that a half mirror other than the half mirror 2 illustrated herein may be used.

A light flux emitted from an object strikes on the surface 1a of the prism element 1. The surface 1a is one of the surfaces which form a right angle of the right-angled isosceles triangle. The P-polarized component of the light flux which has struck on the surface 1a passes through the half mirror 2, and exits from the surface 1b. The light flux emitted from the surface 1b is reflected by the deformable mirror 3, and strikes on the surface 1b again. At this time, the light flux reciprocates through the λ/4 plate 4, and is converted into the S-polarized component. The light flux which has struck on the surface 1b again is reflected by the half mirror 2, and exits from the surface 1d.

In a case where the optical power of the deformable mirror 3 is insufficient for forming an image, the light flux emitted from the surface 1d is converged by a lens function of the lens system 21 to reach the image pickup surface 22. Since the polarized half mirror 2 has such characteristics as to transmit P-polarized light and reflect S-polarized light, the light flux which has struck on the surface 1b again is reflected by the polarized half mirror 2, so that use efficiency of the light is improved.

It is to be noted that in the same manner as in the first embodiment, the sectional shape of the prism 1A having the surface 1a is not limited to the right-angled isosceles triangle as long as the surface 1a has an angle of 45° with respect to the surface of the polarized half mirror 2. Therefore, the shape of the prism 1A may be changed, or the surface of the prism may be treated in order to prevent the whole optical system from being adversely affected by the light flux incoming from the surface 1a and reflected by the half mirror 2, or to advantageously perform sensing or the like. Examples of such treatment as to prevent the whole optical system from being adversely affected include: inner surface reflection preventing means or the like for preventing the light flux incoming from the surface 1a and reflected by the polarized half mirror 2 from being reflected by an inner surface of the prism; and means for reducing a quantity of light emitted from the surface 1d to reach the lens system 21 or the image pickup surface 22 among the light flux reflected by the inner surface.

The deformable mirror 3 is deformed by a function of electricity, magnetism or the like, and the lens function of the surface 1b with respect to the light flux can be changed. The changed shape of the mirror may continuously be retained in an arbitrary position in the range of deformation, or the shape that can be retained may be non-continuous. The focus adjustment or the like is preferably performed by changing the lens function. As described later, zooming may be performed together with moving of another lens system.

Third Embodiment

Figure 5:
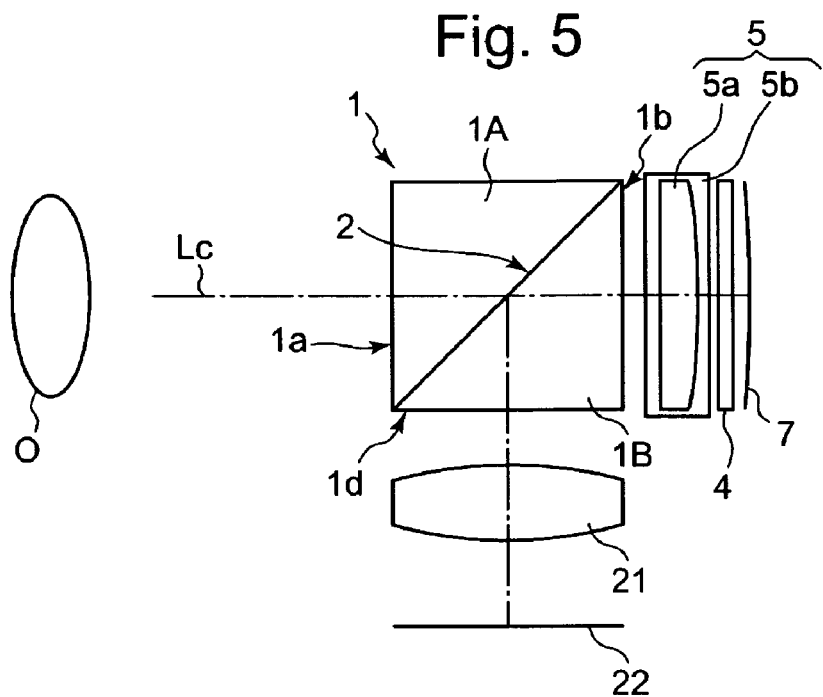
FIG. 5 is a diagram showing a third embodiment.

FIG. 5 is a diagram showing the third embodiment of the present invention. As shown in FIG. 5, this image pickup apparatus includes: a prism element 1 constituted of two prisms 1A, 1B cemented onto each other with a polarized half mirror 2 sandwiched therebetween in the same manner as in FIG. 2; a liquid crystal lens 5; a reflective surface 7; a λ/4 plate 4 disposed between the liquid crystal lens 5 and the reflective surface 7; a lens system 21; and an image sensor. A layout of these components is similar to that of the components of FIG. 1. It is to be noted that as to the image sensor, in FIG. 5, an image pickup surface 22 only is shown. The half mirror 2 functions as the optical path splitting element. The liquid crystal lens 5 functions as the variable-optical-power element. The liquid crystal lens 5 is constituted of, for example, a nematic liquid crystal 5a and a cell 5b which supports the liquid crystal having a convex shape.

In addition, an aperture diaphragm, a low pass filter and the like may be included as in FIG. 1, although not shown in FIG. 5.

A light flux emitted from a substrate strikes on the surface 1a of the prism element 1. The surface 1a is one of surfaces which form a right angle of the right-angled isosceles triangle. A P-polarized component of the light flux which has struck on the surface 1a passes through the polarized half mirror 2, and exits from the surface 1b. The light flux emitted from the surface 1b undergoes a lens function of the liquid crystal lens, and passes through the λ/4 plate 4. The light flux is reflected by the reflective surface 7, and passes through the λ/4 plate 4 again. When the light reciprocates through the λ/4 plate 4, P-polarized light is converted into S-polarized light. Thereafter, the light enters the liquid crystal lens 5 again.

In the present embodiment, the liquid crystal lens 5 has different lens functions with respect to the P-polarized light and the S-polarized light. That is, among the incident light, the P-polarized light is transmitted, but the lens has a refractive function with respect to the S-polarized light. In the present embodiment, the P-polarized light reciprocated through the λ/4 plate 4 is converted into the S-polarized light. Therefore, when the light flux re-enters the liquid crystal lens, the light flux undergoes a lens function different from that at a time when the light flux first enters the lens. Thereafter, the light flux strikes on the surface 1b again. At this time, the light flux reciprocates the λ/4 plate 4, and is converted into the S-polarized light as described above. The light flux which has struck on the surface 1b again is reflected by the polarized half mirror 2, and exits from the surface 1d. In a case where the optical power of the liquid crystal lens 5 is insufficient for forming an image, the light flux emitted from the surface 1d is converged by a lens function of the lens system 21 to reach the image pickup surface 22.

Since the polarized half mirror 2 has such characteristics as to transmit P-polarized light and reflect S-polarized light, most of the light that has struck on the surface 1b again is reflected by the polarized half mirror 2, so that use efficiency of the light is improved. It is to be noted that in the same manner as in the first embodiment, the sectional shape of the prism 1A having the surface 1a is not limited to the right-angled isosceles triangle as long as the surface 1a has an angle of about 45° with respect to the surface of the polarized half mirror 2. Therefore, there can be disposed: inner surface reflection preventing means or the like for preventing the light flux incoming from the surface 1a and reflected by the polarized half mirror 2 from being reflected by an inner surface of the prism; or means for reducing the quantity of light emitted from the surface 1d to reach the lens system 21 or the image pickup surface 22 among the light flux reflected by the inner surface.

The refractive index of the liquid crystal lens 5 is changed by a function of electricity, magnetism or the like, and the lens function of the liquid crystal lens 5 with respect to the light flux emitted from the surface 1b can be changed. A value of the refractive index may continuously be retained at an arbitrary refractive index value in the range of deformation, or the refractive index value that can be retained may be non-continuous. The focus adjustment or the like is preferably performed by changing the lens function. As described later, zooming may be performed together with moving of another lens system.

It is to be noted that the λ/4 plate 4 may be disposed between the surface 1b and the liquid crystal lens 5 as long as there is not any practical problem. In this case, the light flux undergoes a lens function of the liquid crystal lens 5 having similar optical characteristics while the light flux reciprocates.

Moreover, in the first to third embodiments, examples of the inner surface reflection preventing means include: a process of coating, with a matt coating material, the surface which is to be prevented from being reflected by the inner surface; and a process of working, into a rough surface, the surface which is to be prevented from being reflected by the inner surface by sanding or the like, and coating the surface with the black coating material.

Fourth to Sixth Embodiments

In image pickup apparatuses of the fourth to sixth embodiments, a reflective surface or the like is disposed on the reflection side of a half mirror 2 in each of the image pickup apparatuses of the first to third embodiments.

Figure 6:
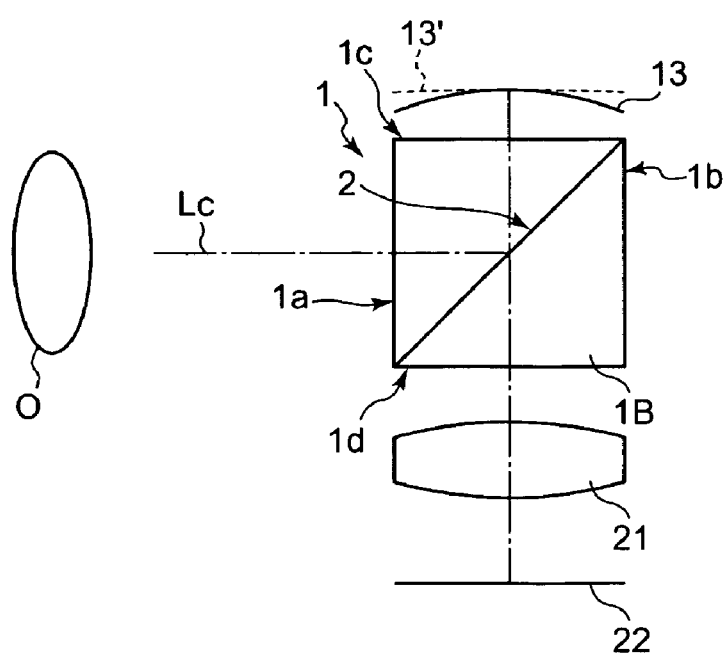
FIG. 6 is a diagram showing a fourth embodiment.

FIG. 6 is a diagram showing the fourth embodiment. In this image pickup apparatus, a deformable mirror 13 is disposed on the reflection side of the half mirror 2 instead of the deformable mirror 3 of the image pickup apparatus of the first embodiment.

Figure 7:
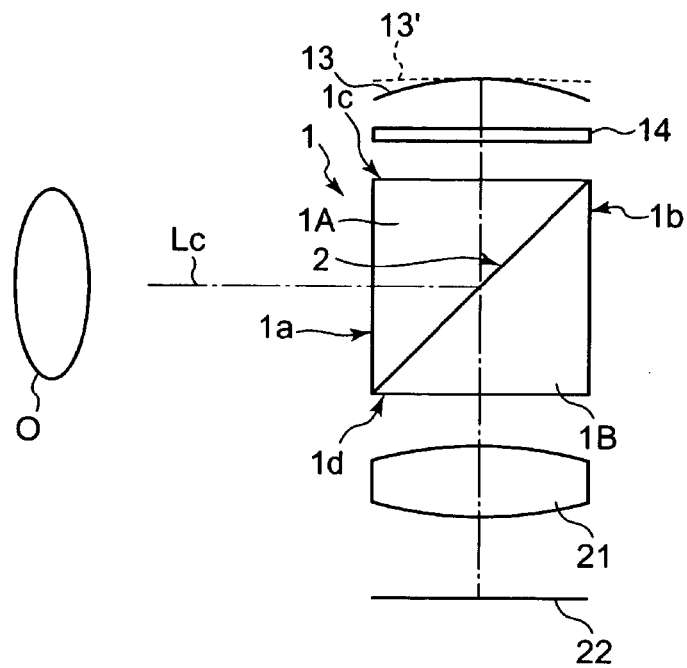
FIG. 7 is a diagram showing a fifth embodiment.

FIG. 7 is a diagram showing the fifth embodiment. In this image pickup apparatus, a deformable mirror 13 and a λ/4 plate 14 are disposed on the reflection side of the polarized half mirror 2 instead of the deformable mirror 3 and the λ/4 plate 4 of the image pickup apparatus of the second embodiment.

Figure 8:
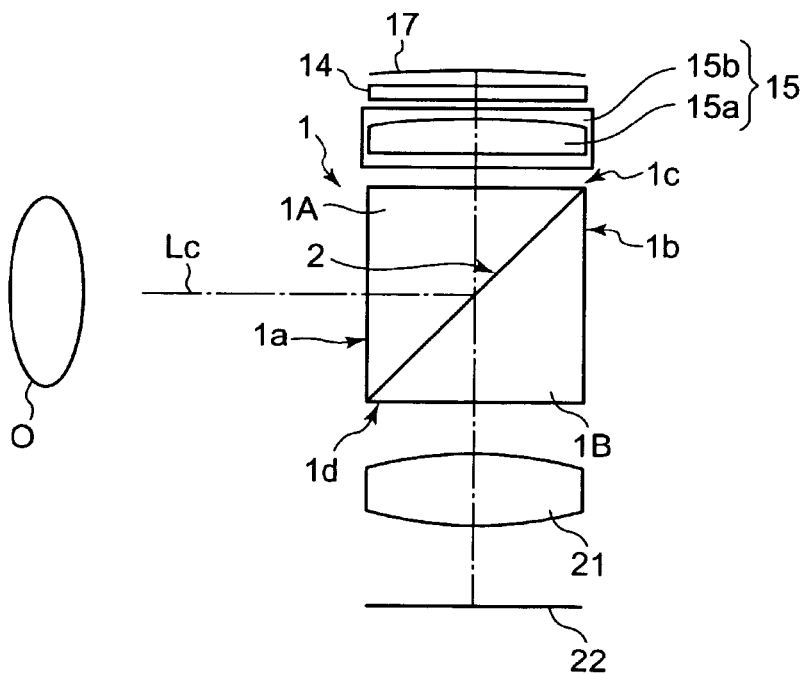
FIG. 8 is a diagram showing a sixth embodiment.

FIG. 8 is a diagram showing the sixth embodiment. In this image pickup apparatus, a λ/4 plate 14, a liquid crystal lens 15, and a reflective surface 7 are disposed on the reflection side of a polarized half mirror 2 instead of the reflective surface 7, the λ/4 plate 4, the liquid crystal lens 5, and the reflective surface 7 of the image pickup apparatus of the third embodiment.

Here, the fifth embodiment will be representatively described with reference to FIG. 7. There will be described a positional relation and functions of constituting elements in accordance with the flow of the light flux from an object to the image pickup surface 22.

The light flux emitted from the object strikes on the surface 1a of the prism element 1. The surface 1a is one of surfaces which form the right angle of the right-angled isosceles triangle. The S-polarized component of the light flux which has struck on the surface 1a is reflected by the polarized half mirror 2, and exits from the surface 1c. The light flux emitted from the surface 1c is reflected by the deformable mirror 13, and strikes on the surface 1c again. At this time, the light flux reciprocates through the λ/4 plate 14, and is converted into the P-polarized component. In FIG. 7, reference numeral 13' denotes a state of the deformable mirror 13 before deformed.

The light flux which has struck on the surface 1c again passes through the polarized half mirror 2, and exits from the surface 1d. In a case where the optical power of the deformable mirror 13 is insufficient for forming an image, the light flux emitted from the surface 1d is converged by the lens function of the lens system 21 to reach the image pickup surface 22. The polarized half mirror 2 has such characteristics as to transmit P-polarized light and reflect S-polarized light. Therefore, most of the light that has struck on the surface 1c again is reflected by the polarized half mirror 2, and use efficiency of the light is improved. It is to be noted that the sectional shape of the prism 1B including the surface 1d is not limited to a right-angled isosceles triangle as long as the surface 1d has an angle of about 45° with respect to the surface of the half mirror 2. The shape of the prism 1B may be changed, or the surface of the prism may be treated in order to prevent the whole optical system from being adversely affected by the light flux incoming from the surface 1a and transmitted through the polarized half mirror 2, or to advantageously perform photo sensing or the like. Examples of such treatment as to prevent the whole optical system from being adversely affected include: inner surface reflection preventing means or the like for preventing the light flux incoming from the surface 1a and reflected by the polarized half mirror 2 from being reflected by an inner surface of the prism; and means for reducing the quantity of light emitted from the surface 1d to reach the lens system 21 or the image pickup surface 22 among the light flux reflected by the inner surface.

The deformable mirror 3 is deformed by a function of electricity, magnetism or the like, and the lens function of the surface 1b with respect to the light flux can be changed. The changed shape of the mirror may continuously be retained in an arbitrary position in the range of deformation, or the shape that can be retained may be non-continuous. The focus adjustment is preferably performed by changing the lens function. As described later, zooming may be performed together with moving of another lens system.

It is to be noted that in the fourth embodiment, as shown in FIG. 6, the λ/4 plate 14 is not disposed, and the half mirror 2 is a half mirror which does not have any polarization characteristic in the same manner as in the first embodiment.

In the sixth embodiment, as shown in FIG. 8, a liquid crystal lens 15 and a reflective surface 17 are used instead of the deformable mirror 13. The liquid crystal lens 15 is constituted of, for example, a nematic liquid crystal 15a and a cell 15b which holds the liquid crystal having a convex shape.

Seventh Embodiment

Figure 9:
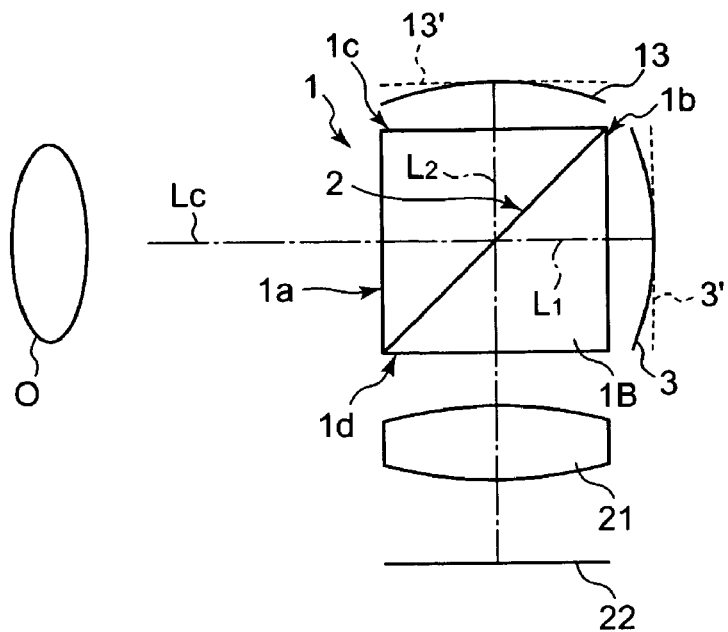
FIG. 9 is a diagram showing a seventh embodiment.

FIG. 9 is a diagram showing the seventh embodiment. This image pickup apparatus includes: a prism element 1 constituted of two prisms 1A, 1B cemented onto each other with a half mirror 2 sandwiched therebetween in the same manner as in FIG. 1; a first deformable mirror 3; a second deformable mirror 13; a lens system 21; and an image sensor. Reference numeral 22 is an image pickup surface of the image sensor. In addition, if necessary, an aperture diaphragm, a low pass filter and the like may be included although not shown. Each of the first and second deformable mirrors 3, 13 functions as a variable-optical-power element, and also functions as a reflective surface.

A light flux emitted from an object strikes on the surface 1a of the prism element 1. The light flux which has struck on the surface 1a is split into a first light flux which passes through the half mirror 2 (a part of the light flux incoming from an object side) and a second light flux reflected by the half mirror 2 (another part of the light flux incoming from the object side).

The first light flux travels along the first optical axis L1, and exits from the surface 1b. The first light flux emitted from the surface 1b is reflected by the deformable mirror 3, travels along the first optical axis L1, and strikes on the surface 1b again. The first light flux which has struck on the surface 1b again is reflected by the half mirror 2, and exits from the surface 1d.

The second light flux travels along the second optical axis L2, and exits from the surface 1c. The second light flux emitted from the surface 1c is reflected by the deformable mirror 13, travels along the second optical axis L2, and strikes on the surface 1c again. The second light flux which has struck on the surface 1c again passes through the half mirror 2, and is superimposed on the first light flux again. The light flux exits from the surface 1d.

In a case where optical powers of the deformable mirrors 3, 13 are insufficient for forming an image, the light flux emitted from the surface 1d further undergoes a lens function of the lens system 21, and is converged to reach the image pickup surface 22.

It is to be noted that the transmittance of the half mirror 2 is preferably set to be of the same degree as the reflectance. In this case, the quantity of light to be emitted from the surface 1d is about 50% of that of light which has struck on the surface 1a. About 50% of the quantity of light also exits from the surface 1a.

The first deformable mirror 3 and the second deformable mirror 13 are substantially immobile in the first optical axis direction and the second optical axis direction, respectively, and the mirrors are deformed by a function of electricity, magnetism or the like. Therefore, lens functions of these surfaces 1b, 1c with respect to the light flux can be changed. The changed shape of the mirror may continuously be retained in an arbitrary position in the range of deformation, or the shape that can be retained may be non-continuous. The shape of the first deformable mirror 3 may be matched with that of the second deformable mirror 13, the mirrors may be similarly deformed, and focus adjustment is preferably performed by changing the lens function. Moreover, zooming may be performed together with moving of another lens system as described later. The shape of the first deformable mirror 3 may be set to be different from that of the second deformable mirror 13 to thereby produce a low pass filter effect as described later.

Eighth Embodiment

Figure 10:
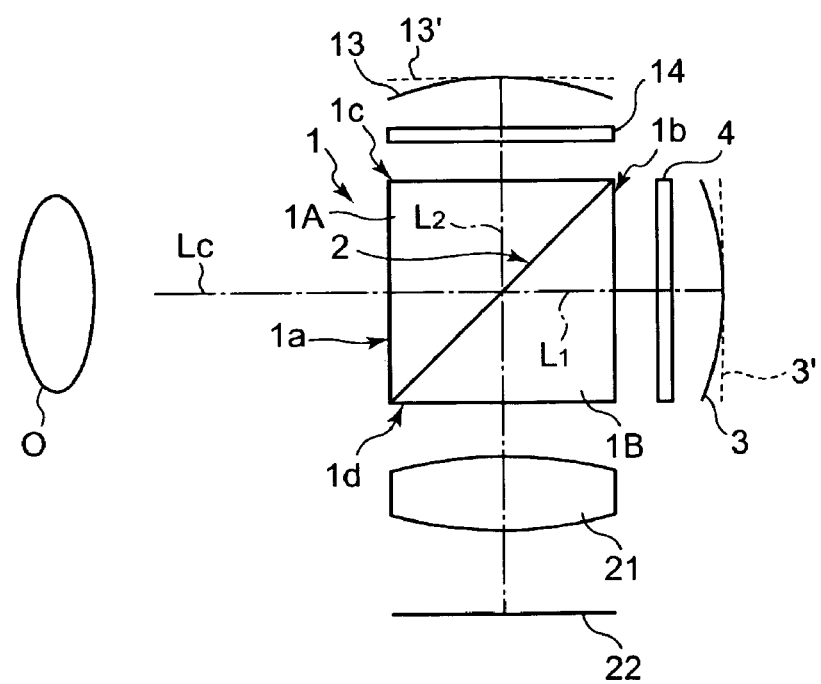
FIG. 10 is a diagram showing an eighth embodiment.

FIG. 10 is a diagram showing the eighth embodiment. This image pickup apparatus includes: a prism element 1 constituted of two prisms 1A, 1B laminated onto each other with a polarized half mirror 2 as an optical path splitting element being sandwiched therebetween in the same manner as in FIG. 2; a first deformable mirror 3; a first λ/4 plate 4; a second deformable mirror 13; a second λ/4 plate 14; a lens system 21; and an image sensor. Reference numeral 22 is an image pickup surface of the image sensor. In addition, although not shown, an aperture diaphragm, a low pass filter and the like may be disposed if necessary.

A light flux emitted from an object strikes on the surface 1a of the prism element 1. The P-polarized component of the light flux which has struck on the surface 1a travels along the first optical axis L1, passes through the polarized half mirror 2, and exits from the surface 1b as a first light flux. The S-polarized component of the light flux which has struck on the surface 1a turns to a second light flux in the polarized half mirror 2, travels along a second optical axis L2, and exits from the surface 1c.

The first light flux emitted from the surface 1b passes through the first λ/4 plate 4, and is reflected by the first deformable mirror 3. The light flux passes through the first λ/4 plate 4 again. At this time, the first light flux is converted into S-polarized light, because the light flux reciprocates the first λ/4 plate 4. Thereafter, the first light flux strikes on the surface 1b again. The first light flux which has struck on the surface 1b again is reflected by the polarized half mirror 2, and exits from the surface 1d.

The second light flux emitted from the surface 1c passes through the second λ/4 plate 14, and is reflected by the second deformable mirror 13. The light flux passes through the second λ/4 plate 14 again. At this time, the second light flux reciprocates through the second λ/4 plate 14, and is accordingly converted into P-polarized light; Thereafter, the second light flux strikes on the surface 1c again. The second light flux which has struck on the surface 1c again passes through the polarized half mirror 2, and is again superimposed on the first light flux. The light then exits from the surface 1d. Moreover, the light further undergoes a lens function of the lens system 21, and is converged to reach the image pickup surface 22.

In the present embodiment, almost all of the light flux which has struck on the surface 1a can be emitted from the surface 1d, and it is possible to constitute an optical system having satisfactory light use efficiency.

The first deformable mirror 3 and the second deformable mirror 13 are substantially immobile in the first optical axis L1 direction and the second optical axis L2 direction, respectively, and the mirrors are deformed by a function of electricity, magnetism or the like. Therefore, lens functions of these surfaces 1b, 1c with respect to the light flux can be changed. The changed shape of the mirror may continuously be retained in an arbitrary position in the range of deformation, or the shape that can be retained may be non-continuous. The shape of the first deformable mirror 3 may be matched with that of the second deformable mirror 13, the mirrors may be similarly deformed, and focus adjustment is preferably performed by changing the lens function. Moreover, zooming may be performed together with moving of another lens system as described later. The shape of the first deformable mirror 3 may be set to be different from that of the second deformable mirror 13 to thereby produce a low pass filter effect as described later.

Ninth Embodiment

Figure 11:
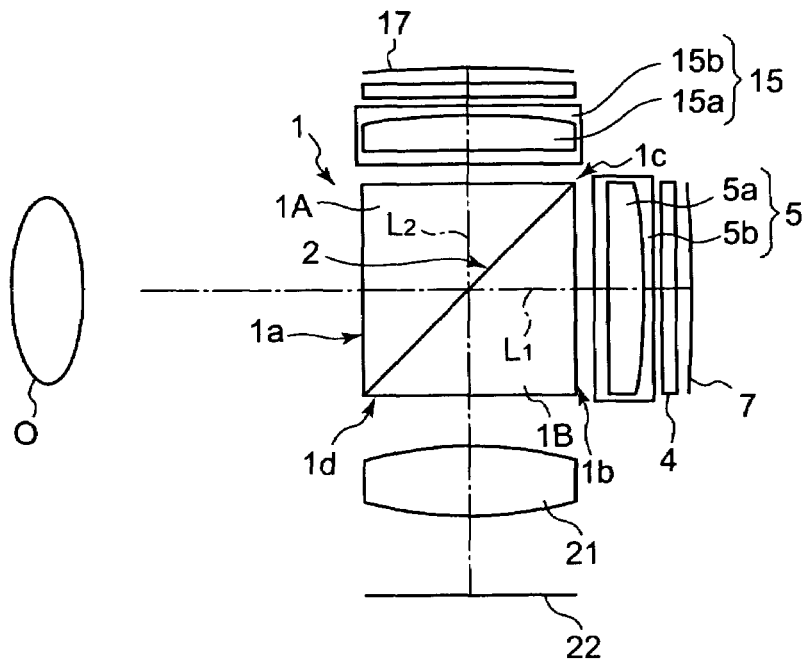
FIG. 11 is a diagram showing a ninth embodiment.

FIG. 11 is a diagram showing the ninth embodiment. This image pickup apparatus is provided with first and second liquid crystal lenses 5, 15 and first and second reflective surfaces 7, 17 instead of the first and second deformable mirrors 3, 13. Functions and effects of individual optical systems are similar to those of the image pickup apparatus described in the third and sixth embodiments, and a function and an effect produced by combining the first and second optical systems are similar to those of the image pickup apparatus described in the eighth embodiment.

Tenth Embodiment

Figure 12:
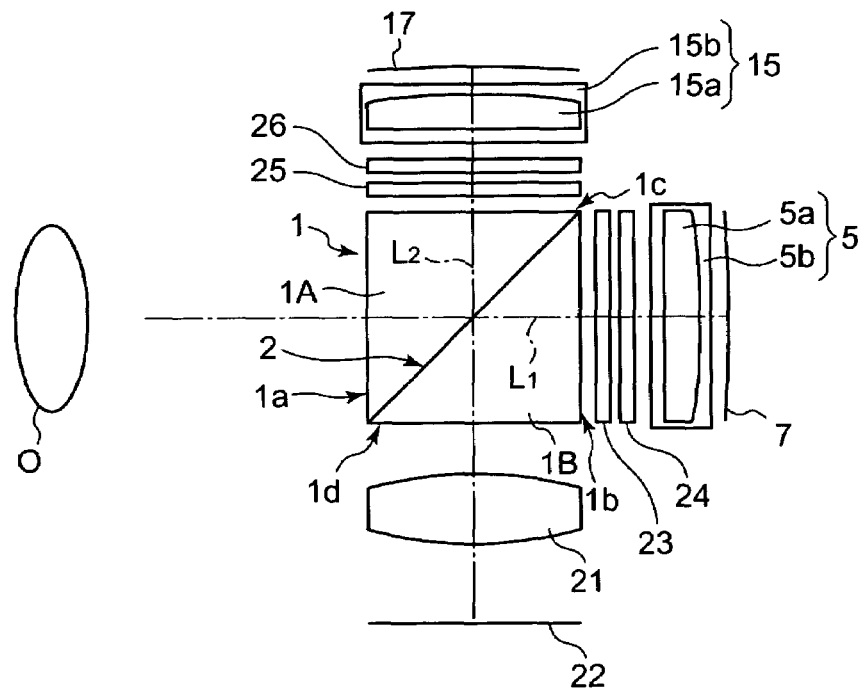
FIG. 12 is a diagram showing a tenth embodiment.

FIG. 12 is a diagram showing the tenth embodiment. This image pickup apparatus includes: a prism element 1 constituted of two prisms 1A, 1B cemented onto each other with a polarized half mirror 2 as an optical path splitting element being sandwiched therebetween in the same manner as in FIG. 2; a liquid crystal lens 5; a first reflective surface 7; a first λ/4 plate 23 and a first polarization plate 24 disposed between the prism element 1 and the first liquid crystal lens 5; a second liquid crystal lens 15; a second reflective surface 17; a second λ/4 plate 25 and a second polarization plate 26 disposed between the prism element 1 and the second liquid crystal lens 15; a lens system 21; and an image sensor. Reference numeral 22 is an image pickup surface of the image sensor. In addition, although not shown, an aperture diaphragm, a low pass filter and the like may be disposed if necessary.

A light flux emitted from an object strikes on the surface 1a of the prism element 1. The P-polarized component of the light flux which has struck on the surface 1a travels along the first optical axis L1, passes through the polarized half mirror 2, and exits from the surface 1b as a first light flux. The S-polarized component of the light flux which has struck on the surface 1a is reflected by the polarized half mirror 2 to turn to a second light flux, travels along the second optical axis L2, and exits from the surface 1c.

The first light flux emitted from the surface 1b passes through the first λ/4 plate 23, and further passes through the first polarization plate 24. The first polarization plate 24 is disposed so that the plate can most efficiently transmit the light flux transmitted through the first λ/4 plate 23. For example, in FIG. 12, P-polarized light transmitted through the polarized half mirror 2 passes through the first λ/4 plate 23 to turn to elliptically polarized light. Therefore, when the first polarization plate 24 is disposed, a rotation angle of the plate around an optical axis is set to an angle at which the largest quantity of light can be secured in a case where this elliptically polarized light is converted into linearly polarized light by the first polarization plate 24.

The light flux from the polarization plate 24 under goes a lens function of the first liquid crystal lens 5, and is reflected by the first reflective surface 7. The light flux undergoes a lens function in the first liquid crystal lens 5 again. The first liquid crystal lens 5 is constituted so that the refractive index of the lens with respect to a polarized component incoming through the polarization plate 24 is changed by a function of electricity, magnetism or the like. Therefore, in a case where the light flux passes through the first liquid crystal lens 5 whose refractive index changes twice, the lens function of the liquid crystal lens affecting the light flux can be enhanced. Furthermore, the light flux passes through the first polarization plate 24, and passes through the first λ/4 plate 23 again. At this time, since the first light flux reciprocates through the first λ/4 plate 23, the light flux is converted into S-polarized light. Thereafter, the first light flux strikes on the surface 1b again. The first light flux which has struck on the surface 1b again is reflected by the polarized half mirror 2, and exits from the polarized half mirror 2.

The first reflective surface 7 may be incorporated into the liquid crystal lens 5. As described later with respect to some examples, the liquid crystal lens usually has transparent electrodes on the inner surfaces of the liquid crystal cell 5b for applying an electric field to the liquid crystal 5a. In case where a transparent electrode disposed on the exit side inner surface (right side inner surface in FIG. 12) of the cell 5b is formed of a material having a high reflectance such as aluminum, the electrode may have a function of the first reflective surface 7. Thus, the variable-refractive power optical element and a reflective surface may be integrated into one optical element.

The second light flux emitted from the surface 1c passes through the second λ/4 plate 25 and the second polarization plate 26. The second polarization plate 26 is disposed so that the plate can most efficiently transmit the light flux transmitted through the second λ/4 plate 25. Furthermore, the light flux undergoes the lens function of the second liquid crystal lens 15, and is reflected by the second reflective surface 17. The light flux again undergoes the lens function of the second liquid crystal lens 15.

The second liquid crystal lens 15 is constituted so that the refractive index of the lens with respect to a polarized component incoming through the polarization plate 26 is changed by a function of electricity, magnetism or the like. Therefore, in a case where the light flux passes through the second liquid crystal lens 15 whose refractive index changes twice, the lens function affecting the light flux can be enhanced. Furthermore, the light flux passes through the second polarization plate 26, and passes through the second λ/4 plate 25 again. At this time, since the second light flux reciprocates through the second λ/4 plate 25, the flux is converted into P-polarized light. Thereafter, the second light flux strikes on the surface 1c again. The second light flux which has struck on the surface 1c again passes through the polarized half mirror 2, and is superimposed on the first light flux again. The light exits from the surface 1d. Moreover, the light further undergoes the lens function in the lens system 21.

In the present embodiment, almost all of the light flux that has struck on the surface 1a can be emitted from the surface 1d, and it is possible to constitute an optical system having satisfactory light use efficiency.

The refractive indexes of the first and second liquid crystal lenses 5, 15 are changed by a function of electricity, magnetism or the like, and the lens functions of the liquid crystal lenses affecting the light fluxes from the surface 1b and 1c can be changed. The refractive index value may continuously be retained at an arbitrary refractive index value in the range of variation, or a refractive index value which can be retained may be non-continuous. The refractive index of the first liquid crystal lens 5 may be matched with that of the second liquid crystal lens 15, the indexes may be similarly changed, and focus adjustment is preferably performed by changing the lens function. Moreover, zooming may be performed together with moving of another lens system as described later. The lens function with respect to the first light flux may be set to be different from that with respect to the second light flux to thereby produce a low pass filter effect as described later.

Eleventh Embodiment

Figure 13A:
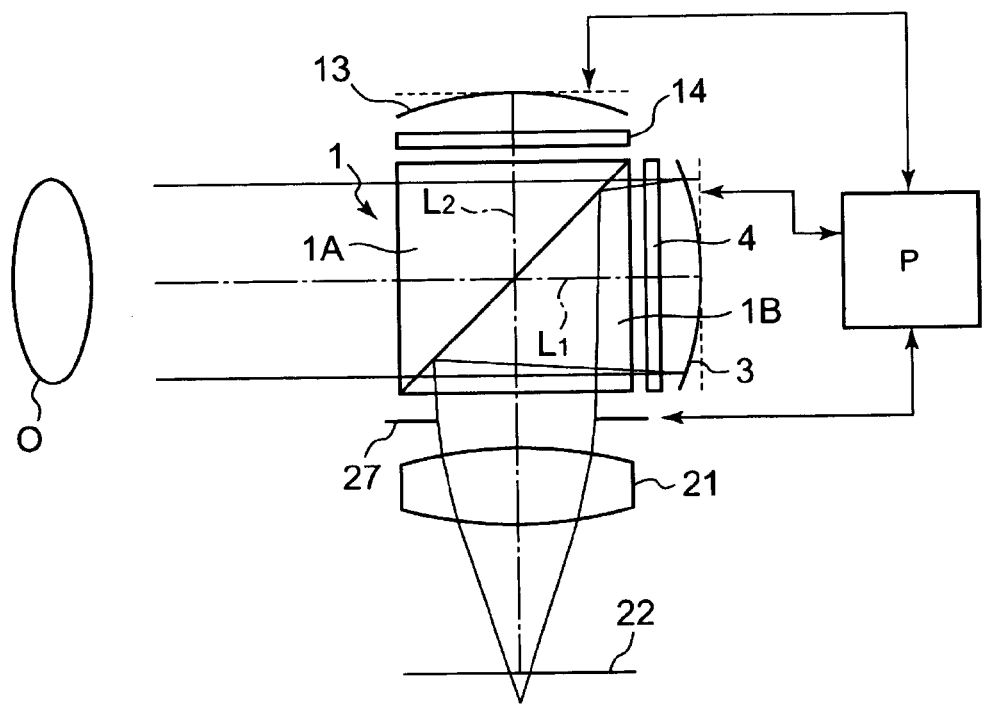
FIGS. 13A and 13B are diagrams showing an eleventh embodiment.
Figure 13B:
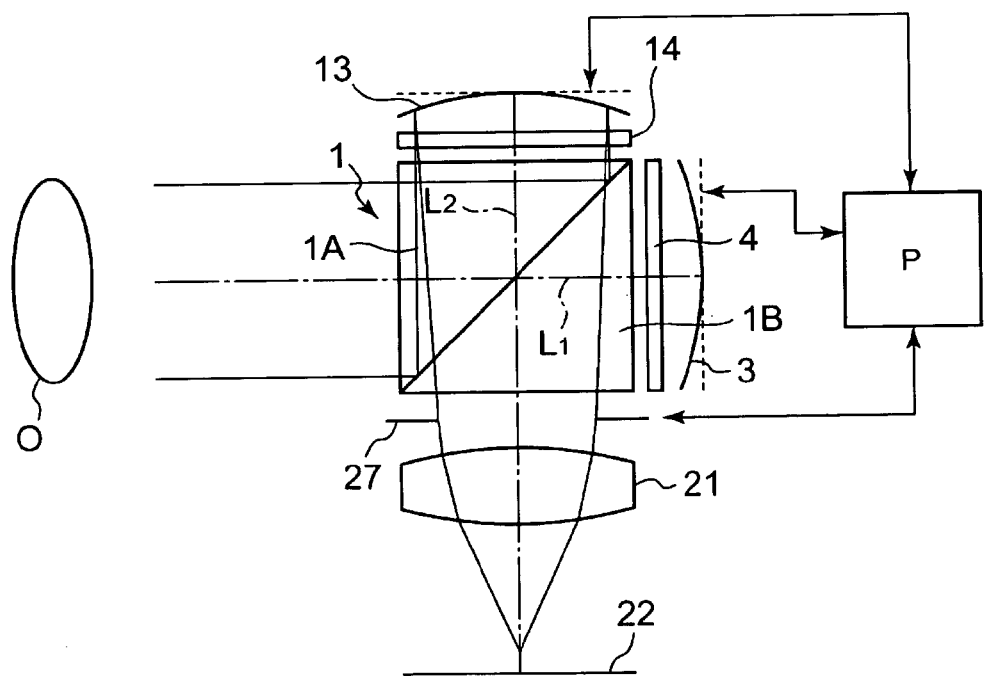
Figure 14A:
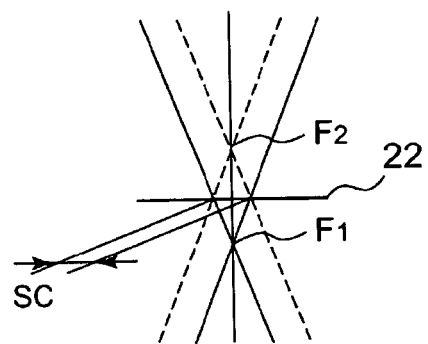
FIGS. 14A to 14C are enlarged views showing a state of a light flux in the vicinity of an image pickup surface in the eleventh embodiment.
Figure 14B:
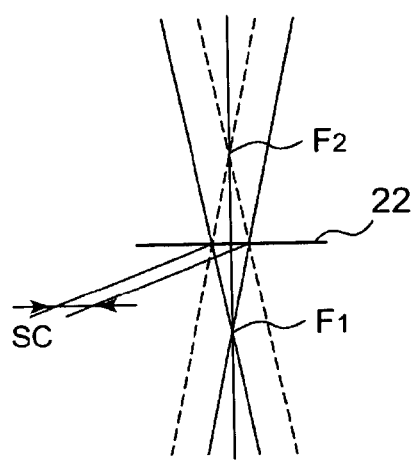
Figure 14C:
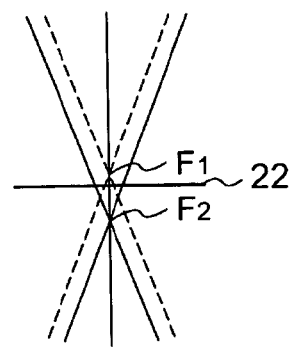

FIGS. 13A and 13B are diagrams showing the eleventh embodiment. FIGS. 14A to 14C are diagrams views showing a state of the light flux in the vicinity of the image pickup surface in the present embodiment.

In this image pickup apparatus, a low pass filter effect is obtained by use of two deformable mirrors 3, 13 which are substantially immobile in the optical axis direction. It is known that an optical element having the low pass filter effect is disposed in an optical system in which an image sensor such as an electronic image sensor is used, the image sensor having a regular pixel arrangement in an image pickup surface, in order to reduce image quality deterioration due to so-called Moire fringes. In general, an optical low pass filter is used.

However, there are problems that: optical low pass filter is formed of a material such as quartz, and is expensive; suitable optical low pass filters need to be used for image sensors having different pixel arrangements, respectively; and a space for disposing the optical low pass filter needs to be secured in the optical system. There is also proposed an optical low pass filter formed of a phase film (phase plate) instead of quartz, but there is a problem that when filter characteristics change in a case where the aperture diameter of the aperture diaphragm in the optical system changes, and it is difficult to follow a change of diaphragm aperture.

A constitution shown in FIGS. 13A and 13B is obtained by adding an aperture diaphragm 27 to the image pickup apparatus of FIG. 10. FIG. 13A shows a first light flux which enters the prism element 1 from an object, passes through the polarized half mirror 2, and undergoes the lens function in the deformable mirror 3. An image of the object is formed behind the image pickup surface 22 by the first light flux. FIG. 13B shows a second light flux which enters the prism element 1 from the object, and is reflected by the polarized half mirror 2 to undergo the lens function in the deformable mirror 3. An object image is formed before the image pickup surface 22 by the second light flux.

To realize the above-described constitution, the shape of each deformable mirror is controlled so that the curvature of the deformable mirror 3 is slightly smaller than that of the deformable mirror 13.

FIG. 14A is an enlarged view around the image pickup surface 22. In FIG. 14A, F1 denotes the rear focal point of the first optical system, and F2 denotes the rear focal point of the second optical system. In a case where the object is infinitely far, surfaces including F1 and F2 constitute image forming surfaces of first and second light fluxes. As shown in FIG. 14A, the size of the circle SC of least confusion is determined by the distance between the image forming surface of the first light flux and the image forming surface of the second light flux, and the numerical aperture of the optical system. When the size of the circle SC of least confusion is set to be close to the value corresponding to the Nyquist frequency in a case where an optical image is sampled by the image sensor, generations of the Moire fringes can be reduced. In a case where the aperture diaphragm is narrowed to reduce the numerical aperture, as shown in FIG. 14B, the distance between the image forming surface of the first light flux and the image forming surface of the second light flux is increased, so that the size of the circle SC of least confusion can be maintained. Therefore, as shown in FIGS. 13A, 13B, a control unit P sends a control signal to the aperture diaphragm 27, and also sends a control signal to the deformable mirrors 3, 13. The shape of the deformable mirror 3 and/or 13 is controlled in accordance with the change of the aperture diaphragm so that the size of the circle of least confusion is maintained.

Moreover, in a case where the pixel pitch of the image pickup surface 22 of the image sensor is small or a regular pattern included in the object is small (fine), as shown in FIG. 14C, the distance between the image forming surface of the first light flux and the image forming surface of the second light flux is reduced even at the equal numerical aperture to thereby reduce the circle SC of least confusion, so that an image forming performance can be improved.

Needless to say, an effect of focusing or the like can also be obtained by functions of the deformable mirrors 3, 13, In the image pickup apparatus of the eleventh embodiment, any quartz filter or the like does not have to be disposed in order to obtain the low pass filter effect, the low pass filter effect can be varied, and the change of the aperture diameter of the aperture diaphragm can be handled.

Twelfth Embodiment

Figure 15:
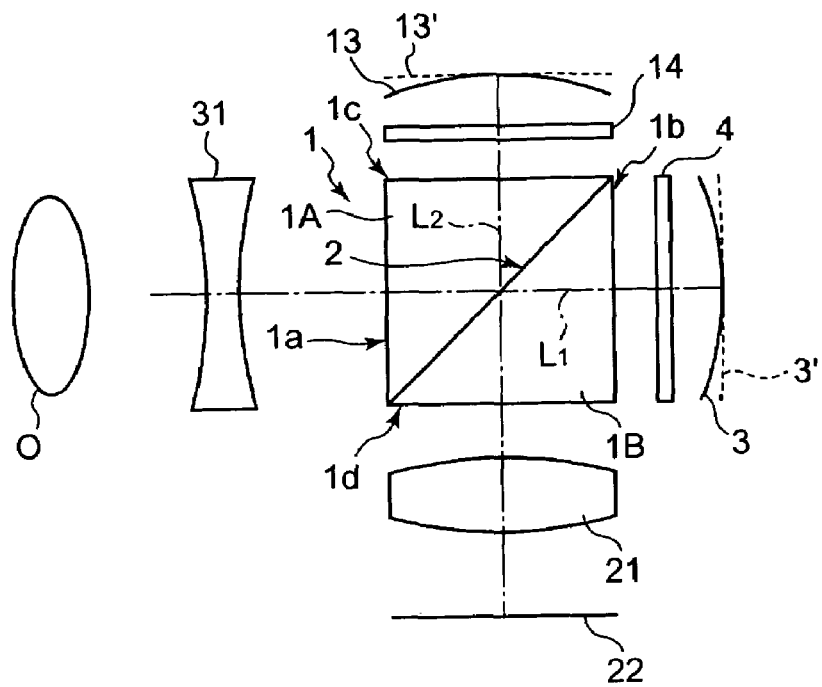
FIG. 15 is a diagram showing a twelfth embodiment.

FIG. 15 is a diagram showing the twelfth embodiment. This image pickup apparatus is constituted by disposing a lens system 31 having a negative power on an object side of the prism element 1 in the image pickup apparatus shown in FIG. 10. According to this constitution, there is an effect that it is possible to miniaturize a prism unit (unit including the prism element 1, deformable mirrors 3, 13, λ/4 plates 4, 14 and the like) particularly in the wide angle lens.

Thirteenth Embodiment

Figure 16:
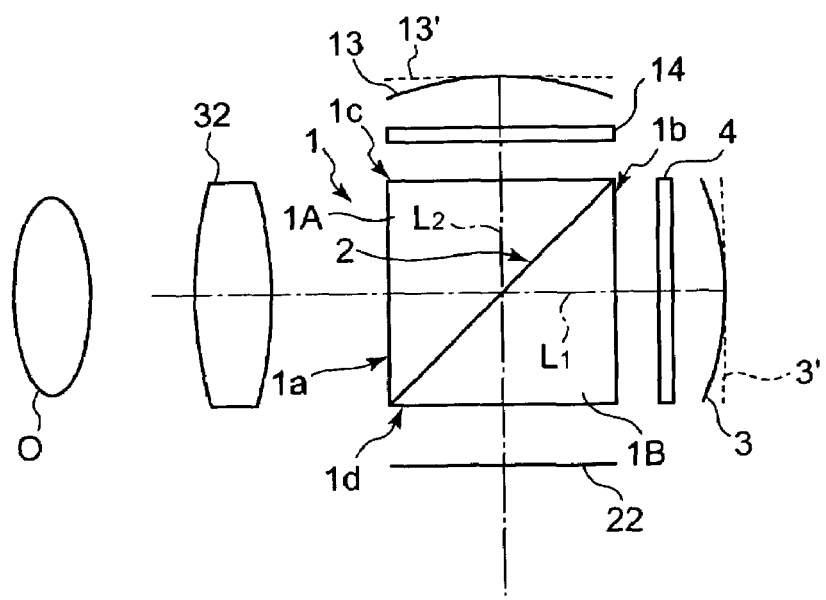
FIG. 16 is a diagram showing a thirteenth embodiment.

FIG. 16 is a diagram showing the thirteenth embodiment. This image pickup apparatus is constituted by disposing a lens system 32 having a positive power on an object side of the prism element 1 in the image pickup apparatus shown in FIG. 10. According to this constitution, it is possible to reduce burdens of powers on deformable mirrors 3, 13. There is also an effect that it is possible to miniaturize a prism unit (unit including the prism element 1, the deformable mirrors 3, 13, λ/4 plates 4, 14 and the like) in an optical system other than a wide-angle lens system (especially in a telephoto lens system).

Fourteenth Embodiment

Figure 17:
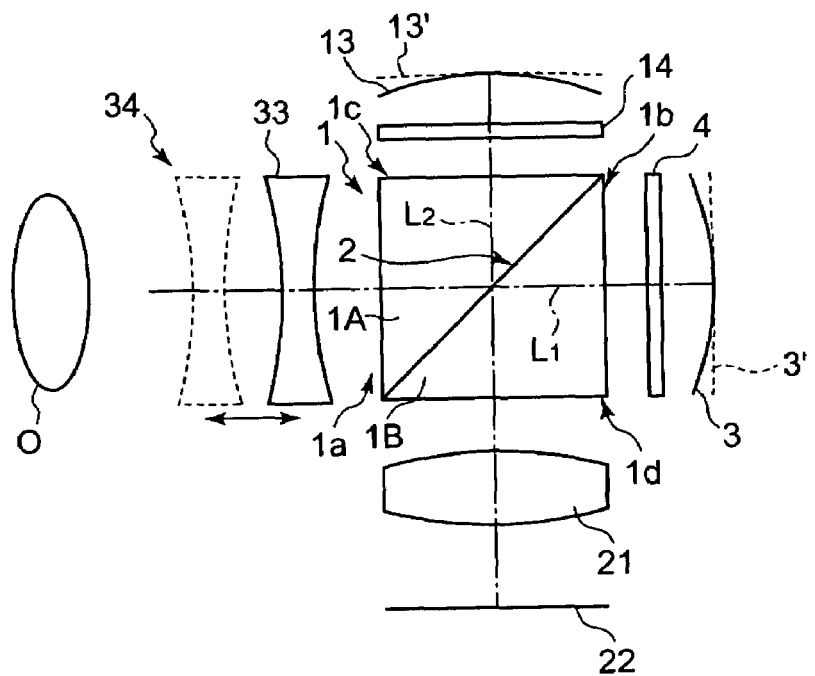
FIG. 17 is a diagram showing a fourteenth embodiment.

FIG. 17 is a diagram showing the fourteenth embodiment. This image pickup apparatus is constituted by disposing a negative-power lens system 34 including a negative-power lens element 33 movable along an optical axis on an object side of the prism element 1 in the image pickup apparatus shown in FIG. 10. Zooming can be performed by combining the movement of the lens element 33 in the lens system 34 with deformations of deformable mirrors 3, 13. Moreover, focusing can be performed by adjusting movement of the lens element 33 or amounts of deformations of the deformable mirrors 3, 13.

It is to be noted that in the present embodiment, a negative-power lens system is used as a lens system which is movable along an optical axis, but a positive-power lens system may be used. A combination of a positive-power lens element (or lens unit) and a negative-power lens element (or lens unit) may be used as described later.

Fifteenth Embodiment

Figure 18:
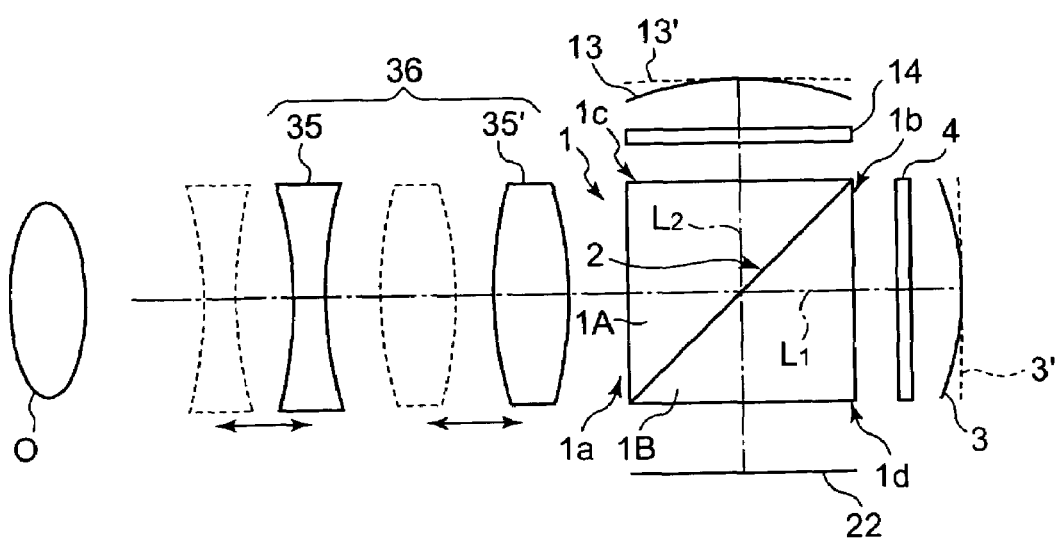
FIG. 18 is a diagram showing a fifteenth embodiment.

FIG. 18 is a diagram showing the fifteenth embodiment. This image pickup apparatus is constituted by disposing a lens system 36 including a negative-power lens element 35 and a positive-power lens element 35' which are movable along an optical axis with different loci on an object side of the prism element 1. The lens system 36 may entirely have a positive power or a negative power. Alternatively, the lens system may be constituted so that these lens elements 35, 35' are moved along the optical axis to thereby change the positive power of the optical system to the negative power and vice versa. Zooming can be performed by combining the movements of the lens elements 35, 35' in the lens system 36 with deformations of deformable mirrors 3, 13. Moreover, there may be formed a zoom optical system suitable for an electronic image sensor such as a CCD, in which an aperture diaphragm 27 is disposed on an object side of the prism element 1, and a variance of position of an exit pupil is reduced by the deformations of the deformable mirrors 3, 13.

Sixteenth Embodiment

Figure 19:
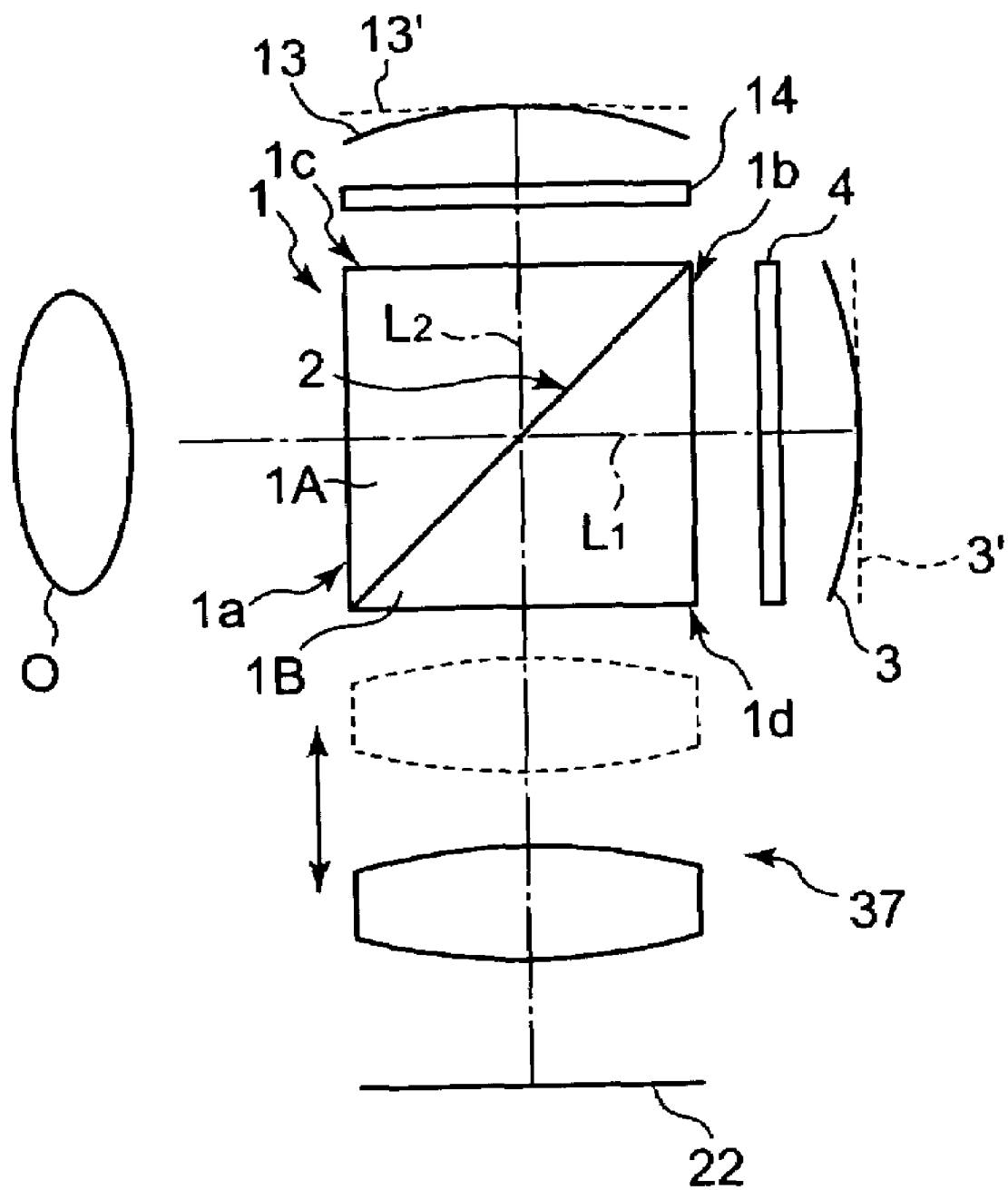
FIG. 19 is a diagram showing a sixteenth embodiment.
Figure 20:
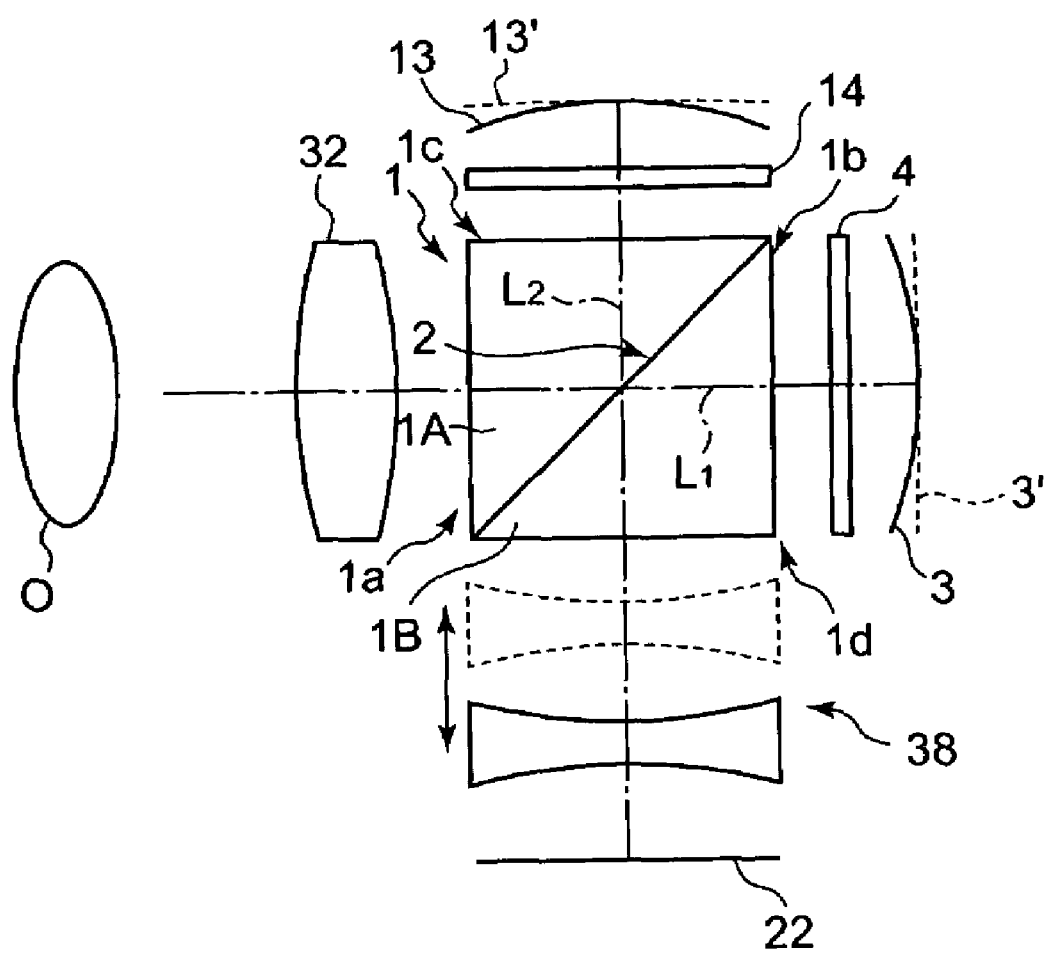
FIG. 20 is a diagram showing a modification of the sixteenth embodiment.
Figure 21:
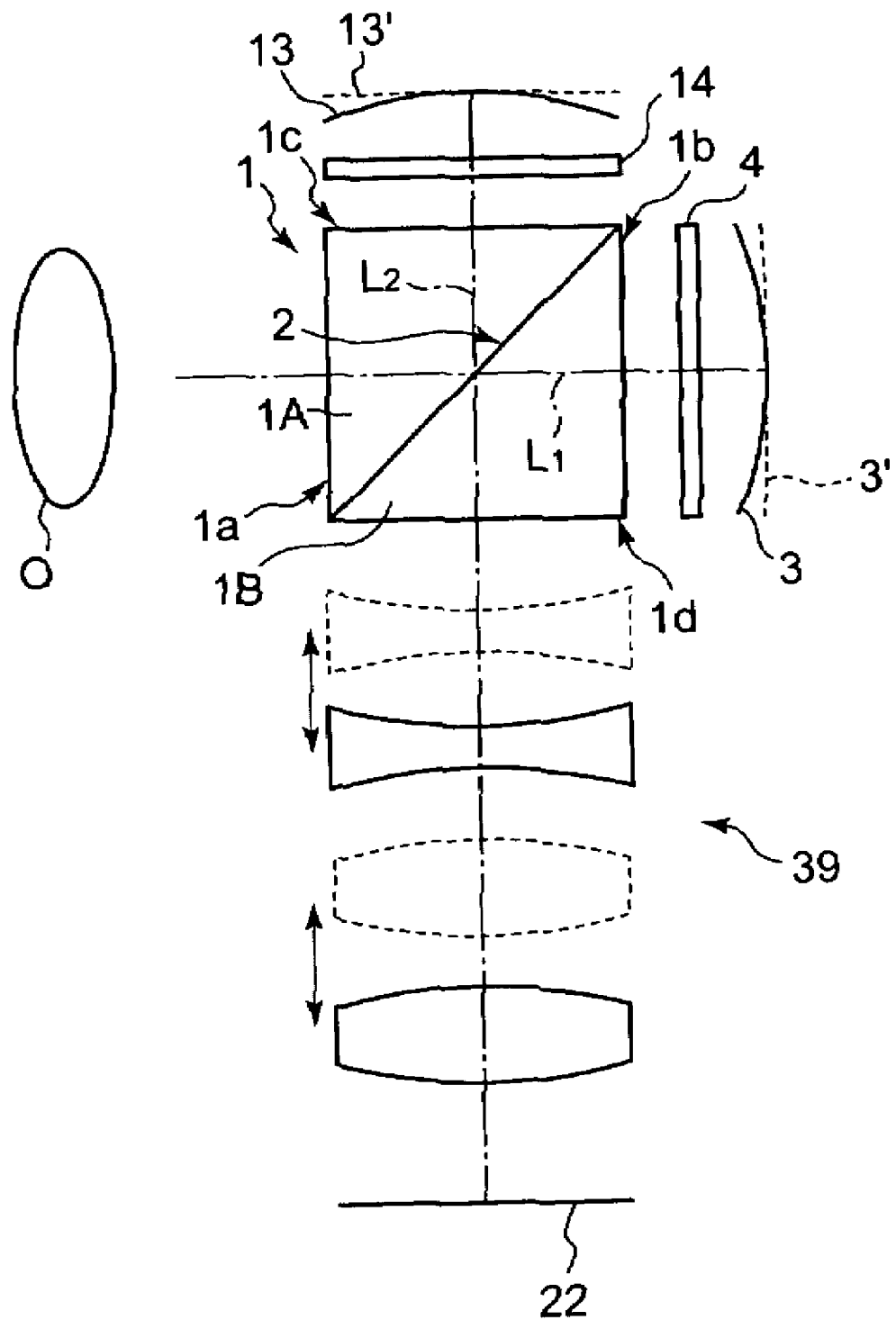
FIG. 21 is a diagram showing another modification of the sixteenth embodiment.

FIG. 19 is a diagram showing the sixteenth embodiment. This image pickup apparatus is a system having a lens unit 37 which is movable along an optical axis on an image side of the prism element 1 in the image pickup apparatus shown in FIG. 10. In the present embodiment, the lens unit 37 has a positive power, but instead there may be used: a lens unit 38 having a negative power as shown in FIG. 20; or a lens unit 39 constituted by combining a positive-power lens element with a negative-power lens element as shown in FIG. 21. In the lens unit constituted by combining the positive power with the negative power as shown in FIG. 21, when these lenses are constituted to be movable along the optical axis, the optical power of the whole lens unit may be changed from the positive power to the negative power and vice versa. Zooming can be performed by combining the movements of lenses in the lens units 37, 38, and 39 with deformations of deformable mirrors 3, 13. Moreover, focusing may be performed by the deformations of the deformable mirrors 3, 13, and the zooming may be performed by the lens units 37, 38, and 39.

Seventeenth Embodiment

Figure 22:
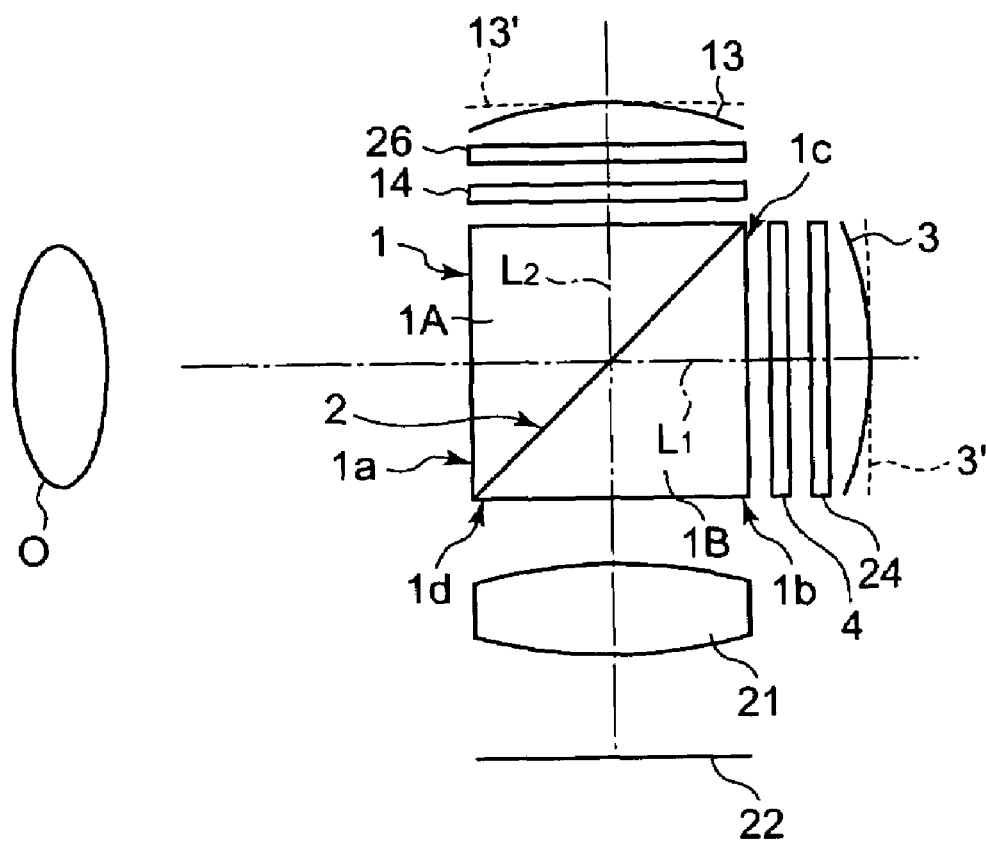
FIG. 22 is a diagram showing a seventeenth embodiment.

FIG. 22 is a diagram showing the seventeenth embodiment. This image pickup apparatus is constituted by disposing polarization plates 24 and 26 between λ/4 plates 4, 14 and deformable mirrors 3, 13, respectively, in the image pickup apparatus shown in FIG. 10, and setting at least one of the polarization plates 24, 26 to be rotatable around an optical axis. Both of the polarization plates 24, 26 may be set to be rotatable. In this case, a 0° state and a 90° state may be selected, respectively (e.g., assuming that a state to transmit P-polarized light is the 0° state, the 90° state refers to a state in which any P-polarized light does not pass. Standards of the 0° and 90° states can arbitrarily be set).

When an object is dark, or an exposure time is to be shortened, the respective polarization plates 24, 26 are rotated around the optical axis, and a polarization direction of the polarization plate is matched with that of a light flux. When the exposure time is to be lengthened, one of the polarization plates 24, 26 is rotated around the optical axis in accordance with a degree of such changing, and the apparatus is constituted so that the polarization direction of the polarization plate does not agree with that of the light flux. When the polarization direction of one of the polarization plates 24, 26 is rotated as much as 90° with respect to the polarization direction of the light flux, the quantity of light to be transmitted through the optical system including the polarization plate can substantially be zeroed in first and second optical systems.

Eighteenth Embodiment

Figure 23A:
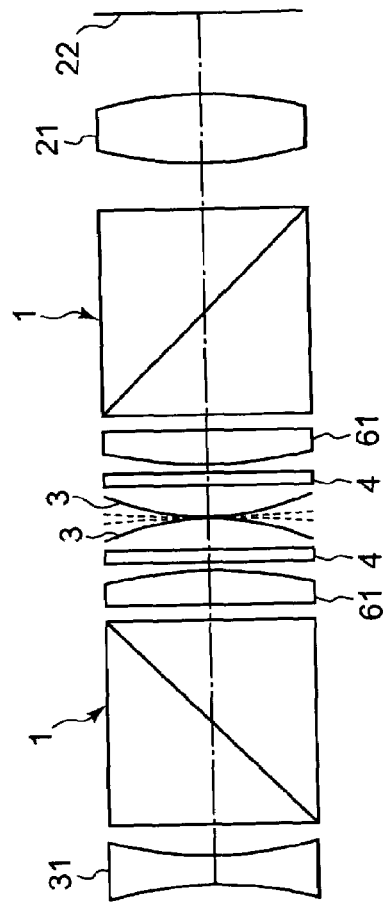
FIGS. 23A to 23D are diagrams showing an eighteenth embodiment.

FIGS. 23A to 23D are diagrams showing the eighteenth embodiment. As shown in FIG. 23A, this image pickup apparatus includes: a prism element 1 constituted of two prisms 1A, 1B cemented onto each other with a polarized half mirror 2 sandwiched therebetween; a first deformable mirror 3; a first λ/4 plate 4; a second deformable mirror 13; a second λ/4 plate 14; a lens system 21; and an image sensor. Reference numeral 22 denotes the image pickup surface of the image sensor. A lens unit 61 is disposed between the prism element 1 and the first deformable mirror 3, and a lens unit 62 is disposed between the prism element 1 and the second deformable mirror 13. In addition, although not shown, an aperture diaphragm, a low pass filter and the like may be included if necessary.

A light flux emitted from an object strikes on the surface 1a of the prism element 1. The P-polarized component of the light flux which has struck on the surface 1a travels along the first optical axis L1, passes through the polarized half mirror 2, and exits from the surface 1b as a first light flux. The S-polarized component of the light flux which has struck on the surface 1a is reflected by the polarized half mirror 2 to turn to a second light flux, travels along the second optical axis L2, and exits from the surface 1c.

The first light flux emitted from the surface 1*b* undergoes a lens function in the lens unit 61, and passes through the first λ/4 plate 4. The light flux is reflected by the first deformable mirror 3, and passes through the first λ/4 plate 4 again. At this time, since the first light flux reciprocates through the first λ/4 plate 4, the light flux is converted into S-polarized light. Thereafter, the first light flux undergoes the lens function in the lens unit 61 again, and strikes on the surface 1*b* again. The first light flux which has struck on the surface 1*b* again is reflected by the polarized half mirror 2, and exits from the surface 1*d*.

The second light flux emitted from the surface 1*c* undergoes a lens function in the lens unit 62, passes through the second λ/4 plate 14, and is reflected by the second deformable mirror 13. The light flux passes through the second λ/4 plate 14 again. At this time, since the second light flux reciprocates through the second λ/4 plate 14, the light flux is converted into P-polarized light. Thereafter, the second light flux undergoes the lens function in the lens unit 62 again, and strikes on the surface 1*c* again. The second light flux which has struck on the surface 1*c* again passes through the polarized half mirror 2, and is superimposed on the first light flux again. The light flux exits from the surface 1*d*. Moreover, the light flux further undergoes a lens function in the lens system 21 to reach the image pickup surface 22.

According to the present embodiment, the light flux passes through the lens units 61, 62 twice, respectively, and the lens function can efficiently be applied. It is to be noted that the lens units 61, 62 may be disposed between the λ/4 plates 4, 14 and the deformable mirrors 3, 13, respectively.

Figure 23B:
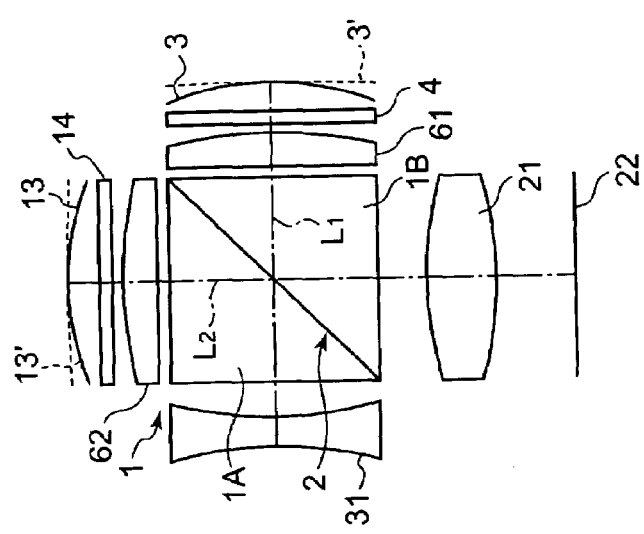

FIG. 23B shows a development view of the optical path through which the first light flux passes. An optical path through which the second light flux passes is substantially similarly developed. It is seen that the optical path length is comparatively large, and the constitution does not have any special problem. Therefore, the image pickup apparatus of the present embodiment can constitute an optical system having a compact constitution and sophisticated specifications and performance. It is to be noted that in FIG. 23B, since the first deformable mirror 3 is a reflective surface, this portion is shown as if it were non-continuous. However, in FIG. 23B, the light flux undergoes a positive lens function at a time when the light flux enters the reflective surface 3 on a left side, and exits from the reflective surface 3 on a right side.

Figure 23C:
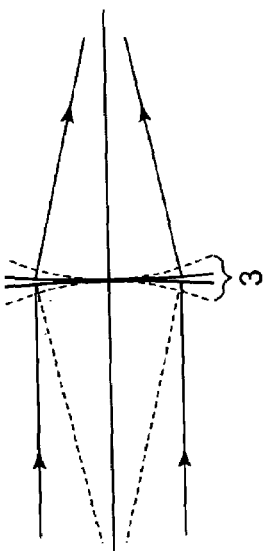
Figure 23D:
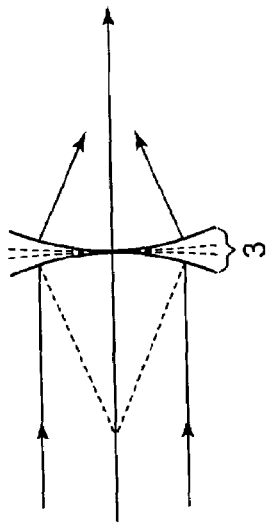

FIGS. 23C and 23D show the state in which the positive lens function is given. FIGS. 23C and 23D show an extracted portion of the deformable mirror 3 in FIG. 23B. In FIGS. 23C and 23D, a ray (solid line) enters the deformable mirror 3 from the left side in parallel with the optical axis, and is reflected by the deformable mirror 3 in directions shown by broken lines. The developed diagram shows that the ray exits from the right side of the deformable mirror 3 as a converged light flux.

FIG. 23C shows that the deformable mirror 3 has a strong power, and FIG. 23D shows that the mirror has a weak power. In both states, since the reflection phenomenon is used, any chromatic aberration is not generated.

Nineteenth Embodiment

Figure 24:
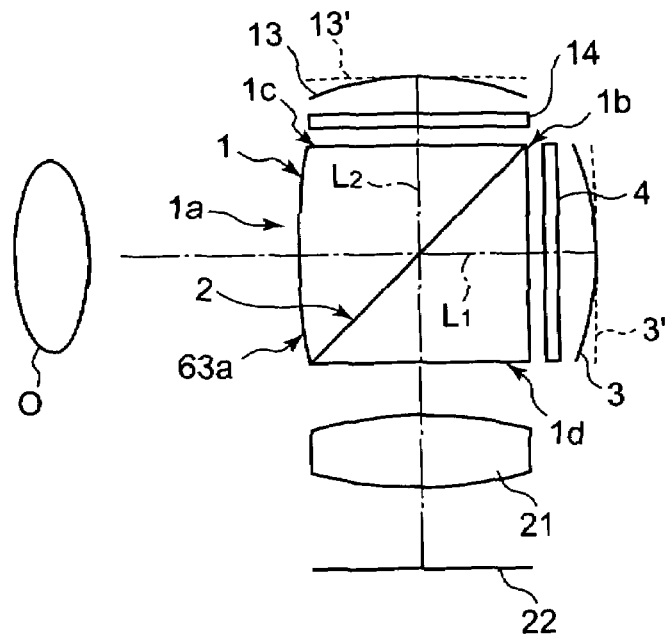
FIG. 24 is a diagram showing a nineteenth embodiment.
Figure 25:
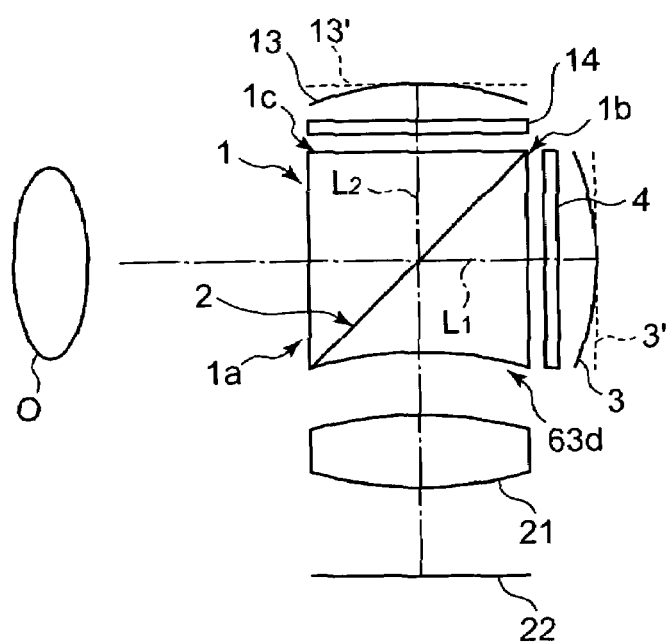
FIG. 25 is a diagram showing a modification of the nineteenth embodiment.
Figure 26:
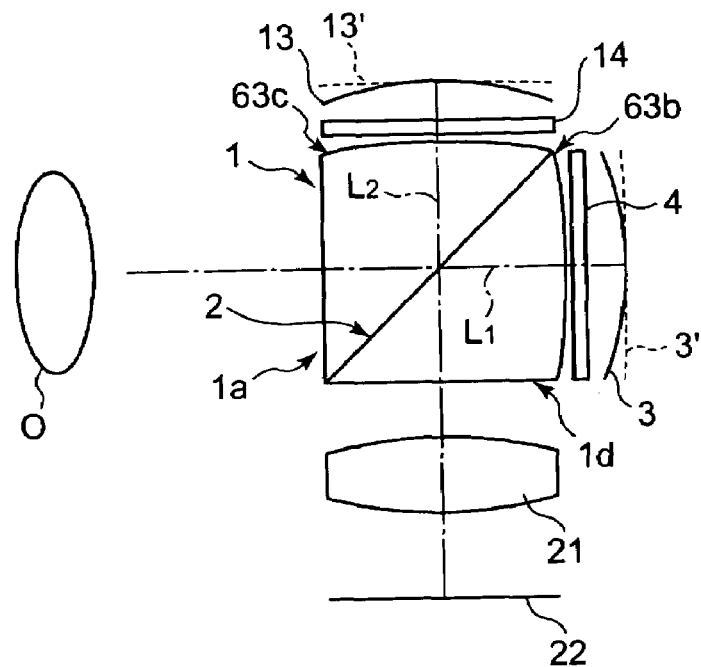
FIG. 26 is a diagram showing another modification of the nineteenth embodiment.

FIG. 24 is a diagram showing the nineteenth embodiment of the present invention. In this image pickup apparatus, the surface 1*a* of the prism element 1 is constituted of a lens surface 63*a* having a refractive power, and accordingly improvement of the performance and miniaturization of the constitution can be easily realized. It is to be noted that in addition to replacing the surface 1*a* of the prism element 1 with the lens surface 63*a*, as shown in FIG. 25, the surface 1*d* may be replaced with a lens surface 63*d*. Further, as shown in FIG. 26, surfaces 1*b* and/or 1*c* may be replaced with lens surfaces 63*b*, 63*c*. Since the light flux passes through the surfaces 1*b*, 1*c* twice, this structure is useful for efficiently imparts a lens effect to the light flux with one surface. All of the surfaces 1*a* to 1*d* of the prism element 1 may be replaced with lens surfaces 63*a* to 63*d*.

Figure 27:
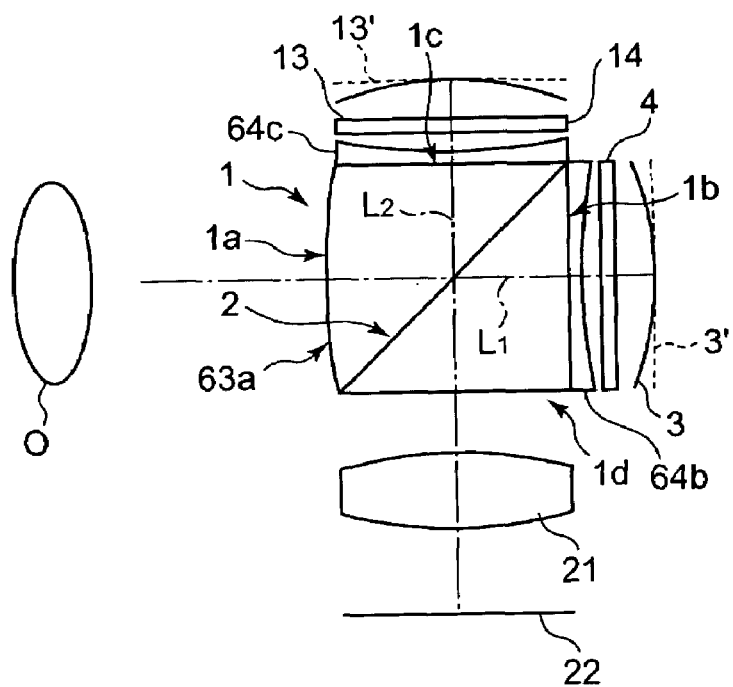
FIG. 27 is a diagram showing still another modification of the nineteenth embodiment.

Moreover, as shown in FIG. 27, transparent medium layers may be disposed on surfaces of the prism element 1, and lens surfaces 64*b*, 64*c* may be formed on the surfaces of the layers. In FIG. 27, when the Abbe number of the transparent medium layer formed on each of the surfaces 1*b*, 1*c* is reduced, chromatic aberration is easily corrected. Such constitution comparatively lengthens an optical path length, and a reasonable constitution is achieved. A compact optical system having high specifications and performance is easily achieved.

The transparent medium layers having the lens surfaces 64*b*, 64*c* may be formed as hybrid lenses (HBL). Alternatively, thins lenses may be cemented to the surfaces 1*b*, 1*c* of the prism element. Moreover, the surface of the prism may be formed beforehand into a lens surface during forming of the prism.

Twentieth Embodiment

Figure 28:
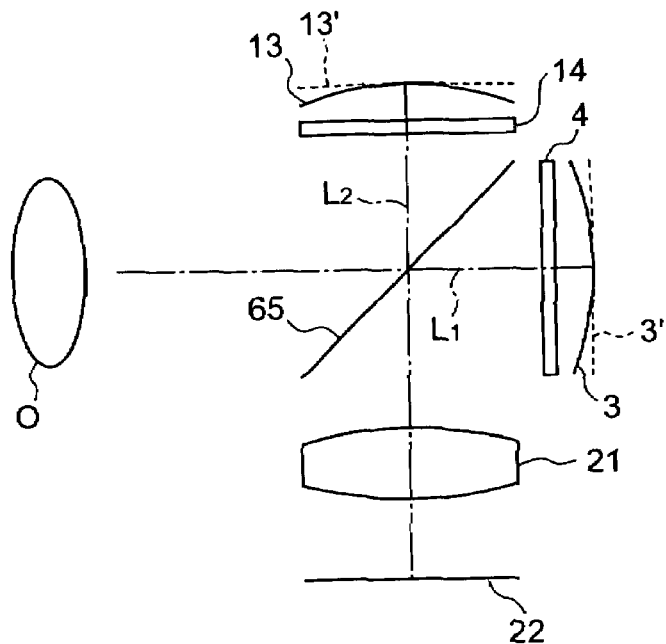
FIG. 28 is a diagram showing a twentieth embodiment.

FIG. 28 is a diagram showing the twentieth embodiment of the present invention. In this image pickup apparatus, a half mirror plate 65 is disposed instead of the prism element 1. The half mirror plate 65 is preferably a polarized half mirror. Alternatively, a thin mirror such as a pellicle mirror (constituted of a translucent pellicle film) is preferable.

Figure 29:
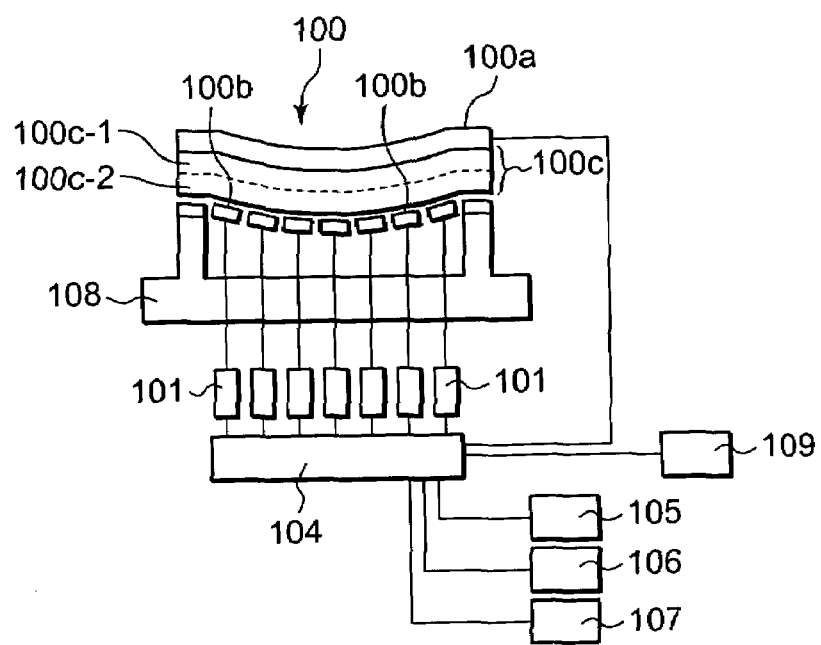
FIG. 29 is a schematic constitution diagram showing an example of a deformable mirror applicable to the present invention.

Next, there will be described an example of a deformable mirror applicable to an image pickup apparatus of the present invention with reference to FIG. 29. FIG. 29 is a schematic constitution diagram showing a deformable mirror 100 whose optical characteristics are variable.

First, there will be described a basic constitution of the deformable mirror 100.

The deformable mirror 100 has a thin film (reflective surface) 100*a* coated with aluminum or the like and a plurality of electrodes 10*b*. Reference numeral 101 denotes a plurality of variable resistors connected to the electrodes 10*b*, respectively, 104 denotes an operation device for controlling resistance values of the plurality of variable resistors 101, and 105, 106, and 107 denote a temperature sensor, a humidity sensor, and a distance sensor connected to the operation device 104, respectively. These components are arranged as shown to constitute one optical device. Light which strikes on the reflective surface 100*a* from above on a drawing sheet surface is reflected upward from the sheet surface by the reflective surface.

The surface of the deformable mirror 100 is not limited to a flat surface, and may be a spherical surface or a rotationally-symmetrical aspherical surface. In addition, the surface may have any shape such as a spherical surface that is eccentric from an optical axis, the flat surface, the rotationally-symmetrical aspherical surface, an aspherical surface having a plane of symmetry, an aspherical surface having only one plane of symmetry, an aspherical surface that does not have any plane of symmetry, a free-formed surface, or a surface having a non-differentiable point or a no-differential line. These surfaces will be referred to generically as an expanded curved surface.

It is to be noted that the reflective surface of the deformable mirror 100 may be formed into a free-formed surface. This is because aberration can be easily corrected advantageously.

The free-formed surface mentioned herein is defined by the following equation (a).

A Z-axis of this defining equation is an axis of the free-formed surface.

$$Z = cr^2 / \left[1 + \sqrt{\{1 - (1+k)c^2 r^2\}}\right] + \sum_{j=2}^{65} C_j X^m Y^n \quad (a)$$

wherein the first term is a spherical surface term, and the second term is a free-formed surface term. In the spherical surface term:
c: curvature at the vertex of the surface;
k: conic constant; and
$r = \sqrt{(X^2 + Y^2)}$.

The free-formed surface term is as follows:

$$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y +$$
$$C_{13} X^2 Y + C_{14} XY^3 + C_{15} Y^4 + C_{16} X^5 + C_{17} X^4 Y +$$
$$C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 +$$
$$C_{36} Y^7 \ldots$$

wherein Cj denotes a coefficient (j is an integer of 2 or more).

As to the free-formed surface, in general, neither an X-Z surface nor a Y-Z surface is a plane of symmetry, but when all of odd-order terms of X are set to 0, the free-formed surface has an only one plane of symmetry that is parallel to the Y-Z surface. When all of odd-order terms of Y are set to 0, the free-formed surface has an only one plane of symmetry that is parallel to the X-Z surface.

Moreover, the free-formed surface which is the rotationally-asymmetrical curved surface can be defined by use of the Zernike polynomials. The shape of this surface is defined by the following equations (b). The Z-axis of the defining equations (b) is the axis of the Zernike polynomials. A rotationally-asymmetrical surface is defined by polar coordinates of a height of the Z-axis with respect to the X-Y surface, R denotes a distance from the Z-axis in the X-Y surface, and A denotes an azimuth around the Z-axis, and is represented by a rotation angle measured from an X-axis.

$$x = R \times \cos(A) \quad (b)$$
$$y = R \times \sin(A)$$
$$Z = D_2 + D_3 R \cos(A) + D_4 R \sin(A) + D_5 R^2 \cos(2A) +$$
$$D_6 (R^2 - 1) + D_7 R^2 \sin(2A) + D_8 R^3 \cos(3A) +$$

-continued
$$D_9 (3R^3 - 2R) \cos(A) + D_{10} (3R^3 - 2R) \sin(A) +$$
$$D_{11} R^3 \sin(3A) + D_{12} R^4 \cos(4A) + D_{13} (4R^4 - 3R^2) \cos(2A) +$$
$$D_{14} (6R^4 - 6R^2 + 1) + D_{15} (4R^4 - 3R^2) \sin(2A) +$$
$$D_{16} R^4 \sin(4A) + D_{17} R^5 \cos(5A) + D_{18} (5R^5 - 4R^2) \cos(3A) +$$
$$D_{19} (10R^5 - 12R^3 + 3R) \cos(A) +$$
$$D_{20} (10R^5 - 12R^3 + 3R) \sin(A) + D_{21} (5R^5 - 4R^3) \sin(3A) +$$
$$D_{22} R^5 \sin(5A) + D_{23} R^6 \cos(6A) + D_{24} (6R^6 - 5R^4) \cos(4A) +$$
$$D_{25} (15R^6 - 20R^4 + 6R^2) \cos(2A) +$$
$$D_{26} (20R^6 - 30R^4 + 12R^2 - 1) +$$
$$D_{27} (15R^6 - 20R^4 + 6R^2) \sin(2A) + D_{28} (6R^6 - 5R^4) \sin(4A) +$$
$$D_{29} R^6 \sin(6A) \ldots$$

wherein Dm (m is an integer of 2 or more) is a coefficient. It is to be noted that D4, D5, D6, D10, D11, D12, D13, D14, D20, D21, D22 . . . are utilized in designing an optical system symmetrically to the X-axis.

The above described defining equations are shown as examples of the definitions of rotationally-asymmetrical curved surfaces, and another defining equation may be used for defining the shape of the curved surface.

Figure 30:
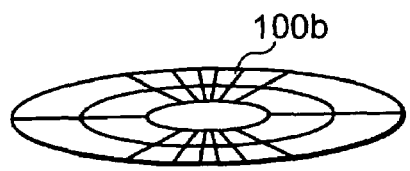
FIG. 30 is an explanatory view showing one configuration of an electrode for use in the deformable mirror of FIG. 29.
Figure 31:
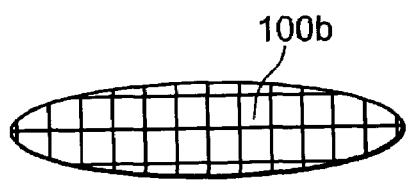
FIG. 31 is an explanatory view showing another configuration of the electrode for use in the deformable mirror of FIG. 29.

In the deformable mirror 100 shown in FIG. 29, a piezoelectric element 100c is disposed between the thin film 100a and the electrodes 100b, and these components are disposed on the support base 108. Moreover, when a voltage to be applied to the piezoelectric element 100c is changed every electrode 100b, the piezoelectric element 100c is expanded and contracted in a partially different manner, so that the shape of the thin film 100a can be changed. As shown in FIG. 30, a concentrically divided electrode 100b may be used. As shown in FIG. 31, a rectangularly divided electrode 100b may also be used. Another appropriate shape may also be selected. In FIG. 29, reference numeral 109 is a vibration sensor connected to the operation device 104. The vibration sensor detects, for example, vibration of a digital camera, and changes a voltage to be applied to each electrode 100b via the operation device 104 and the variable resistors 101 so that the thin film 100a is deformed so as to compensate for disturbance of the image by the vibration. At this time, signals from the temperature sensor 105, the humidity sensor 106, and the distance sensor 107 are simultaneously considered in performing focusing, temperature and humidity compensation or the like. In this case, stress is applied to the thin film 100a owing to the deformation of the piezoelectric element 100c. Therefore, the thickness of the thin film 100a is increased to a certain degree so that the corresponding strength is imparted.

Figure 32:
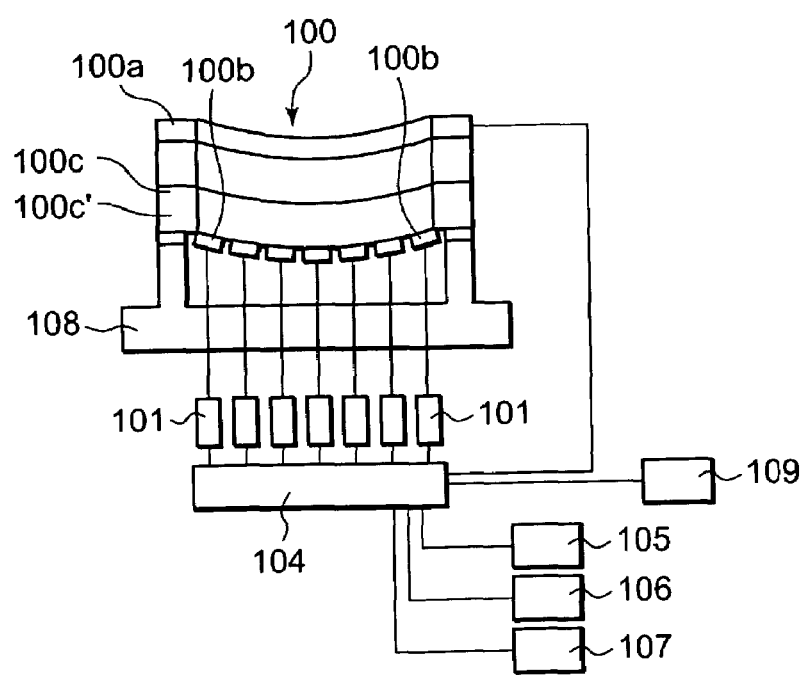
FIG. 32 is a schematic constitution diagram showing another example of the deformable mirror applicable to the present invention.

FIG. 32 is a schematic constitution diagram showing another example of the deformable mirror 100 applicable to the optical system of the present invention.

This deformable mirror is different from the deformable mirror 100 shown in FIG. 29 in that a piezoelectric element disposed between the thin film 100a and electrodes 100b is constituted of two piezoelectric elements 100c and 100c' formed of a material having piezoelectric characteristics of an opposite direction. That is, assuming that the piezoelectric elements 100c and 100c' are formed of ferroelectric crystals, directions of crystal axes are disposed opposite to one another. In this case, when a voltage is applied, the piezoelectric elements 100c and 100c' expand and contract in a reverse direction. Therefore, the force for deforming the thin film 100a is stronger than that in the example shown in FIG. 29. As a result, there is an advantage that the surface of the mirror can largely be deformed.

Examples of a material for use in the piezoelectric elements 100c and 100c' include: a piezoelectric substance such as barium titanate, Rochelle salt, quartz, tourmaline, potassium dihydrogenphosphate (KDP), ammonium dihydrogenphosphate (ADP), or lithium niobate; a polycrystalline material of the substance; crystals of the substance; a piezoelectric ceramic of a solid solution of $PbZrO_3$ and $PbTiO_3$; an organic piezoelectric substance such as polyvinyl difluoride (PVDF); and a ferroelectric material other than the above-described material. Especially the organic piezoelectric substance is preferable because it has a small Young's modulus, and it can be largely deformed even at a small voltage. It is to be noted that in a case where these piezoelectric elements are utilized, when the thickness is set to be non-uniform, the thin film 100a can appropriately be deformed in the above-described example.

Moreover, as a material of the piezoelectric elements 100c and 100c', there is used: a polymer piezoelectric material such as polyurethane, silicon rubber, acryl elastomer, PZT, PLZT, or poly vinylidene fluoride (PVDF); a vinylidene cyanide copolymer; a copolymer of vinylidene fluoride and trifluoroethylene or the like.

When an organic material having a piezoelectric property, a synthetic resin having the piezoelectric property, an elastomer having the piezoelectric property or the like is used, the deformable mirror can preferably largely be deformed.

It is to be noted that when an electrostrictive material such as acryl elastomer or silicon rubber is used in the piezoelectric element 100c of FIGS. 29 and 32, as shown in FIG. 29, the piezoelectric element 100c may be constituted by laminating another substrate 100c-1 on an electrostrictive material 100c-2.

Figure 33:
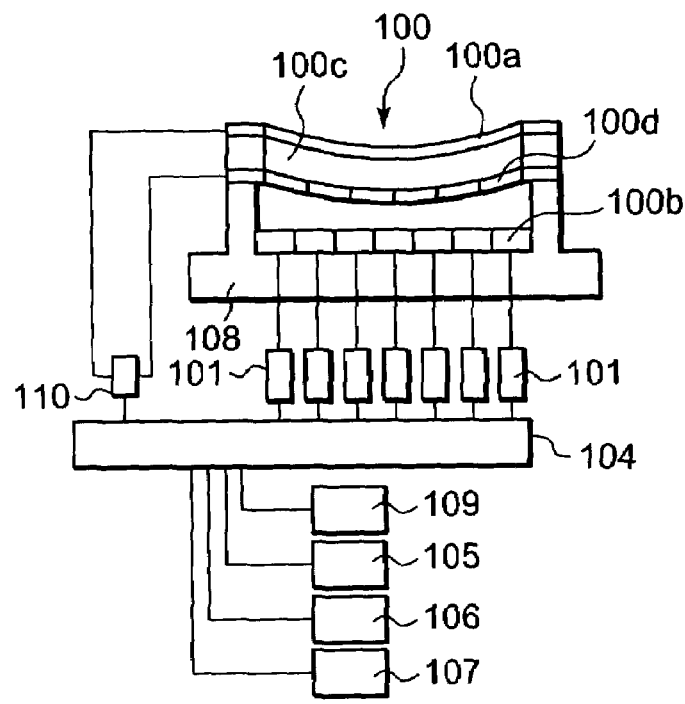
FIG. 33 is a schematic constitution diagram showing still another example of the deformable mirror applicable to the present invention.

FIG. 33 is a schematic constitution diagram showing still another example of the deformable mirror 100 applicable to the optical system of the present invention. In this deformable mirror 100, a piezoelectric element 100c is sandwiched between the thin film 100a and the electrode 100d, and a voltage is applied between the thin film 100a and the electrode 100d via driving circuits 110 controlled by the operation device 104. Furthermore, a voltage is separately applied to electrodes 100b disposed on the support base 108 via a driving circuit 110 controlled by the operation device 104. Therefore, the deformable mirror can doubly be deformed by the voltage applied between the thin film 100a and the electrode 100d, and an electrostatic force generated by the voltage applied to the electrodes 100b. As a result, there is an advantage that more deformation patterns are possible, and the response characteristic is high as compared with the example shown in FIGS. 29, 32.

Moreover, when a sign of the voltage between the thin film 100a and the electrode 100d is changed, the deformable mirror 100 can be deformed into a convex or concave surface. In this case, a large deformation is performed by a piezoelectric effect, and a fine deformation may be performed by the electrostatic force. Alternatively, a piezoelectric effect is mainly used in the deformation into the convex surface, and the electrostatic force may be mainly used in the deformation into the concave surface. It is to be noted that the electrode 100d may be constituted of a plurality of electrodes in the same manner as in the electrodes 100b. This state is shown in FIG. 33. It is to be noted that in the present application, the piezoelectric effect, an electrostrictive effect, and electrostriction are all referred to as the piezoelectric effect. Therefore, it is assumed that an electrostrictive material is included in the piezoelectric material.

Figure 34:
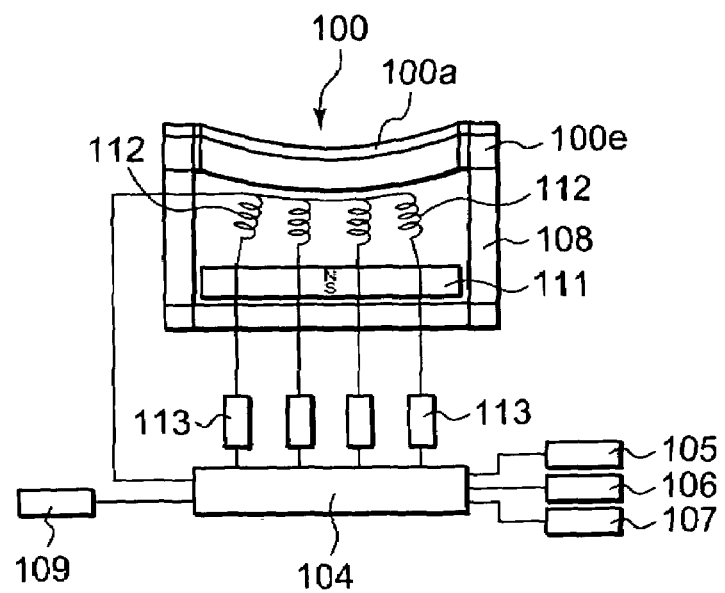
FIG. 34 is a schematic constitution diagram showing a further example of the deformable mirror applicable to the present invention.

FIG. 34 is a schematic constitution diagram showing a further example of the deformable mirror 100 applicable to the optical system of the present invention.

In this deformable mirror 100, the shape of the reflective surface may be changed using an electromagnetic force. A permanent magnet 111 is disposed on the inner bottom surface of the support base 108, and the peripheral edge portion of the substrate 100e made of silicon nitride, polyimide or the like is fixed to upper ends of the support base. The thin film 100a coated with a metal such as aluminum is disposed on the surface of the substrate 100e to constitute the deformable mirror 100. An undersurface of the substrate 100e is provided with a plurality of coils 112, and these coils 112 are connected to the operation device 104 via driving circuits 113, respectively. Therefore, the change of the state of the optical system is judged in the operation device 104 based on signals from sensors 105, 106, 107, and 109. When an output signal is applied from the operation device 104 to each driving circuit 113 in response to the change of the optical system, an appropriate current is supplied from each driving circuit 113 to each coil 112, each coil 112 is repelled or attracted by an electromagnetic force working between the coil 112 and the permanent magnet 111, thereby deforming the substrate 100e and the thin film 100a.

In this case, different amounts of currents may be allowed to flow through the coils 112, respectively. Moreover, only one coil 112 may be disposed. Alternatively, the permanent magnet 111 may be disposed on the substrate 100e, and the coils 112 may be disposed on the inner bottom surface of the support base 108. Each coil 112 may be made by a method such as lithography, and the coil 112 may be provided with an iron core formed of a ferromagnetic material.

Figure 35:
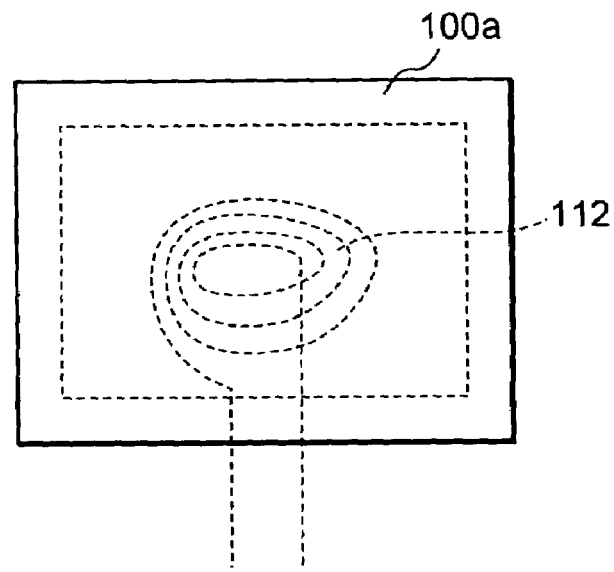
FIG. 35 is an explanatory view showing an example of an arrangement of thin-film coils for use in the deformable mirror of FIG. 34.

In this case, when the winding density of the thin-film coil 112 is changed with a place as shown in FIG. 35, the substrate 100e and the thin film 100a can be deformed in a desired manner. One coil 112 may be disposed, or a core formed of a ferromagnetic material may be inserted in the coils 112. It is to be noted that FIG. 35 is a diagram (plan view) of the reflective surface of the deformable mirror of FIG. 34. In FIG. 35, broken lines show the boundary between the portion supported by the support base 108 and the deformable portion, and the coil 112 disposed behind.

Figure 36:
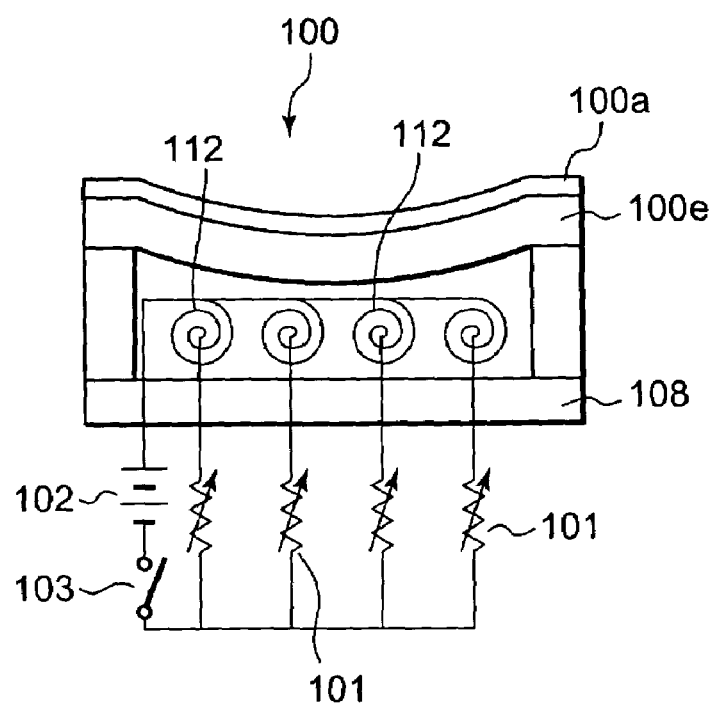
FIG. 36 is a schematic constitution diagram showing a still further example of the deformable mirror applicable to the present invention.

FIG. 36 is a schematic constitution diagram showing a still further example of the deformable mirror 100 applicable to the optical system of the present invention. In FIG. 36, reference numeral 102 denotes a power supply.

In this deformable mirror 100, the substrate 100e is formed of a ferromagnetic material such as iron, and the thin film 100a as a reflective film is made of aluminum or the like. In this case, since any thin-film coil does not have to be disposed, the structure can be simplified, and manufacturing costs can be reduced. Reference numeral 103 is a power switch 103 for turning on and off the power supply 102. When this switch 103 is replaced with a switch having a function of switching the direction of current-flow and a function of turning on and off the power supply, the direction of the current flowing through each coil 112 can be changed, and shapes of the substrate 100e and the thin film 100a can freely be changed.

Figure 37:
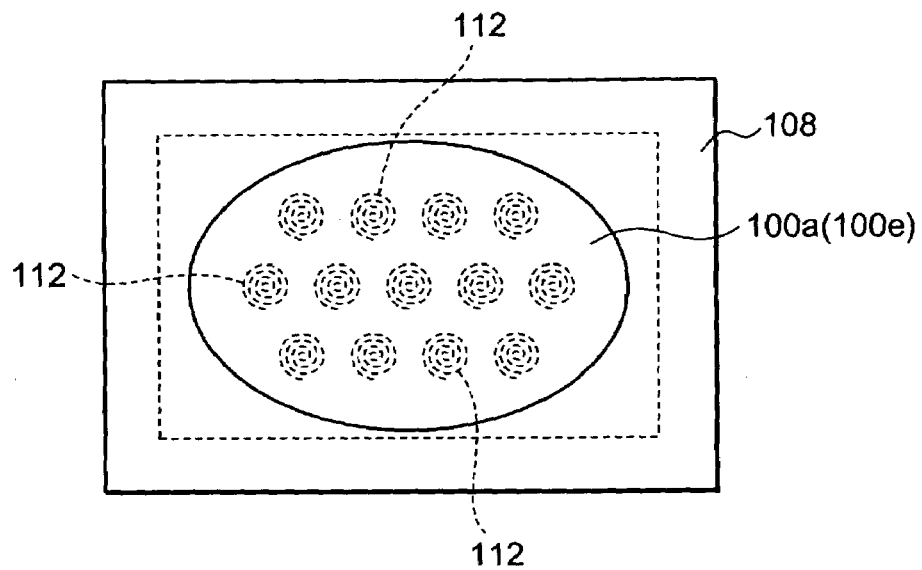
FIG. 37 is an explanatory view showing an example of an arrangement of coils in the deformable mirror of FIG. 36.
Figure 38:
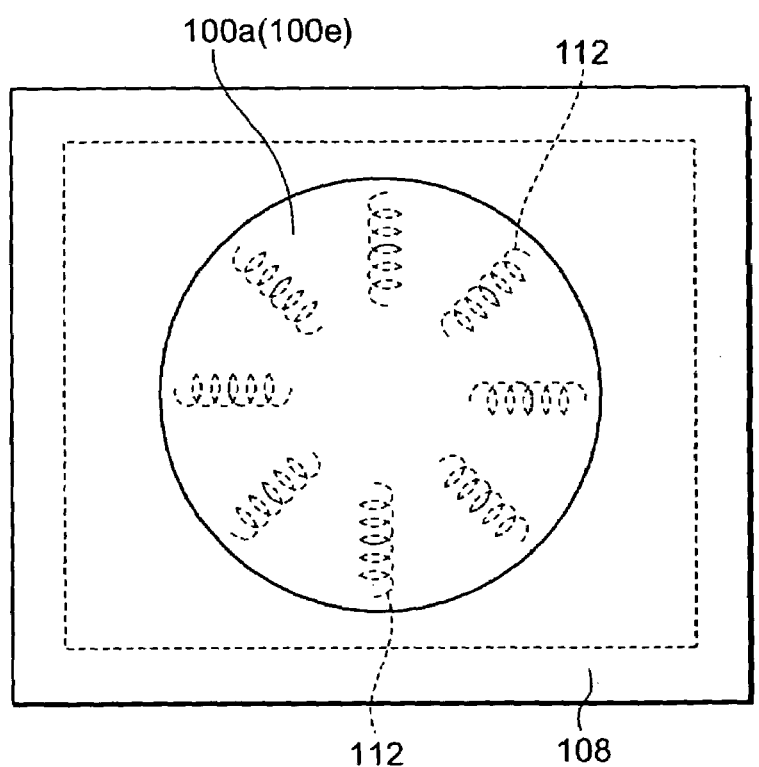
FIG. 38 is an explanatory view showing another example of the arrangement of the coils in the deformable mirror of FIG. 36.
Figure 39:
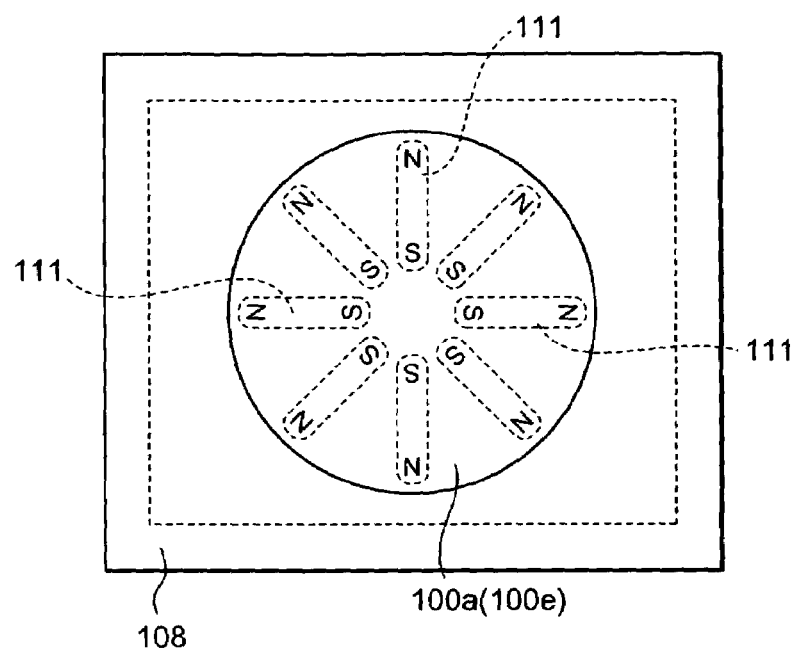
FIG. 39 is an explanatory view showing an arrangement of permanent magnets in a case where the coils are arranged as shown in FIG. 38 in the example of FIG. 34.

FIG. 37 shows an example of an arrangement of the coils 112, and FIG. 38 shows another example of the arrangement of the coils 112. These arrangements are also applicable to the deformable mirror shown in FIG. 34. It is to be noted that FIG. 39 shows an arrangement of permanent magnets 111, which is applicable in a case where the coils are arranged as shown in FIG. 38. That is, when the permanent magnets 111 are radially arranged as shown in FIG. 39, the substrate 100e and the thin film 100a can subtly be deformed. In a case where the substrate 100e and the thin film 100a are deformed using an electromagnetic force (examples of FIGS. 34 and 35), there is an advantage that the mirror can be driven at a small voltage as compared with the case where an electrostatic force is used.

Several examples of the deformable mirror have been described above, but two or more types of forces may be used in deforming the mirror as shown in the example of FIG. 33. That is, the mirror may be deformed simultaneously by use of two or more of an electrostatic force, an electromagnetic force, piezoelectric effect, magnetostriction, a fluid pressure, an electric field, a magnetic field, a temperature change, an electromagnetic wave and the like. That is, when the deformable mirror is driven using two or more different driving methods, large deformation can be realized simultaneously with fine deformation, and a high-precision mirror surface can be realized.

Figure 40:
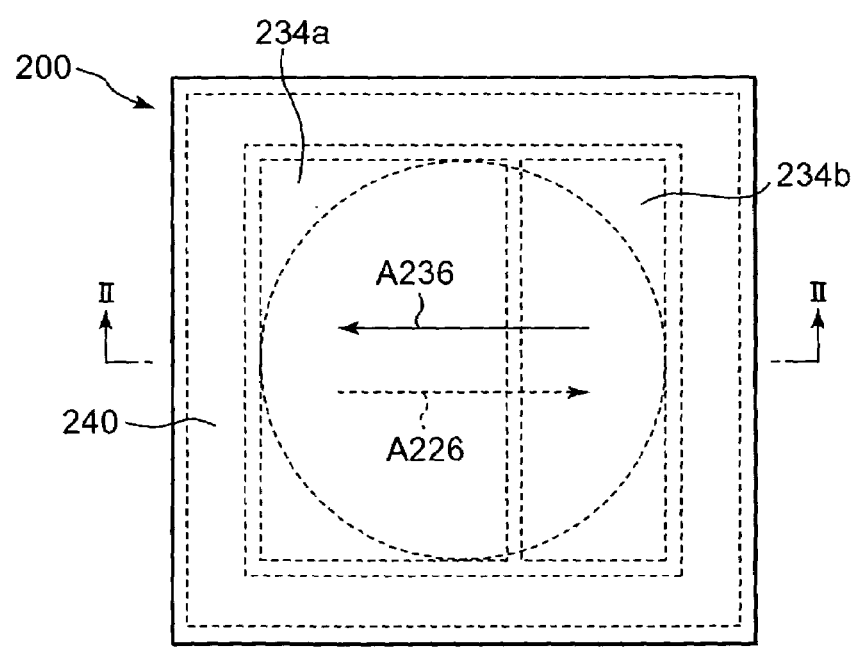
FIG. 40 is a plan view showing an example of a liquid crystal lens applicable to the present invention.
Figure 41:
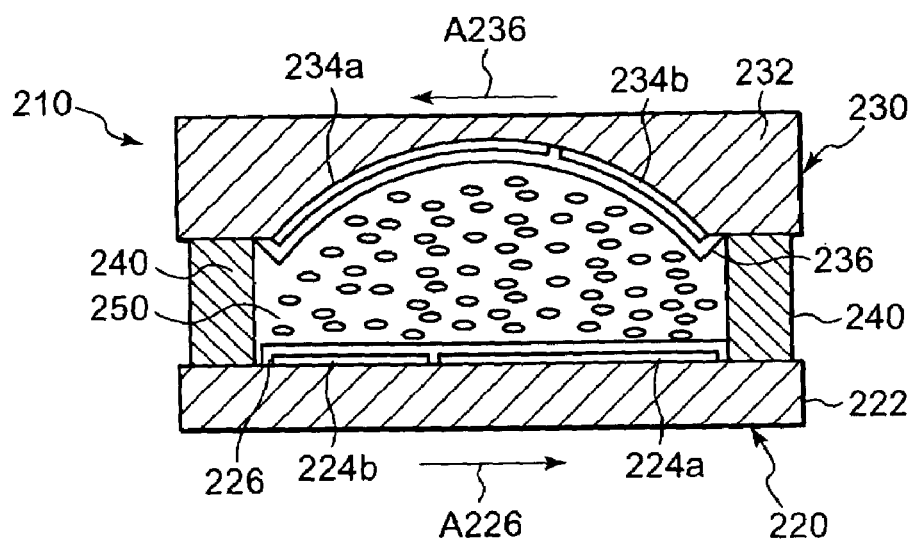
FIG. 41 is a sectional view of the liquid crystal lens cut along the II-II line of FIG. 40.
Figure 42:
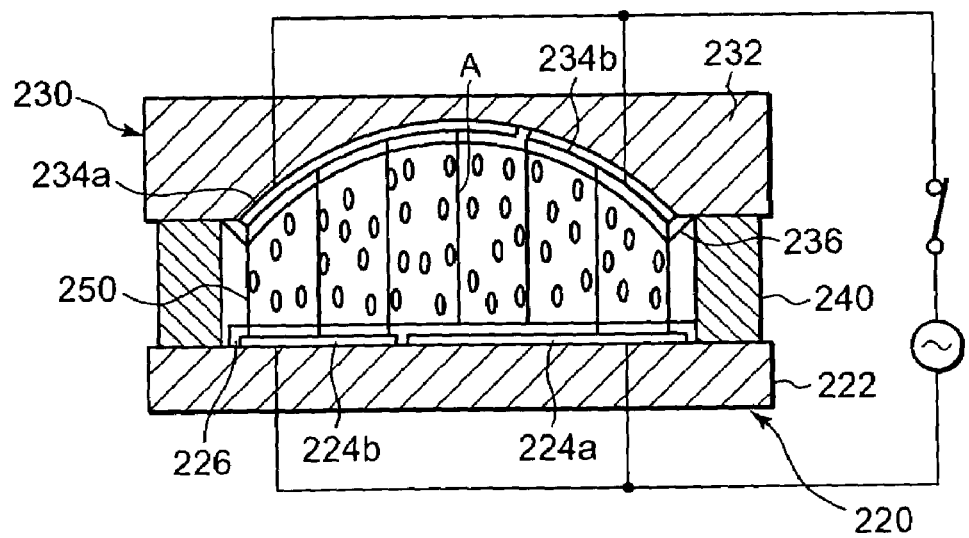
FIG. 42 is an explanatory view showing a method of applying a voltage to each electrode in a case where the liquid crystal lens of FIG. 40 is operated as a lens having an ordinary ray refractive index.
Figure 43:
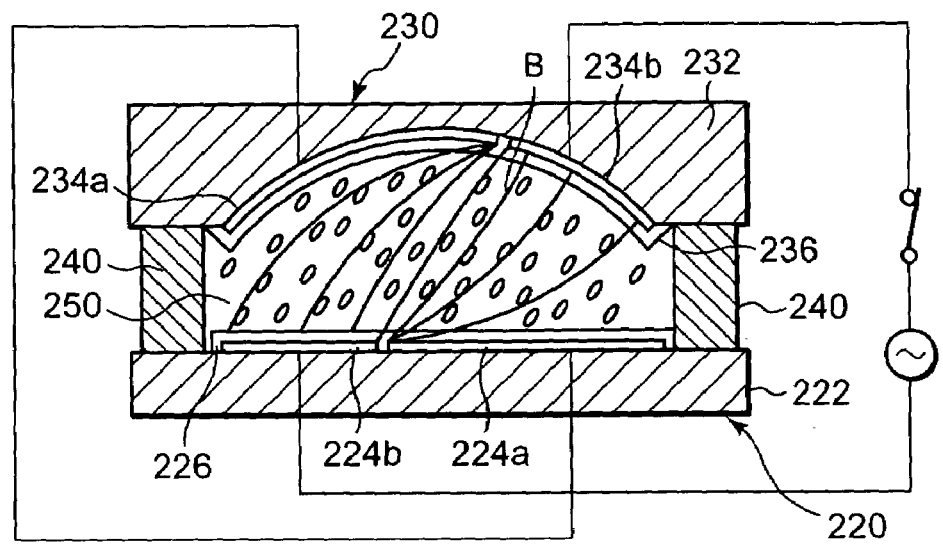
FIG. 43 is an explanatory view showing a method of applying a voltage to each electrode in a case where the liquid crystal lens of FIG. 40 is operated as a lens having an extraordinary ray refractive index.

Next, there will be described an example of a liquid crystal lens 200 applicable to the optical system of the present invention with reference to FIGS. 40 to 43. FIG. 40 is a plan view of the liquid crystal lens, and FIG. 41 is a sectional view of the liquid crystal lens cut along the A-A line of FIG. 40. FIGS. 42 and 43 are explanatory views showing an operation of the liquid crystal lens.

As shown in FIGS. 40 and 41, the liquid crystal lens 200 includes a positive nematic liquid crystal 250 having positive permittivity anisotropy, and a cell 210 which holds the positive nematic liquid crystal having a convex shape. The cell 210 has two optically transparent substrates 220 and 230 bonded to each other with a spacer 240, and the liquid crystal 250 is held in a space thus formed into the convex shape. One substrate 220 has a flat plate shape, and the other substrate 230 has a plano-concave lens shape.

The flat substrate 220 includes: a flat plate 222; an undercoat layer (not shown) formed on the flat plate; two transparent electrodes 224a, 224b formed on the layer; and a parallel orientation layer 226 to cover these electrodes. The flat plate 222 is made of, for example, barium crown glass, but may be made of crown glass or flint glass. The undercoat layer is, for example, a silicon dioxide film, and functions as a barrier layer against alkali ions eluted from the glass plate.

The transparent electrodes 224a, 224b are optically transparent conductive films such as indium tin oxide films, but they may be indium tin oxide films, antimony added tin oxide films, zinc oxide films or the like. Two transparent electrodes 224a, 224b have a different-size rectangular shape, these electrodes are arranged at a small interval in parallel with each other, and they entirely form a square outline. In another viewpoint, the square formed by the transparent electrodes 224a, 224b can be said to be divided along a straight line in an asymmetrical position deviating from the center of the square. The straight line is parallel to a straight line that passes through the center of the square and is in parallel with a pair of opposite sides of the square.

The parallel orientation layer 226 is an organic orientation film which orients a liquid crystal material in a specific direction, and is, for example, a polyimide-based orientation film, but it may be a polyimide-based orientation film, a polyamide-based orientation film or the like. The parallel orientation layer 226 is formed in parallel with the flat surface of the flat glass plate and is subjected to an orientation treatment such as rubbing in a direction shown by an arrow A226. That is, the orientation treatment is performed in a direction from the small transparent electrode 224b toward the large transparent electrode 224a. The orientation treatment is performed so as to form a pre-tilt angle of 1 to 5° with respect to the flat surface of the flat plate 222 from a start point toward an end point of the orientation treatment direction A226.

The flat substrate 220 further has a polarization plate (not shown) laminated on the outer flat surface of the flat plate 222, and a polarization direction of the polarization plate agrees with the direction of the orientation treatment performed on the orientation layer 226.

Moreover, the concave substrate 230 includes: a plano-concave plate 232 having a concave surface; an undercoat layer (not shown) formed on the surface including the concave surface; two transparent electrodes 234a, 234b formed on the layer; and a parallel orientation layer 236 to cover these electrodes. The plano-concave plate 232 is made of, for example, barium crown glass, but may be made of crown glass or flint glass. The undercoat layer is, for example, a silicon dioxide film, and functions as a barrier layer against alkali ions eluted from the glass plate.

The transparent electrodes 234a, 234b are optically transparent conductive films such as indium tin oxide films, but they may be indium tin oxide films, antimony added tin oxide films, zinc oxide films or the like. Two transparent electrodes 234a, 234b have a different-size rectangular shape at a time when they are projected on a plane parallel to the flat plate 222. These electrodes are arranged at a small interval in parallel with each other, and they entirely form a square outline. In another viewpoint, the square formed by the transparent electrodes 234a, 234b can be said to be divided along a straight line in an asymmetrical position deviating from the center of the square. The straight line is parallel to a straight line that passes through the center of the square and is in parallel with a pair of opposite sides of the square.

The parallel orientation layer 236 is an organic orientation film which orients a liquid crystal material in a specific direction, and is, for example, a polyimide-based orientation film, but it may be a polyimide-based orientation film, a polyamide-based orientation film or the like. The parallel orientation layer 236 is formed in parallel with the flat surface of the glass plate and is subjected to an orientation treatment such as rubbing in a direction shown by an arrow A236. That is, the orientation treatment is performed in a direction from the small transparent electrode 234b toward the large transparent electrode 234a. The orientation treatment is performed so as to form a pre-tilt angle of 1 to 5° with respect to the flat surface of the plano-concave plate 232 from a start point toward an end point of the orientation treatment direction A236.

The flat substrate 220 is bonded to the concave substrate 230 with the spacer 240 therebetween to constitute the cell 210. In a case where the cell is formed, the flat substrate 220 is bonded to the concave substrate 230 with the spacer 240 therebetween. At first, a sealing agent mixed with beads of plastic, glass or the like is applied on each of the substrates by a method such as screen printing or a dispenser. Then, the substrates and the spacer 240 is bonded together and the sealing agent is cured by heating the agent while pressurizing the agent, or irradiating the agent with an ultraviolet ray. The sealing agent is, for example, an epoxy-based thermosetting type sealing agent, but it may be an epoxy-based thermosetting type sealing agent, an epoxy-based ultraviolet curable type sealing agent, an acrylic thermosetting type sealing agent, an acrylic ultraviolet curable type sealing agent or the like.

An injection port (not shown) for injecting the liquid crystal is disposed in at least a part of the spacer 240, and the cell 210 is disposed in a vacuum chamber. After the chamber is evacuated, the nematic liquid crystal 250 is brought into contact with the injection port. Accordingly, the cell 210 is filled with the nematic liquid crystal 250. After filling the cell with the nematic liquid crystal 250, the injection port is coated with a sealant (not shown), and the sealant is cured to seal the nematic liquid crystal 250. The sealant is, for example, an epoxy-based ultraviolet curable type sealant, but it may be an epoxy-based thermosetting type sealant, an epoxy-based ultraviolet curable type sealant, an acrylic thermosetting type sealant, an acrylic ultraviolet curable type sealant or the like.

The flat substrate 220 is bonded to the concave substrate 230 via spacer 240 so that the orientation treatment direction A226 of the parallel orientation layer 226 is different from the orientation treatment direction A236 of the parallel orientation layer 236 as much as 180°, that is, they are directed opposite to each other. Therefore, the boundary between two transparent electrodes 224a and 224b of the flat substrate 220 is positioned symmetrically to the boundary between two transparent electrodes 234a and 234b of the concave substrate 230 with respect to a line passing through the center of the liquid crystal lens 200 and extending perpendicular to the orientation treatment direction A226 or A236. The distance from the boundary between the transparent electrodes 224a and 224b to that between the transparent electrodes 234a and 234b is preferably twice or less, for example, 1.4 times the maximum distance between the transparent electrodes 224a and 224b and the transparent electrodes 234a and 234b.

The transparent electrodes 224a, 224b, 234a, and 234b are connected to wiring line electrodes (not shown) to which voltages are to be applied, respectively. Each wiring line electrode is connected to a driving circuit (not shown) via a wiring line member (not shown) connected to the electrode by use of an anisotropic conductive adhesive, solder or the like. The wiring line electrode may be a film formed of the same material as that of the transparent electrodes 224a, 224b, 234a, and 234b, but the wiring line electrode is more preferably a film formed of a more highly conductive material such as gold, silver, copper, nickel, chromium, or carbon.

The polarization direction of light entering the liquid crystal lens 200 from the flat substrate 220 side is adjusted by the polarization plate disposed on the surface of the lens. The light enters the nematic liquid crystal 250 having the convex shape.

In a state in which any voltage is not applied between the transparent electrodes 224a and 224b and the transparent electrodes 234a and 234b, liquid crystal molecules are arranged along the orientation treatment direction of the parallel orientation layer. Therefore, the polarization direction of the incident light polarized by the polarization plate becomes parallel to the orientation direction of the nematic liquid crystal 250, and the incident light is influenced by an extraordinary ray refractive index of the nematic liquid crystal 250. That is, the nematic liquid crystal 250 held into the convex shape functions as a convex lens having an extraordinary ray refractive index with respect to the incident light polarized in parallel with the orientation treatment direction of the parallel orientation layer.

On the other hand, when the voltage is applied between the transparent electrodes 224a and 224b and the transparent electrodes 234a and 234b as shown in FIG. 42, an electric field is applied to the nematic liquid crystal 250, and the liquid crystal molecules rotate in a direction of the electric field. The molecules are arranged perpendicularly to the flat substrate 220 and the flat surface of the concave substrate 230. Therefore, the polarization direction of the incident light polarized by the polarization plate is perpendicular to the orientation direction of the nematic liquid crystal 250, and the incident light is influenced by an ordinary ray refractive index of the nematic liquid crystal 250. That is, the nematic liquid crystal 250 held into the convex shape functions as a convex lens having the ordinary ray refractive index with respect to the incident light polarized in parallel with the orientation treatment direction of the parallel orientation layer.

Therefore, in a case where the liquid crystal lens 200 is allowed to function as the convex lens having the extraordinary ray refractive index, the driving circuit does not apply any voltage between the transparent electrodes 224a and 224b and the transparent electrodes 234a and 234b.

In a case where the liquid crystal lens 200 is allowed to function as the convex lens having the ordinary ray refractive index, as shown in FIG. 42, the driving circuit electrically connects the transparent electrode 224a to the transparent electrode 224b of the flat-plate substrate 220 by use of a relay switch or the like to obtain an equal potential. Moreover, the driving circuit electrically connects the transparent electrode 234a to the transparent electrode 234b of the concave substrate 230 to obtain an equal potential. Furthermore, an alternating voltage of several volts to several tens of volts is applied between the transparent electrodes 224a and 224b and the transparent electrodes 234a and 234b. This application of the alternating voltage generates the electric field having a line of electric force A which is substantially perpendicular to the flat surface of the substrate between the transparent electrodes 224a and 224b and the transparent electrodes 234a and 234b. The liquid crystal molecules of the nematic liquid crystal 250 are influenced by this electric field to rotate, and are arranged in parallel with the line of electric force A. In this case, all the liquid crystal molecules rotate in the same direction due to the above-described pre-tilt angle.

To switch the liquid crystal lens 200 from a state in which the lens functions as the convex lens having the ordinary ray refractive index to a state in which the lens functions as the convex lens having the extraordinary ray refractive index, as shown in FIG. 43, the driving circuit first electrically connects the large transparent electrode 224a to the large transparent electrode 234a for about several to several tens of milliseconds. Moreover, the circuit applies, between two small transparent electrodes 224b and 234b, an alternating voltage having a magnitude about twice that of the alternating voltage applied in a case where the lens functions as the convex lens having the ordinary ray refractive index. Thereafter, the driving circuit stops the application of the voltage between the transparent electrodes 224b and 234b to electrically connect the transparent electrode 224b to 234b.

In the control of the voltages to be applied to the transparent electrodes 224a, 224b, 234a, and 234b as shown in FIG. 43, a potential difference is eliminated between the transparent electrodes 224a and 234a, and an electric field is generated between the transparent electrodes 224b and 234b, the electric field having a line of electric force B which is inclined in the orientation treatment direction with respect to the flat surface of the substrate (e.g., the flat substrate 220 or the flat surface of the concave substrate 230). This electric field rotates, in a direction of the line of electric force B, the liquid crystal molecules of the nematic liquid crystal 250 arranged perpendicularly to the flat surface of the substrate.

That is, there is applied, to the liquid crystal molecules, a force for rotating the molecules in such a direction as to return to a state in which any electric field is not applied to the molecules. After the application of the voltage is stopped, the liquid crystal molecules are returned to a state in which the molecules are arranged in the orientation treatment direction of the parallel orientation layers 226, 236 in accordance with characteristics inherent in a liquid crystal material.

As described above, in this liquid crystal lens 200, the liquid crystal molecules of the nematic liquid crystal 250 are forcibly rotated in an initial stage in a case where the convex lens having the ordinary ray refractive index is switched to the convex lens having the extraordinary ray refractive index. Therefore, a falling time is reduced from a time when the liquid crystal molecules are arranged perpendicularly to the flat surface of the substrate until the molecules are returned to a parallel arrangement.

The boundary between the transparent electrodes 224a and 224b is positioned symmetrically to the boundary between the transparent electrodes 234a and 234b with respect to a line passing through the center of the liquid crystal lens 200 and extending perpendicularly to the orientation treatment direction. Therefore, an intensity of the electric field is largest in the center of the liquid crystal lens 200 in which an interval between the transparent electrodes 224a and 224b and the transparent electrodes 234a and 234b is largest. Therefore, the falling time is efficiently reduced.

Furthermore, an interval from the boundary between the transparent electrodes 224a and 224b to the boundary between the transparent electrodes 234a and 234b is 1.4 times to twice the maximum value of the interval between the transparent electrodes 224a and 224b and the transparent electrodes 234a and 234b. The voltage to be applied between the transparent electrodes 224b and 234b does not have to be especially high as compared with the driving voltage for allowing the lens to function as the convex lens having the ordinary ray refractive index.

A constitution of each component of the liquid crystal lens can variously be modified and changed.

In this example, the voltage to be applied to the transparent electrode is, for example, an alternating voltage, but a direct-current voltage may be applied.

Moreover, in the liquid crystal lens 200, the cell 210 is constituted by laminating two transparent substrates via a spacer, and the lens has one liquid crystal layer held by the cell. However, two or more cells may be constituted by laminating three or more transparent substrates, and the lens may have two or more liquid crystal layers held by the cells. In this case, any polarization plate is not required.

Furthermore, one transparent substrate has a plano-concave plate whereas the other transparent substrate has a flat plate, but the shape of the transparent substrate is not limited to this shape. Furthermore, two transparent substrates are formed of a material such as glass, but each substrate may be formed of a material such as plastic.

Figure 44:
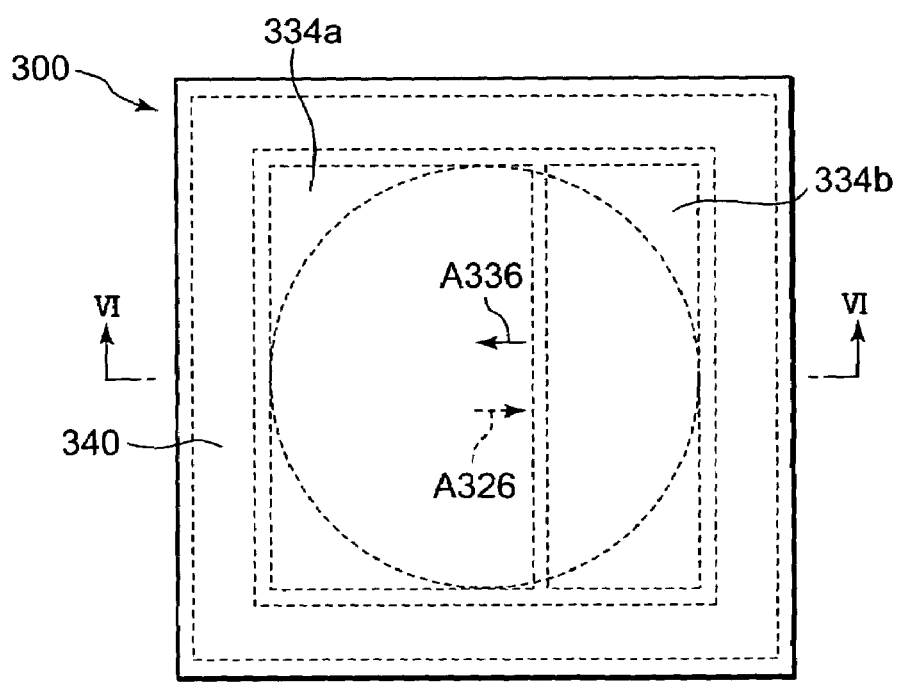
FIG. 44 is a plan view showing another example of the liquid crystal lens applicable to the present invention.
Figure 45:
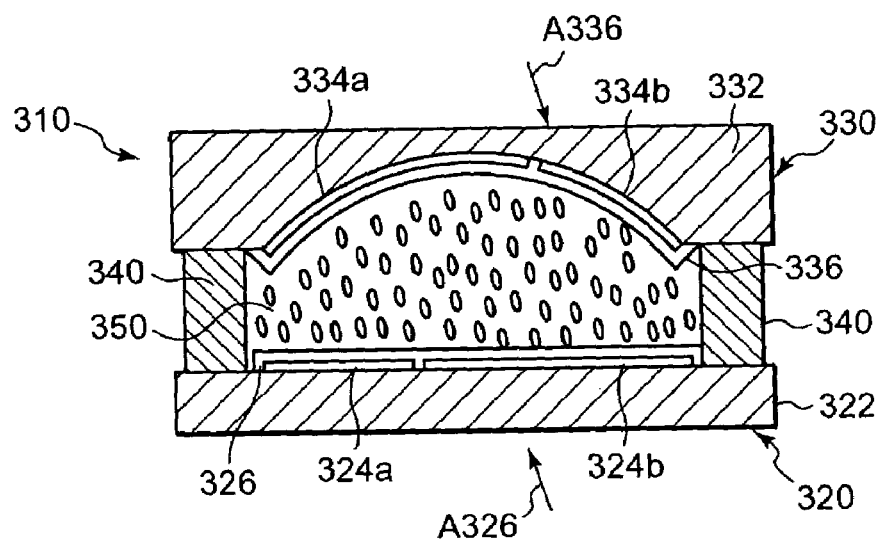
FIG. 45 is a sectional view of the liquid crystal lens cut along the VI-VI line of FIG. 44.
Figure 46:
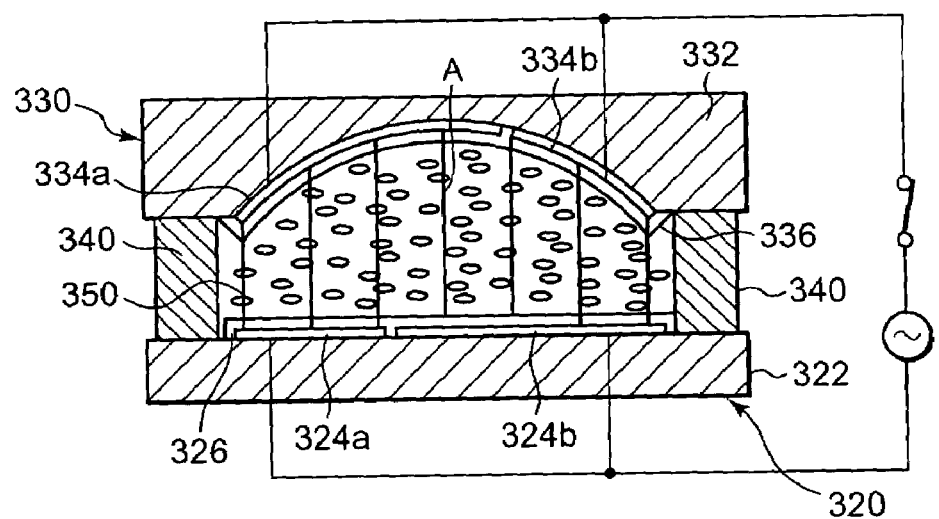
FIG. 46 is an explanatory view showing a method of applying a voltage to each electrode in a case where the liquid crystal lens of FIG. 44 is operated as the lens having the ordinary ray refractive index.
Figure 47:
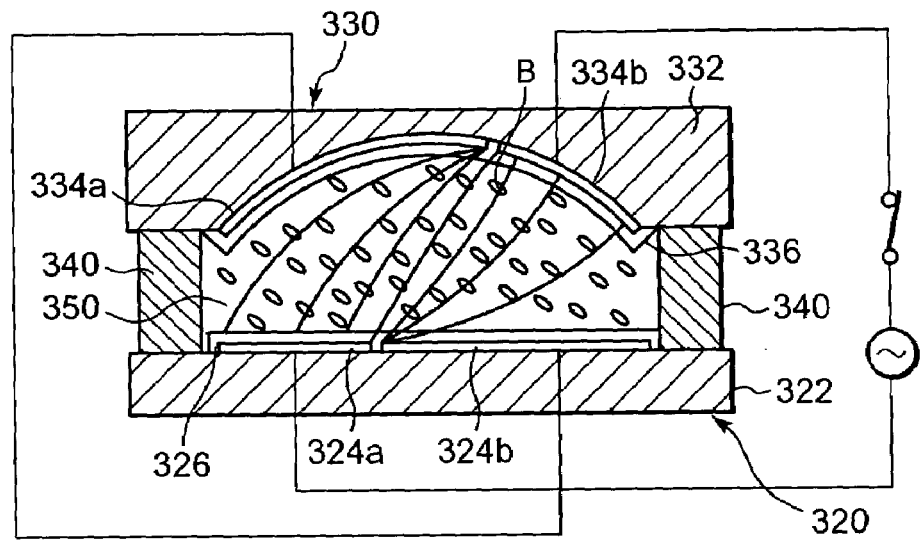
FIG. 47 is an explanatory view showing a method of applying a voltage to each electrode in a case where the liquid crystal lens of FIG. 44 is operated as the lens having the extraordinary ray refractive index.

There will be described another example of a liquid crystal lens 300 applicable to the optical system of the present invention with reference to FIGS. 44 to 47. FIG. 44 is a plan view of the liquid crystal lens, and FIG. 45 is a sectional view of the liquid crystal lens cut along the B-B line of FIG. 44. FIGS. 46 and 47 are explanatory views showing an operation of the liquid crystal lens.

As shown in FIGS. 44 and 45, the liquid crystal lens 300 includes: a nematic liquid crystal 350 having negative permittivity anisotropy; and a cell 310 which holds the liquid crystal having a convex shape. The cell 310 has two optically transparent substrates 320 and 330 bonded to each other with a spacer 340 therebetween to thereby form a space having a convex shape. The liquid crystal 350 is held in the space. One transparent substrate 320 has a flat plate shape, and the other transparent substrate 330 has a plano-concave lens shape.

The flat substrate 320 includes: a flat plate 322; an undercoat layer (not shown) formed on the flat plate; two transparent electrodes 324a, 324b formed on the layer; and a perpendicular orientation layer 326 to cover these electrodes.

Two transparent electrodes 324a, 324b have a different-size rectangular shape. These electrodes are arranged at a small interval in parallel with each other, and they entirely form a square outline. In another viewpoint, a square formed by the transparent electrodes 324a, 324b can be said to be divided along a straight line in an asymmetrical position deviating from the center of the square. The straight line is parallel to a straight line that passes through the center of the square and is in parallel with a pair of opposite sides of the square.

The perpendicular orientation layer 326 is made of a silane coupling agent, polysiloxane, chromium complex or the like, and has a function of orienting liquid crystal molecules having negative permittivity anisotropy perpendicularly to the flat surface of the flat plate 322. The perpendicular orientation layer 326 is constituted by subjecting the flat surface of the flat plate to an orientation treatment such as rubbing, and an orientation treatment direction is as shown by an arrow A326. The orientation treatment is performed so as to form a pre-tilt angle of 1 to 5° in a direction perpendicular to the flat surface of the flat plate 322 from a start point toward an end point of the orientation treatment direction A326.

The flat substrate 320 further has a polarization plate (not shown) laminated onto an outer flat surface of the flat plate 322, and a polarization direction of the plate crosses, at right angles, the direction of the orientation treatment performed on the flat substrate 320.

Moreover, the concave substrate 330 includes: a plano-concave plate 332 having a concave surface; an undercoat layer (not shown) formed on the surface including the concave surface; two transparent electrodes 334a, 334b formed on the layer; and a perpendicular orientation layer 336 to cover these electrodes.

Two transparent electrodes 334a, 334b have a different-size rectangular shape at a time when they are projected on a plane parallel to the flat plate 322. These electrodes are arranged at a small interval in parallel with each other, and they entirely form a square outline. In another viewpoint, a square formed by the transparent electrodes 334a, 334b can be said to be divided along a straight line in an asymmetrical position deviating from the center of the square. The straight line passes through the center of the square and is in parallel with a pair of opposite sides of the square.

The perpendicular orientation layer 336 is made of a silane coupling agent, polysiloxane, chromium complex or the like, and has a function of orienting liquid crystal molecules having negative permittivity anisotropy perpendicularly to the flat surface of the piano-concave plate 332. The perpendicular orientation layer 336 is subjected to an orientation treatment such as rubbing, and a direction substantially perpendicular to the flat surface of the piano-concave plate 332 and indicated by an arrow A336 is an orientation treatment direction. That is, the orientation treatment is performed perpendicularly to a boundary between two transparent electrodes 334a, 334b. The orientation treatment is performed so as to form a pre-tilt angle of 1 to 5° in a direction perpendicular to the flat surface of the piano-concave plate 332 from a start point toward an end point of the orientation treatment direction A336.

The flat substrate 320 is bonded to the concave substrate 330 with the spacer 340 therebetween to constitute the cell 310. In a case where the cell is formed, the flat substrate 320 is bonded to the concave substrate 330 with the spacer 340 therebetween.

At first, a sealing agent mixed with beads of plastic, glass or the like is applied on each of the substrates by a method such as screen printing or a dispenser. Then, the substrates and the spacer 240 are bonded together and the sealing agent is cured by heating the agent while pressurizing the agent, or irradiating the agent with an ultraviolet ray.

An injection port (not shown) for injecting the liquid crystal is disposed in at least a part of the spacer 340, and the cell 310 is disposed in a vacuum chamber. After the chamber is evacuated, the nematic liquid crystal 350 is brought into contact with the injection port. Accordingly, the cell 310 is filled with the nematic liquid crystal 350. After filling the cell with the nematic liquid crystal 350, the injection port is coated with a sealant (not shown), and the sealant is cured to seal the nematic liquid crystal 350.

The flat substrate 320 is bonded to the concave substrate 330 via spacer 340 so that the orientation treatment direction A326 of the perpendicular orientation layer 326 is different from the orientation treatment direction A336 of the perpendicular orientation layer 336 as much as 180°, that is, they are directed opposite to each other. Therefore, a boundary between two transparent electrodes 324a and 324b of the flat substrate 320 is positioned symmetrically to a boundary between two transparent electrodes 334a and 334b of the concave substrate 330 with respect to the center of the liquid crystal lens 300. A distance from the boundary between the transparent electrodes 324a and 324b to that between the transparent electrodes 334a and 334b is preferably twice or less, for example, 1.4 times the maximum distance between the transparent electrodes 324a and 324b and the transparent electrodes 334a and 334b.

The transparent electrodes 324a, 324b, 334a, and 334b are connected to wiring line electrodes (not shown) to which voltages are to be applied, respectively. Each wiring line electrode is connected to a driving circuit (not shown) via a wiring line member (not shown) connected to the electrode by use of an anisotropic conductive adhesive, solder or the like.

The polarization direction of light entering the liquid crystal lens 300 from a flat substrate 320 side is adjusted by the polarization plate disposed on the surface of the lens. The light enters the nematic liquid crystal 350 having the convex shape.

In a state in which any voltage is not applied between the transparent electrodes 324a and 324b and the transparent electrodes 334a and 334b, liquid crystal molecules are arranged perpendicularly to the flat surfaces of the flat plates 322 and the plano-concave plate 332 by the perpendicular orientation layers 326, 336. Therefore, the polarization direction of the incident light polarized by the polarization plate becomes perpendicular to the orientation direction of the nematic liquid crystal 350, and the incident light is influenced by an ordinary ray refractive index of the nematic liquid crystal 350. That is, the nematic liquid crystal 350 held into the convex shape functions as a convex lens having an ordinary ray refractive index with respect to the incident light polarized perpendicularly to the orientation treatment direction of the perpendicular orientation layer.

On the other hand, when the voltage is applied between the transparent electrodes 324a and 324b and the transparent electrodes 334a and 334b as shown in FIG. 46, an electric field is applied to the nematic liquid crystal 350, and the liquid crystal molecules rotate in a direction perpendicular to the electric field. The molecules are arranged in parallel with the flat substrate 320 and the flat surface of the concave substrate 330. Therefore, the polarization direction of the incident light polarized by the polarization plate is parallel to the orientation direction of the nematic liquid crystal 350, and the incident light is influenced by an extraordinary ray refractive index of the nematic liquid crystal 350. That is, the nematic liquid crystal 350 held into the convex shape functions as a convex lens having the extraordinary ray refractive index with respect to the incident light polarized perpendicularly to the orientation treatment direction of the perpendicular orientation layer.

Therefore, in a case where the liquid crystal lens 300 is allowed to function as the convex lens having the ordinary ray refractive index, the driving circuit does not apply any voltage between the transparent electrodes 324a and 324b and the transparent electrodes 334a and 334b.

In a case where the liquid crystal lens 300 is allowed to function as the convex lens having the extraordinary ray refractive index, as shown in FIG. 46, the driving circuit electrically connects the transparent electrode 324a to the transparent electrode 324b of the flat substrate 320 by use of a relay switch or the like to obtain an equal potential. Moreover, the circuit electrically connects the transparent electrode 334a to the transparent electrode 334b of the concave substrate 330 to obtain an equal potential. Furthermore, an alternating voltage of several volts to several tens of volts is applied between the transparent electrodes 324a and 324b and the transparent electrodes 334a and 334b. This application of the alternating voltage generates an electric field having a line of electric force A which is substantially perpendicular to the flat surface of the substrate between the transparent electrodes 324a and 324b and the transparent electrodes 334a and 334b. The liquid crystal molecules of the nematic liquid crystal 350 are influenced by this electric field to rotate, and are arranged perpendicularly to the line of electric force A. In this case, all the liquid crystal molecules rotate in the same direction due to the above-described pre-tilt angle.

To switch the liquid crystal lens 300 from a state in which the lens functions as the convex lens having the extraordinary ray refractive index to a state in which the lens functions as the convex lens having the ordinary ray refractive index, as shown in FIG. 47, the driving circuit first electrically connects the large transparent electrode 324b to the large transparent electrode 334a for about several to several tens of milliseconds. Moreover, the circuit applies, between two small transparent electrodes 324a and 334b, an alternating voltage having a magnitude about twice that of the alternating voltage applied in a case where the lens functions as the convex lens having the extraordinary ray refractive index. Thereafter, the driving circuit stops the application of the voltage between the transparent electrodes 324a and 334b to electrically connect the transparent electrode 324a to 334b.

In the control of the voltages to be applied, a potential difference is eliminated between the transparent electrodes 324b and 334a, and an electric field is generated between the transparent electrodes 324a and 334b, the electric field having a line of electric force B which is inclined perpendicularly to the orientation treatment direction with respect to the flat surface of the substrate (e.g., the flat substrate 320 or the flat surface of the concave substrate 330). This electric field rotates, in a direction perpendicularly to that of the line of electric force B, the liquid crystal molecules of the nematic liquid crystal 350 arranged in parallel with the flat surface of the substrate. That is, there is applied, to the liquid crystal molecules, a force for rotating the molecules in such a direction as to return to a state in which any electric field is not applied to the molecules. After the application of the voltage is stopped, the liquid crystal molecules are returned to a state in which the molecules are arranged perpendicular to the flat surface of the substrate in accordance with characteristics inherent in a liquid crystal material.

As described above, in the liquid crystal lens 300, the liquid crystal molecules of the nematic liquid crystal 350 are forcibly rotated in an initial stage in a case where the convex lens having the extraordinary light refractive index is switched to the convex lens having the ordinary light refractive index. Therefore, a falling time is reduced from a time when the liquid crystal molecules are arranged in parallel with the flat surface of the substrate until the molecules are returned to a perpendicular arrangement.

As described above, in this example, it is possible to obtain a liquid crystal lens having a completely reverse characteristic of the application of the voltage while having an advantage similar to that of the liquid crystal lens shown in FIGS. 40 to 44.

A constitution of each component of the liquid crystal lens can variously be modified and changed.

The liquid crystal lens 300 has one liquid crystal layer, but may have two or more liquid crystal layers. One transparent substrate has a plano-concave plate, and the other transparent substrate has a flat plate, but the shape of the transparent substrate is not limited to this shape.

Figure 48:
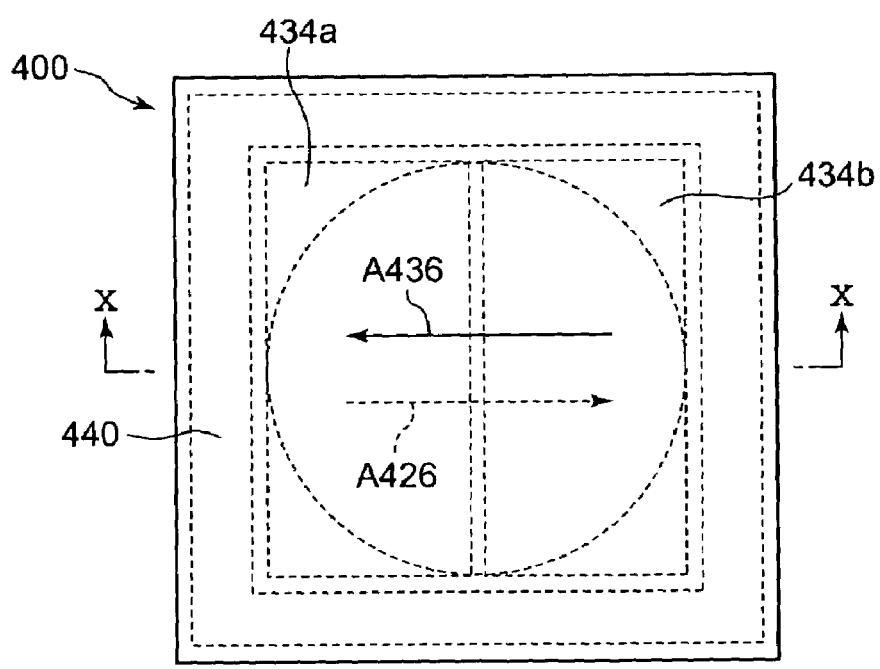
FIG. 48 is a plan view showing another example of the liquid crystal lens applicable to the present invention.
Figure 49:
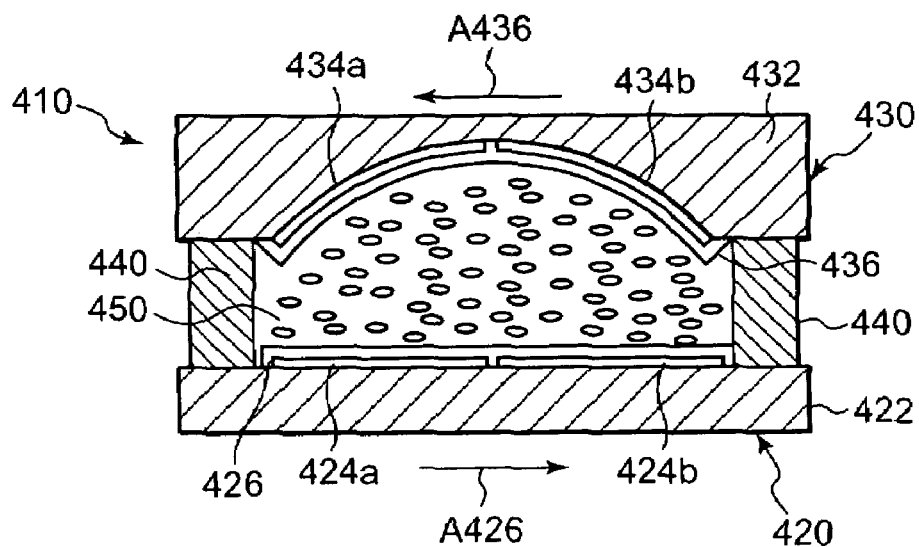
FIG. 49 is a sectional view showing the liquid crystal lens cut along the X-X line of FIG. 48.
Figure 50:
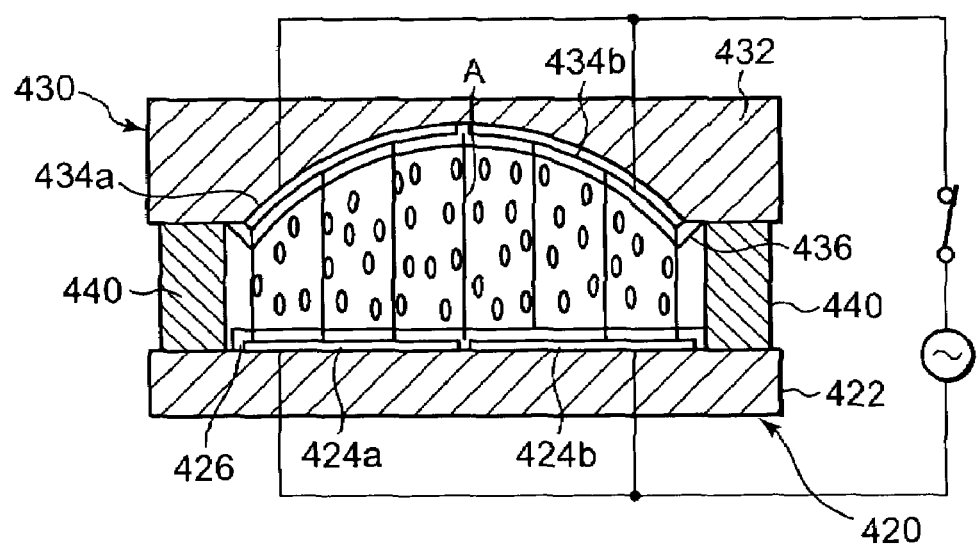
FIG. 50 is an explanatory view showing a method of applying a voltage to each electrode in a case where the liquid crystal lens of FIG. 48 is operated as the lens having the ordinary ray refractive index.
Figure 51:
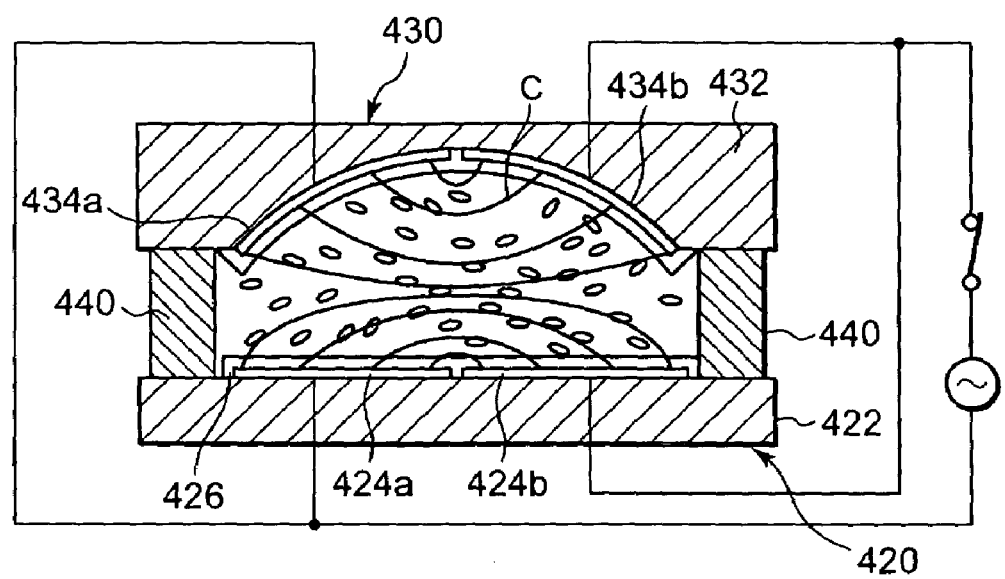
FIG. 51 is an explanatory view showing a method of applying a voltage to each electrode in a case where the liquid crystal lens of FIG. 48 is operated as the lens having the extraordinary ray refractive index.

There will be described still another example of a liquid crystal lens 400 applicable to the optical system of the present invention with reference to FIGS. 48 to 51. FIG. 48 is a plan view of the liquid crystal lens, and FIG. 49 is a sectional view of the liquid crystal lens cut along the C-C line of FIG. 48. FIGS. 50 and 51 are explanatory views showing an operation of the liquid crystal lens.

As shown in FIGS. 48 and 49, the liquid crystal lens 400 includes: a nematic liquid crystal 450 having positive permittivity anisotropy; and a cell 410 which holds the liquid crystal having a convex shape. The cell 410 has two optically transparent substrates 420 and 430 bonded to each other with a spacer 440 therebetween to thereby form a space having a convex shape. The nematic liquid crystal 450 is held in the space. One transparent substrate 420 has a flat plate shape, and the other transparent substrate 430 has a plano-concave lens shape.

The flat substrate 420 includes: a flat plate 422; an undercoat layer (not shown) formed on the flat-pate; two transparent electrodes 424a, 424b formed on the layer; and a parallel orientation layer 426 to cover these electrodes.

Two transparent electrodes 424a, 424b have a same-size rectangular shape. These electrodes are arranged at a small interval in parallel with each other, and they entirely form a square outline. In another viewpoint, a square formed by two transparent electrodes 424a, 424b can be said to be divided symmetrically along a bisector passing through the center of the square in parallel with a pair of opposite sides.

The parallel orientation layer 426 is in parallel with the flat surface of the flat plate and is subjected to an orientation treatment such as rubbing in a direction as shown by an arrow A426. The orientation treatment is performed so as to form a pre-tilt angle of 1 to 5° with respect to the flat surface of the flat plate 422 from a start point toward an end point of the orientation treatment direction A426.

The flat substrate 420 further has a polarization plate (not shown) laminated on an outer flat surface of the flat plate 422, and a polarization direction of the polarization plate agrees with the direction of the orientation treatment performed on the flat substrate 420.

Moreover, the concave substrate 430 includes: a plano-concave plate 432 having a concave surface; an undercoat layer (not shown) formed on the surface including the concave surface; two transparent electrodes 434a, 434b formed on the layer; and a parallel orientation layer 436 to cover these electrodes.

Two transparent electrodes 434a, 434b have, for example, a same-size rectangular shape. These electrodes are arranged at a small interval in parallel with each other, and they entirely form a square outline. In another viewpoint, a square formed by two transparent electrodes 434a, 434b can be said to be divided symmetrically along a bisector passing through the center of the square in parallel with a pair of opposite sides.

The parallel orientation layer 436 is subjected to an orientation treatment such as rubbing in a direction extending in parallel with the flat surface of the plano-concave plate 432 as shown by an arrow A436. That is, the orientation treatment is performed so as to form a pre-tilt angle of 1 to 5° with respect to the flat surface of the plano-concave plate 432 from a start point toward an end point of the orientation treatment direction A436.

The flat substrate 420 is bonded to the concave substrate 430 with the spacer 440 therebetween to constitute the cell 410. In a case where the cell is formed, the flat substrate 420 is bonded to the concave substrate 430 with the spacer 240 therebetween. At first, a sealing agent mixed with beads of plastic, glass or the like is applied on each of the substrates by a method such as screen printing or a dispenser. Then, the substrates and the spacer 440 is bonded together and the sealing agent is cured by heating the agent while pressurizing the agent, or irradiating the agent with an ultraviolet ray.

An injection port (not shown) for injecting the liquid crystal is disposed in at least a part of the spacer 440, and the cell 410 is disposed in a vacuum chamber. After the chamber is evacuated, the nematic liquid crystal 450 is brought into contact with the injection port. Accordingly, the cell 410 is filled with the nematic liquid crystal 450. After filling the cell with the nematic liquid crystal 450, the injection port is coated with a sealant (not shown), and the sealant is cured to seal the nematic liquid crystal 450.

The flat substrate 420 is bonded to the concave substrate 430 via spacer 440 so that the orientation treatment direction A426 of the parallel orientation layer 426 is different from the orientation treatment direction A436 of the parallel orientation layer 436 as much as 180°, that is, they are directed opposite to each other.

The transparent electrodes 424a, 424b, 434a, and 434b are connected to wiring line electrodes (not shown) to which voltages are to be applied, respectively. Each wiring line electrode is connected to a driving circuit (not shown) via a wiring line member (not shown) connected to the electrode by use of an anisotropic conductive adhesive, solder or the like.

The polarization direction of light entering the liquid crystal lens 400 from a flat substrate 420 side is adjusted by the polarization plate disposed on the surface of the lens. The light enters the nematic liquid crystal 450 having the convex shape.

In a state in which any voltage is not applied between the transparent electrodes 424a and 424b and the transparent electrodes 434a and 434b, liquid crystal molecules are arranged along the orientation treatment direction of the parallel orientation layer. Therefore, the polarization direction of the incident light polarized by the polarization plate becomes parallel to the orientation direction of the nematic liquid crystal 450, and the incident light is influenced by an extraordinary ray refractive index of the nematic liquid crystal 450. That is, the nematic liquid crystal 450 held into the convex shape functions as a convex lens having an extraordinary ray refractive index with respect to the incident light polarized in parallel with the orientation treatment direction of the parallel orientation layer.

On the other hand, when the voltage is applied between the transparent electrodes 424a and 424b and the transparent electrodes 434a and 434b as shown in FIG. 50, an electric field is applied to the nematic liquid crystal 450, and the liquid crystal molecules rotate in a direction of the electric field. The molecules are arranged perpendicularly to the flat substrate 420 and the flat surface of the concave substrate 430. Therefore, the polarization direction of the incident light polarized by the polarization plate is perpendicular to the orientation direction of the nematic liquid crystal 450, and the incident light is influenced by an ordinary ray refractive index of the nematic liquid crystal 450. That is, the nematic liquid crystal 450 held into the convex shape functions as a convex lens having the ordinary ray refractive index with respect to the incident light polarized in parallel with the orientation treatment direction of the parallel orientation layer.

Therefore, in a case where the liquid crystal lens 400 is allowed to function as the convex lens having the extraordinary ray refractive index, the driving circuit does not apply any voltage between the transparent electrodes 424a and 424b and the transparent electrodes 434a and 434b.

In a case where the liquid crystal lens 400 is allowed to function as the convex lens having the ordinary ray refractive index, as shown in FIG. 50, the driving circuit electrically connects the transparent electrode 424a to the transparent electrode 424b of the flat substrate 420 by use of a relay switch or the like to obtain an equal potential. Moreover, the circuit electrically connects the transparent electrode 434a to the transparent electrode 434b of the concave substrate 430 to obtain an equal potential. Furthermore, an alternating voltage of several volts to several tens of volts is applied between the transparent electrodes 424a and 424b and the transparent electrodes 434a and 434b. This application of the alternating voltage generates the electric field having an electric force line A which is substantially perpendicular to the flat surface of the substrate between the transparent electrodes 424a and 424b and the transparent electrodes 434a and 434b. The liquid crystal molecules of the nematic liquid crystal 450 are influenced by this electric field to rotate, and are arranged in parallel with the electric force line A. In this case, all the liquid crystal molecules rotate in the same direction due to the above-described pre-tilt angle.

To switch the liquid crystal lens 400 from a state in which the lens functions as the convex lens having the ordinary ray refractive index to a state in which the lens functions as the convex lens having the extraordinary ray refractive index, as shown in FIG. 51, first for about several to several tens of milliseconds, the driving circuit electrically connects one pair of facing transparent electrode 424a, 434a to each other, and electrically connects the other pair of facing transparent electrodes 424b, 434b to each other. Moreover, the driving circuit applies, between the transparent electrodes 424a and 434a and the transparent electrodes 424b and 434b, an alternating voltage having a magnitude about twice that of the alternating voltage applied in a case where the lens functions as the convex lens having the ordinary ray refractive index. Thereafter, the driving circuit stops the application of the voltage between the transparent electrodes 424a and 434a and the transparent electrodes 424b and 434b.

In such control of the voltages to be applied, a potential difference is eliminated between the transparent electrodes 424a and 434a, a potential difference is eliminated between the transparent electrodes 424b and 434b, and an electric field is generated between the transparent electrodes 424a and 434a and the transparent electrodes 424b and 434b, the electric field having an electric force line C which substantially extends in parallel with the surface of the substrate. In such a direction as to return to a state in which any electric field is not applied, this electric field imparts a rotating force to the liquid crystal molecules of the nematic liquid crystal 450 arranged perpendicularly to the flat surface of the substrate. After the application of the voltage is stopped, the liquid crystal molecules return to a state in which the molecules are arranged in parallel with the surface of the substrate in accordance with characteristics inherent in a liquid crystal material.

As described above, in this liquid crystal lens 400, the liquid crystal molecules of the nematic liquid crystal 450 are forcibly rotated in an initial stage in a case where the convex lens having the ordinary ray refractive index is switched to the convex lens having the extraordinary ray refractive index. Therefore, a falling time is reduced from a time when the liquid crystal molecules are arranged perpendicularly to the flat surface of the substrate until the molecules shift to a parallel arrangement.

A constitution of each component of the liquid crystal lens can variously be modified and changed.

In this example, the liquid crystal lens 400 has one liquid crystal layer, but may have, for example, two or more liquid crystal layers. One transparent substrate has a plano-concave plate, and the other transparent substrate has a flat plate, but the shape of the transparent substrate is not limited to this shape.

In addition, the above-described image pickup apparatus is usable in a picture taking apparatus such as a digital camera or a video camera, an information processing device such as a personal computer, or an electronic device such as a photocopier, a barcode reader, a phone set, or a cellular phone. A typical example will be described hereinafter.

Figure 52:
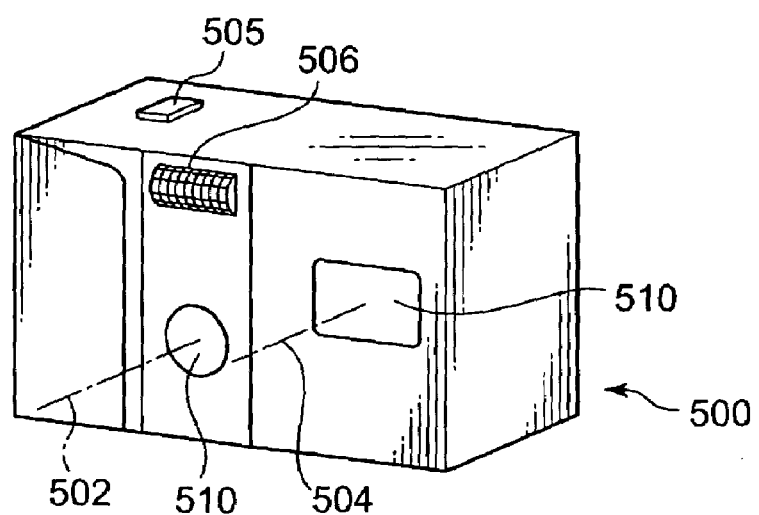
FIG. 52 is a front-part perspective view showing an appearance of a digital camera in which the image pickup apparatus of Embodiment 7 (FIG. 9) is incorporated.
Figure 53:
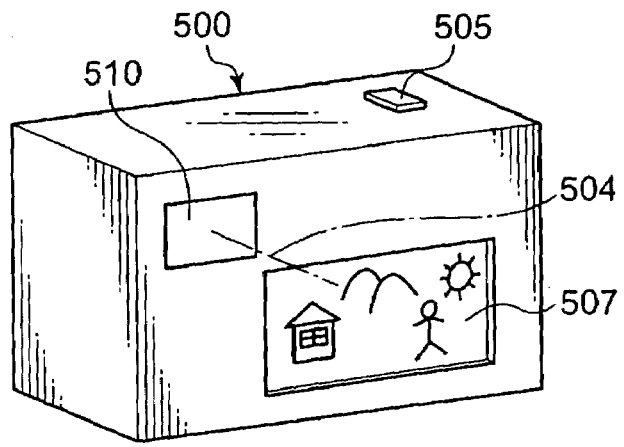
FIG. 53 is a rear-part perspective view of the digital camera of FIG. 52.
Figure 54:
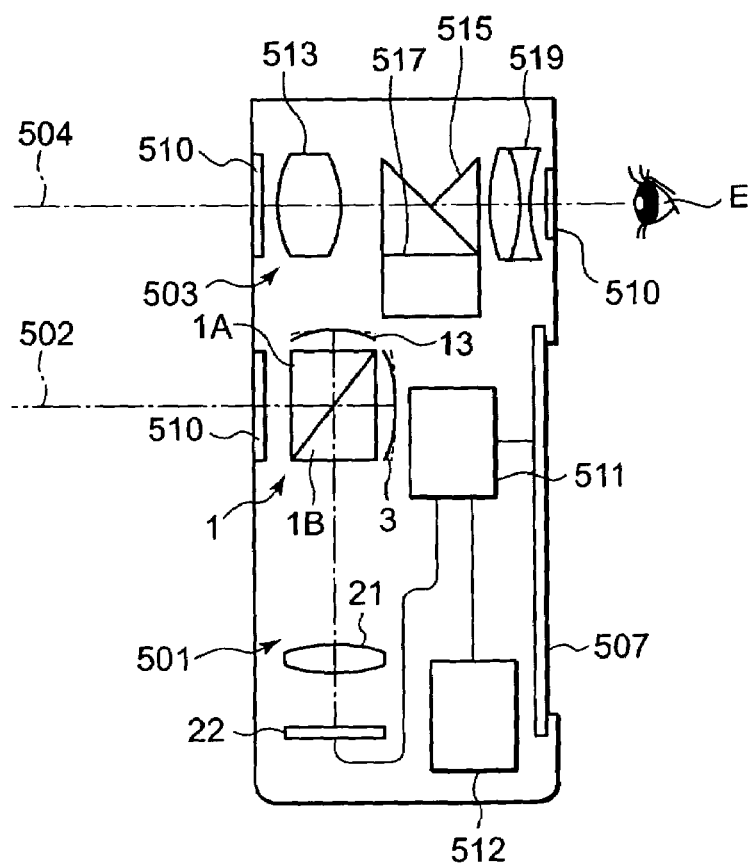
FIG. 54 is a sectional view of the digital camera of FIG. 52.

FIGS. 52 to 54 are conceptual diagrams of a digital camera 500 in which the image pickup apparatus of the present invention is incorporated. FIG. 52 is a front-part perspective view showing an appearance of the digital camera 500, FIG. 53 is a rear-part perspective view of the digital camera, and FIG. 54 is a sectional view showing an inner constitution of the digital camera 500. In this example, the digital camera 500 includes: an image pickup apparatus 501 having an optical path 502 for taking a picture; a finder optical system 503 having an optical path 504 for a finder; a release button 505; a flashlight 506; a liquid crystal display monitor 507 and the like. When the release button 505 disposed on the upper part of the camera 500 is pressed, the picture is taken in conjunction with the pressing. In this example, as the image pickup apparatus 501, the apparatus described in the seventh embodiment of the present invention is incorporated. The prism element 1, the deformable mirrors 3, 13, and the lens system 21 are built in the digital camera.

An object image is formed by the prism element 1, the deformable mirrors 3, 13, and the lens system 21 on the image pickup surface 22 of an image sensor such as a CCD. The object image received by the image pickup surface 22 is displayed as an electronic image in the liquid crystal display monitor 507 disposed in the camera back surface via a signal processing circuit 511. The signal processing circuit 511 is connected to a recording section 512, and the taken electronic image can be recorded. It is to be noted that this recording section 512 may be disposed separately from the signal processing circuit 511, or constituted of a disc-like magnetic recording medium, a memory card, a magneto-optical disc and the like so as to electronically record and reproduce the image.

Furthermore, an objective optical system 513 for the finder is disposed on the optical path 504 for the finder. The object image formed by the objective optical system 513 for the finder is formed in the view field frame 517 of the Porro prism 515 which is an image erecting element. An eyepiece optical system 519 for guiding an erected image to an observer's eyeball E is disposed behind the Porro prism 515. It is to be noted that cover members 510 are disposed on incidence sides of the image pickup apparatus 501 and the objective optical system 513 for the finder, and on an exit side of the eyepiece optical system 519, respectively.

In the digital camera 500 constituted in this manner, since the image pickup apparatus 501 includes a deformable mirror, movable constituent elements are reduced (or omitted) even in a case where zooming or focusing is performed, and miniaturization of the digital camera can be realized.

In the example of FIG. 54, parallel flat plates are disposed as the cover members 510, but a lens having a power may be used.

It is to be noted that here as an example of the digital camera, a small-sized camera has been described in which the optical path 502 is disposed separately from the finder optical path 504, but the image pickup apparatus of the present invention is applicable even to a single-lens reflex camera. In this case, the light flux reflected by the optical path splitting element (first to third embodiments) or the light flux transmitted through the optical path splitting element (fourth to sixth embodiments) may be guided to the eyepiece optical system by use of, for example, the image pickup apparatuses of the first to sixth embodiments.

In the each of the above embodiments, the half mirror is used as the optical path splitting element, but the present invention is not limited to the example, and, for example, a beam splitter may be used as optical path splitting means. Furthermore, the polarized half mirror 2 transmits the P-polarized light and reflects the S-polarized light, but may transmit the S-polarized light and reflect the P-polarized light.

Figure 55:
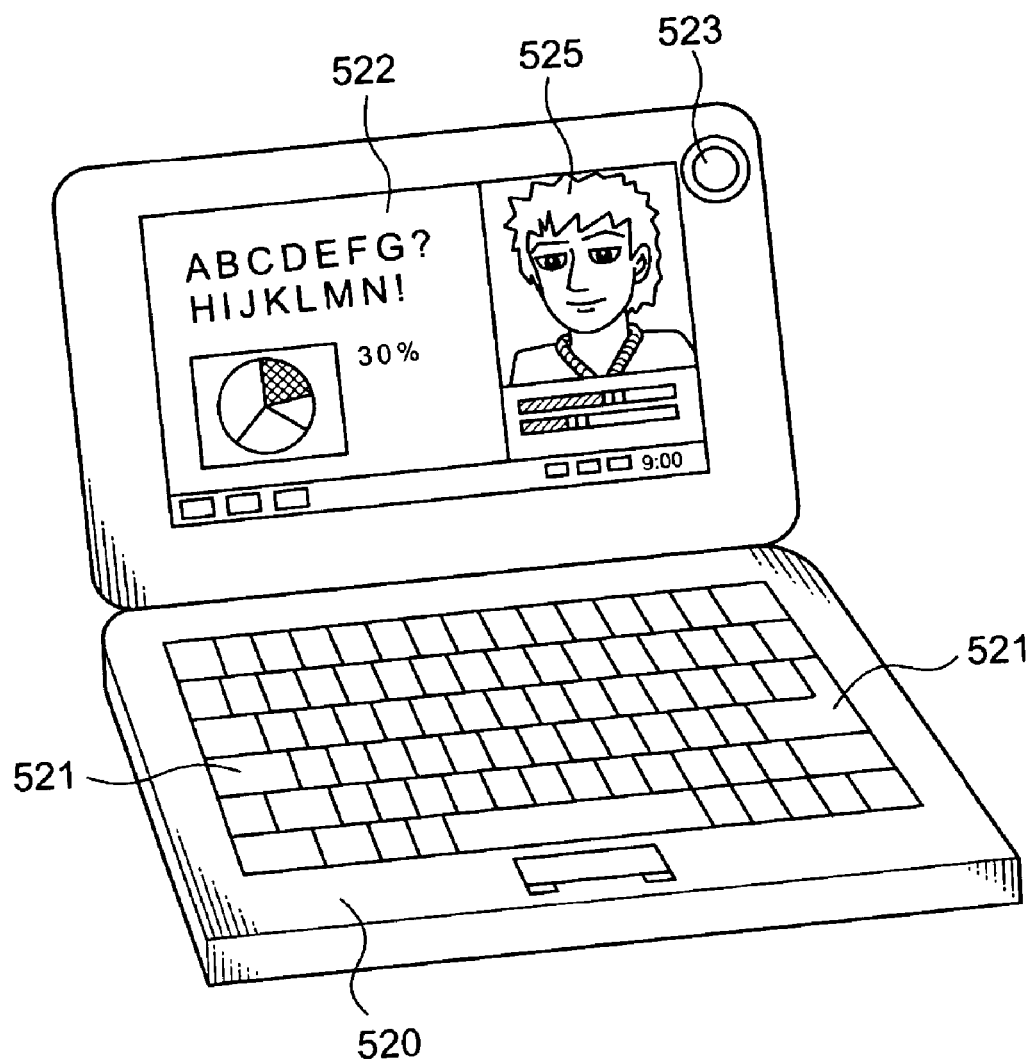
FIG. 55 is a front-part perspective view showing an open state of a cover of a personal computer in which the image pickup apparatus of Embodiment 7 (FIG. 9) is incorporated.
Figure 56:
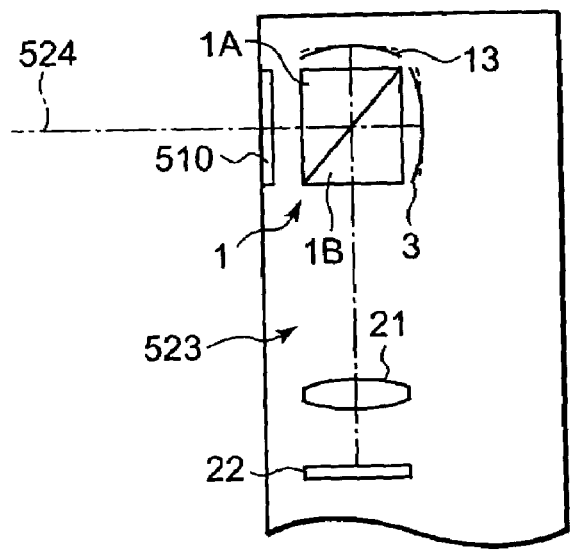
FIG. 56 is a sectional view showing an image pickup apparatus part of the personal computer of FIG. 55.
Figure 57:
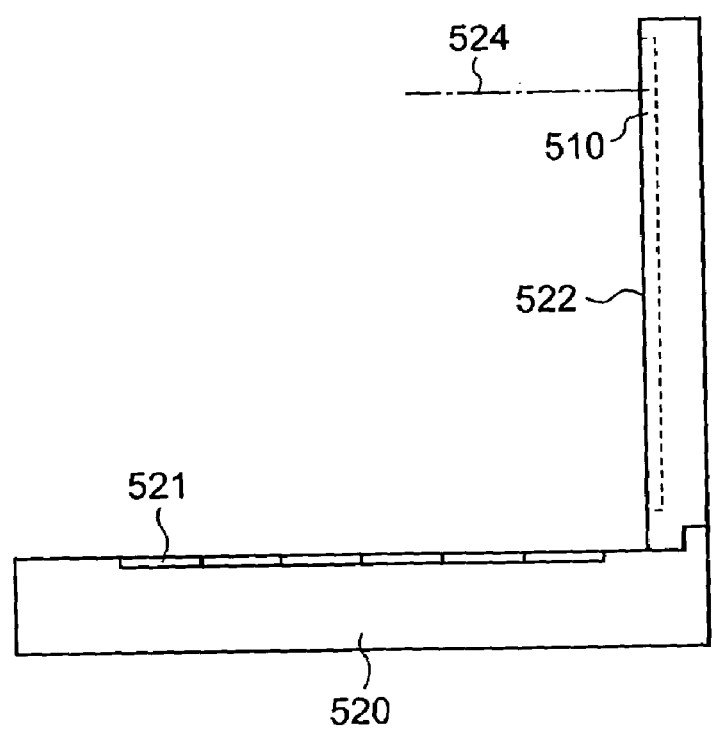
FIG. 57 is a side view of the personal computer of FIG. 55.

Next, there will be described a personal computer as an example of an information processing device in which the image pickup apparatus of the present invention is built with reference to FIGS. 55 to 57. FIG. 55 is a front-part perspective view showing state in which the cover of the personal computer 520 is opened, FIG. 56 is a sectional view of an image pickup apparatus 523 of the personal computer 520, and FIG. 57 is a side view showing the state of FIG. 55. As shown in FIGS. 55 to 57, the personal computer 520 has: a keyboard 521 for an operator to input information from the outside; information processing means or recording means (not shown); a monitor 522 which displays the information to an operator; and the image pickup apparatus 523 for taking a picture of or around the operator. Here, the monitor 522 may be a transmission type liquid crystal display element illuminated with a backlight (not shown) from the back surface of the element, a reflective liquid crystal display element which reflects light from the front surface to display the image, a CRT display or the like. In the drawings, the image pickup apparatus 523 is built in the upper right portion of the monitor 522, but there is not any restriction on the place of the image pickup apparatus, and the apparatus may be disposed in any portion around the monitor 522 or the keyboard 521.

The image pickup apparatus of the present invention is disposed along the picture-taking optical path 524. In this example, the image pickup apparatus described in the seventh embodiment is used. The apparatus includes the prism element 1, the deformable mirrors 3, 13, the lens system 21, and the image sensor 22 which receives image light. These components are built in the personal computer 520.

Here, an optical low pass filter is additionally laminated onto the image sensor 22, and may be integrated as an image pickup unit, or the image sensor may be detachably attached to a rear end (not shown) of a lens barrel of the lens system 21 by a one-touch operation. This obviates needs for alignment adjustment of the lens system 21 and the image pickup surface 22, and adjusting of an interval, and assembling is simplified. A front end of the lens barrel is provided with the cover member 510 for protecting the prism 1.

An object image received by the image sensor 22 is input into processing means of the personal computer 520, and displayed as an electronic image in the monitor 522. FIG. 55 shows an image 525 taken by the operator as an example. The image 525 can be displayed in a personal computer of a communication target from a remote area via a network such as internet.

Figure 58:
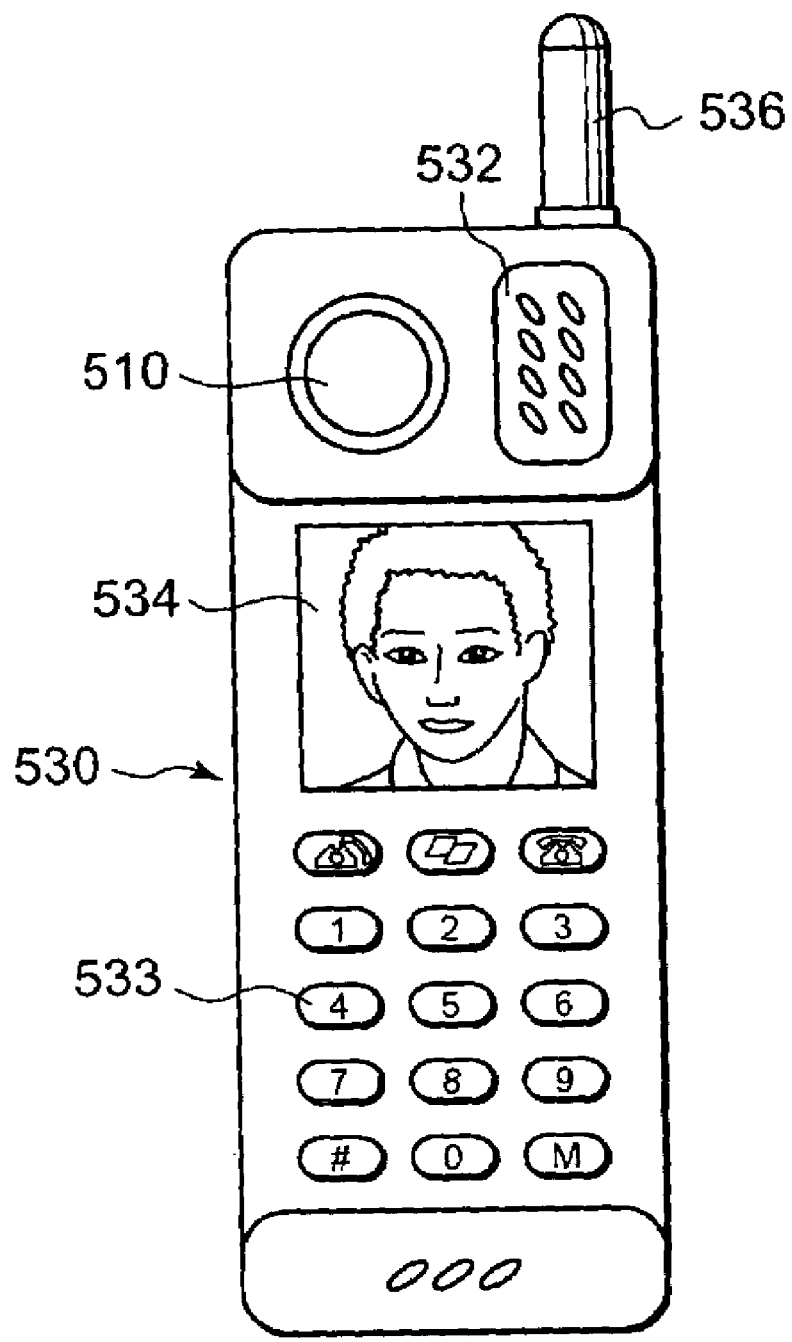
FIG. 58 is a front view showing an appearance of a cellular phone in which the image pickup apparatus of Embodiment 7 (FIG. 9) is incorporated.
Figure 59:
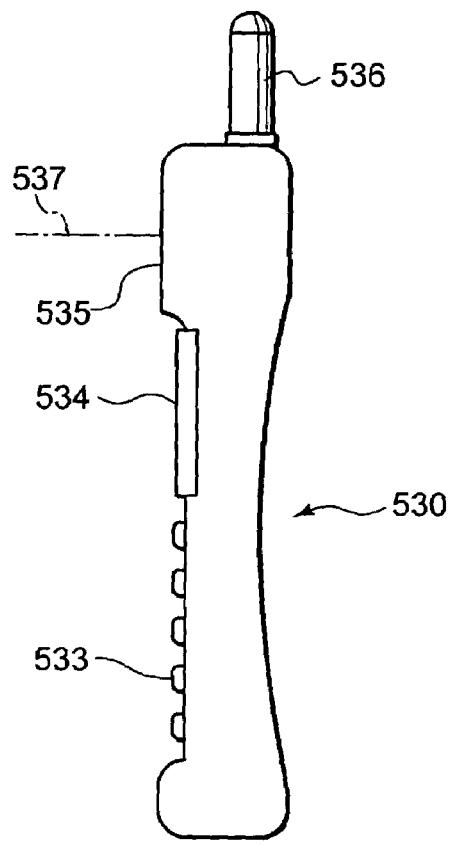
FIG. 59 is a side view of the cellular phone of FIG. 58.
Figure 60:
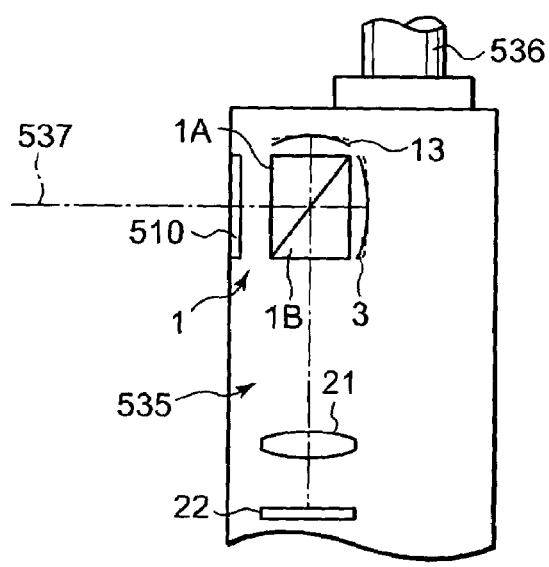
FIG. 60 is a sectional view showing an image pickup apparatus part of the cellular phone of FIG. 58.

Next, there will be described a cellular phone 530 in which the image pickup apparatus of the present invention is built with reference to FIGS. 58 to 60. FIG. 58 is a front view of the cellular phone 530, FIG. 59 is a side view, and FIG. 60 is a sectional view of the image pickup apparatus. As shown in FIGS. 58 to 60, the cellular phone 530 has: a microphone 531 into which operator's voice is input as information; a speaker 532 which outputs communication target's voice; input keys 533 for the operator to input the information; a monitor 534 which displays an image of the operator, the communication target or the like and information such as phone number; an image pickup apparatus 535; an antenna 536 which transmits and receives communication radio wave; and processing means (not shown) for processing image information, communication information, an input signal and the like. Here, the monitor 534 is a liquid crystal display element. In the drawings, a position where each constitution is disposed is not limited to this example. As the image pickup apparatus 535, there is used the apparatus described in the seventh embodiment of the present invention. The prism element 1, the deformable mirrors 3, 13, the lens system 21, and the image sensor 22 are built in the cellular phone 530. Reference numeral 537 denotes a picture-taking optical path which enters the image pickup apparatus. The apparatus also has the image sensor 22.

Here, an optical low pass filter is additionally laminated onto the image sensor 22, and may be integrated as an image pickup unit, or the image sensor may be detachably attached to a rear end (not shown) of a lens barrel of the lens system 21 by a one-touch operation. This obviates needs for centering of the lens system 21 and the image pickup surface 22, and adjusting of an interval, and assembling is simplified. The front end of the lens barrel is provided with the cover glass 510 for protecting the prism 1.

An object image received by the image sensor 22 is input into processing means (not shown), and displayed as an electronic image in the monitor 534, a monitor of the communication target, or both of the monitors. In a case where the image is transmitted to the communication target, processing means includes a signal processing function of converting information of the object image received by the image sensor 22 into a transmittable signal.

The present invention is not limited to the embodiments described herein, and can variously be modified without departing from the scope of the invention. An application object of the present invention is not limited to the illustrated apparatuses.

What is claimed is:

1. An image pickup apparatus comprising:
an optical path splitting element;
an optical system including a variable-optical-power element which is substantially immobile in an optical axis direction and a reflective surface; and
an image pickup surface,
the optical path splitting element, the optical system, and the image pickup surface being arranged so that a light flux incoming from an object side passes through the optical path splitting element, enters the optical system, is reflected by the reflective surface, is emitted from the optical system toward the optical path splitting element, is reflected by the optical path splitting element, and then strikes on the image pickup surface;
wherein the optical path splitting element is a polarized half mirror, and a λ/4 plate is disposed between the optical path splitting element and the reflective surface;
wherein the variable-optical-power element includes a liquid crystal lens which is disposed between the λ/4 plate and the reflective surface,
a polarization plate is disposed between the λ/4 plate and the liquid crystal lens, and
the polarization plate is disposed so as to maximize a quantity of light flux to be emitted from the λ/4 plate and transmitted through the polarization plate.

2. A picture taking apparatus comprising:
an image pickup apparatus; and
a housing which accommodates the image pickup apparatus;
wherein the image pickup apparatus comprises:
an optical path splitting element;
a first optical system which includes a first variable-optical-power element being substantially immobile in a first optical axis direction and a first reflective surface, and which a light flux transmitted through the optical path splitting element enters;
a second optical system which includes a second variable-optical-power element being substantially immobile in a second optical axis direction and a second reflective surface, and which a light flux reflected by the optical path splitting element enters; and
an image pickup surface,
the optical path splitting element, the first optical system, the second optical system, and the image pickup surface being arranged so that a part of a light flux incoming from an object side passes through the optical path splitting element, enters the first optical system, is reflected by the first reflective surface, is emitted from the first optical system toward the optical path splitting element, is reflected by the optical path splitting element, and then strikes on the image pickup surface, and
another part of the light flux incoming from the object side is reflected by the optical path splitting element, enters the second optical system, is reflected by the second reflective surface, is emitted from the second optical system toward the optical path splitting element, passes through the optical path splitting element, and then strikes on the image pickup surface;
wherein a rear focal point of the first optical system is in a position which is different from that of the second optical system.

3. The apparatus according to claim 2, wherein a rear focal point of the first optical system is in a position which is different from that of the second optical system as viewed in an optical axis direction.

4. The apparatus according to claim 2, wherein the first optical system and the second optical system have an aperture diaphragm whose aperture size is variable, and
a refractive power of at least one of the first variable-optical-power element and the second variable-optical-power element is changed so as to change a distance between the rear focal point of the first optical system and the rear focal point of the second optical system in accordance with a change of a numerical aperture determined by the aperture diaphragm.

5. A picture taking apparatus comprising:
an image pickup apparatus; and
a housing which accommodates the image pickup apparatus;
wherein the image pickup apparatus comprises:
an optical path splitting element;
an optical system including a variable-optical-power element which is substantially immobile in an optical axis direction and a reflective surface; and
an image pickup surface,
the optical path splitting element, the optical system, and the image pickup surface being arranged so that a light flux incoming from an object side passes through the optical path splitting element, enters the optical system, is reflected by the reflective surface, is emitted from the optical system toward the optical path splitting element, is reflected by the optical path splitting element, and then strikes on the image pickup surface;
wherein a lens unit is disposed on an object side of the optical path splitting element;
wherein the lens unit has at least one sub-unit which is movable along an optical axis.

6. The apparatus according to claim 5, wherein the lens unit is constituted as a variable-focal-length optical system.

7. A picture taking apparatus comprising:
an image pickup apparatus; and
a housing which accommodates the image pickup apparatus;
wherein the image pickup apparatus comprises:
an optical path splitting element;
an optical system including a variable-optical-power element which is substantially immobile in an optical axis direction and a reflective surface; and
an image pickup surface,
the optical path splitting element, the optical system, and the image pickup surface being arranged so that a light flux incoming from an object side passes through the optical path splitting element, enters the optical system, is reflected by the reflective surface, is emitted from the optical system toward the optical path splitting element, is reflected by the optical path splitting element, and then strikes on the image pickup surface;

wherein a lens unit is disposed between the optical path splitting element and the image pickup surface;

wherein the lens unit has at least one sub-unit which is movable along an optical axis.

8. The apparatus according to claim 7, wherein the lens unit is constituted as a variable-focal-length optical system.

9. A picture taking apparatus comprising:

a picture taking apparatus; and a housing which accommodates the image pickup apparatus;

wherein the image pickup apparatus comprises:

an optical path splitting element;

an optical system including a variable-optical-power element which is substantially immobile in an optical axis direction and a reflective surface; and an image pickup surface, the optical path splitting element, the optical system, and the image pickup surface being arranged so that a light flux incoming from an object side passes through the optical path splitting element, enters the optical system, is reflected by the reflective surface, is emitted from the optical system toward the optical path splitting element, is reflected by the optical path splitting element, and then strikes on the image pickup surface;

wherein the optical path splitting element is a polarized half mirror, and a λ/4 plate is disposed between the optical path splitting element and the reflective surface;

wherein a polarization plate is disposed between the optical path splitting element and the reflective surface, and the polarization plate is rotatable around each optical axis.

10. The apparatus according to claim 9, wherein the polarization plate rotates to adjust an exposure.

11. An image pickup apparatus comprising:

an optical path splitting element;

an optical system including a variable-optical-power element which is substantially immobile in an optical axis direction and a reflective surface; and an image pickup surface, the optical path splitting element, the optical system, and the image pickup surface being arranged so that a light flux incoming from an object side is reflected by the optical path splitting element, enters the optical system, is reflected by the reflective surface, is emitted from the optical system toward the optical path splitting element, passes through the optical path splitting element, and then strikes on the image pickup surface;

wherein the optical path splitting element is a polarized beam splitter, and a λ/4 plate is disposed between the optical path splitting element and the reflective surface;

wherein the variable-optical-power element includes a liquid crystal lens which is disposed between the λ/4 plate and the reflective surface, a polarization plate is disposed between the λ/4 plate and the liquid crystal lens, and the polarization plate is disposed so as to maximize a quantity of light flux to be emitted from the λ/4 plate and transmitted through the polarization plate.

12. An image pickup apparatus comprising:

an optical path splitting element;

a first optical system which includes a first variable-optical-power element being substantially immobile in a first optical axis direction and a first reflective surface, and which a light flux transmitted through the optical path splitting element enters;

a second optical system which includes a second variable-optical-power element being substantially immobile in a second optical axis direction and a second reflective surface, and which a light flux reflected by the optical path splitting element enters; and an image pickup surface, the optical path splitting element, the first optical system, the second optical system, and the image pickup surface being arranged so that a part of a light flux incoming from an object side passes through the optical path splitting element, enters the first optical system, is reflected by the first reflective surface, is emitted from the first optical system toward the optical path splitting element, is reflected by the optical path splitting element, and then strikes on the image pickup surface, and another part of the light flux incoming from the object side is reflected by the optical path splitting element, enters the second optical system, is reflected by the second reflective surface, is emitted from the second optical system toward the optical path splitting element, passes through the optical path splitting element, and then strikes on the image pickup surface;

wherein the optical path splitting element is a polarized beam splitter, a first λ/4 plate is disposed between the optical path splitting element and the first reflective surface, and a second λ/4 plate is disposed between the optical path splitting element and the second reflective surface;

wherein the variable-optical-power element includes a liquid crystal lens which is disposed between the λ/4 plate and the reflective surface, a polarization plate is disposed between the λ/4 plate and the liquid crystal lens, and the polarization plate is disposed so as to maximize a quantity of light flux to be emitted from the λ/4 plate and transmitted through the polarization plate.

* * * * *